US009584431B2

(12) United States Patent
Szymanski

(10) Patent No.: US 9,584,431 B2
(45) Date of Patent: *Feb. 28, 2017

(54) METHOD TO ACHIEVE BOUNDED BUFFER SIZES AND QUALITY OF SERVICE GUARANTEES IN THE INTERNET NETWORK

(71) Applicant: Tadeusz H. Szymanski, Toronto (CA)

(72) Inventor: Tadeusz H. Szymanski, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,226

(22) Filed: Jul. 6, 2015

(65) Prior Publication Data

US 2015/0312163 A1    Oct. 29, 2015

Related U.S. Application Data

(63) Continuation of application No. 14/093,874, filed on Dec. 2, 2013, now abandoned, which is a continuation
(Continued)

(51) Int. Cl.
*H04L 12/28* (2006.01)
*H04L 12/863* (2013.01)
(Continued)

(52) U.S. Cl.
CPC ...... *H04L 47/6215* (2013.01); *H04L 12/5693* (2013.01); *H04L 47/14* (2013.01);
(Continued)

(58) Field of Classification Search
None
See application file for complete search history.

(56) References Cited

U.S. PATENT DOCUMENTS 6,950,400 B1    9/2005    Tran et al.
7,561,590 B1 *  7/2009    Walsh ............... H04L 47/6215
                                                              370/416
(Continued)

OTHER PUBLICATIONS

Appenzeller et al., "Sizing Router Buffers," SIGCOMM'04, Aug. 30-Sep. 3, 2004, Portland, Oregon, U.S.A., pp. 281-292.
(Continued)

*Primary Examiner* — Anh-Vu Ly

(57) ABSTRACT

Methods to achieve bounded router buffer sizes and Quality of Service guarantees for traffic flows in a packet-switched network are described. The network can be an Internet Protocol (IP) network, a Differentiated Services network, an MPLS network, wireless mesh network or an optical network. The routers can use input queueing, possibly in combination with crosspoint queueing and/or output queueing. Routers may schedule QoS-enabled traffic flows to ensure a bounded normalized service lead/lag. Each QoS-enabled traffic flow will buffer O(K) packets per router, where K is an integer bound on the normalized service lead/lag. Three flow-scheduling methods are analyzed. Non-work-conserving flow-scheduling methods can guarantee a bound on the normalized service lead/lag, while work-conserving flow-scheduling methods typically cannot guarantee the same small bound. The amount of buffering required in a router can be reduced significantly, the network links can operate near peak capacity, and strict QoS guarantees can be achieved.

46 Claims, 20 Drawing Sheets

Related U.S. Application Data of application No. 13/074,834, filed on Mar. 29, 2011, now Pat. No. 8,665,722.

(60) Provisional application No. 61/318,663, filed on Mar. 29, 2010.

(51) Int. Cl.

| | |
|---|---|
| *H04L 12/54* | (2013.01) |
| *H04L 12/801* | (2013.01) |
| *H04L 12/813* | (2013.01) |
| *H04L 12/815* | (2013.01) |
| *H04L 12/835* | (2013.01) |
| *H04L 12/913* | (2013.01) |
| *H04W 28/10* | (2009.01) |
| *H04L 12/819* | (2013.01) |
| *H04L 12/851* | (2013.01) |
| *H04L 12/823* | (2013.01) |
| *H04L 12/875* | (2013.01) |
| *H04L 12/911* | (2013.01) |

(52) U.S. Cl.
CPC .............. *H04L 47/20* (2013.01); *H04L 47/22* (2013.01); *H04L 47/30* (2013.01); *H04L 47/724* (2013.01); *H04W 28/10* (2013.01); *H04L 47/19* (2013.01); *H04L 47/215* (2013.01); *H04L 47/2441* (2013.01); *H04L 47/29* (2013.01); *H04L 47/32* (2013.01); *H04L 47/56* (2013.01); *H04L 47/824* (2013.01)

(56) References Cited

U.S. PATENT DOCUMENTS

| | | | |
|---|---|---|---|
| 7,640,355 B1 | 12/2009 | Marshall et al. | |
| 7,701,849 B1* | 4/2010 | Ma | H04L 12/4625 370/230 |
| 7,881,194 B1 | 2/2011 | James | |
| 8,619,566 B2 | 12/2013 | Szymanski | |
| 8,665,722 B2 | 3/2014 | Szymanski | |
| 8,681,609 B2 | 3/2014 | Szymanski | |
| 2001/0036181 A1 | 11/2001 | Rogers | |
| 2002/0110134 A1* | 8/2002 | Gracon | H04L 47/10 370/412 |
| 2003/0021230 A1* | 1/2003 | Kuo | H04L 47/10 370/230 |
| 2003/0081623 A1* | 5/2003 | Kiremidjian | H04L 47/10 370/412 |
| 2004/0042477 A1* | 3/2004 | Bitar | H04L 12/5693 370/412 |
| 2004/0125815 A1 | 7/2004 | Shimazu et al. | |
| 2005/0163140 A1 | 7/2005 | Dally et al. | |
| 2005/0175014 A1* | 8/2005 | Patrick | H04L 12/5693 370/395.43 |
| 2005/0180444 A1 | 8/2005 | Gu et al. | |
| 2007/0121504 A1 | 5/2007 | Hellenthal et al. | |
| 2007/0201440 A1 | 8/2007 | Ganguly et al. | |
| 2007/0280245 A1 | 12/2007 | Rosberg | |
| 2007/0280261 A1 | 12/2007 | Szymanski | |
| 2008/0080504 A1* | 4/2008 | Gusat | H04L 47/10 370/392 |
| 2009/0097495 A1* | 4/2009 | Palacharla | H04L 49/901 370/413 |
| 2010/0232446 A1 | 9/2010 | Ma et al. | |
| 2011/0158248 A1 | 6/2011 | Vorunganti et al. | |
| 2014/0119347 A1 | 5/2014 | Szymanski | |
| 2014/0204739 A1 | 7/2014 | Szymanski | |

OTHER PUBLICATIONS

Bertsekas and Gallager, "Data Networks," Second Edition, 1992, Englewood Cliffs: Prentice-Hall Inc., Second Edition.

Chang et al., "Birkoff-von Neumann input-buffered crossbar switches for guaranteed-rate services," Jul. 2001, IEEE Transactions on Communications, vol. 49, No. 7, pp. 1145-1147.

Dhamdhere and Dovrolis, "Open issues in router buffer sizing", Newsletter, ACM SIGCOMM Computer Communication Review, vol. 36 Issue 1, Jan. 2006, pp. 87-92.

Enachescu et. al, "Routers with very small buffers", Proc. IEEE Conference Infocom, Barcelona, Spain, Apr. 23-29, 2006.

Ganjali and McKeown, "Update on buffer sizing in internet routers," Oct. 2006, ACM SIGCOMM Computer Communication Review, vol. 36, No. 5, pp. 67-70.

Iyer et al., "Designing packet buffers for router linecards", IEEE/ACM Transactions on Networking, vol. 16, No. 3, Apr. 2006, pp. 705-717.

Keslassy et al., "On guaranteed smooth scheduling for input-queued switches," Dec. 2005, IEEE/ACM Transactions on Networking, vol. 13, No. 6, pp. 1364-1375.

Koksal et al., "Rate quantization and service quality over single crossbar switches," 2004, IEEE INFOCOM 2004, (12 pages).

Leon-Garcia and Widjaja, "Chapter 7 & Chapter 10", Communication Networks Fundametnal Concepts and Key Architectures, 2004, Second Edition, McGraw Hill.

Mohanty and Bhuyan, "Guaranteed smooth switch scheduling with low complexity," 2005, IEEE Globecom 2005, pp. 626-630.

Parekh and Gallager, "A generalized processor sharing approach to flow contro in integrated services networks: the single-node case," Jun. 1993, IEEE/ACM Transactions on Networking, vol. 1, No. 3, pp. 344-357.

Parekh and Gallager, "A generalized processor sharing approach to flow contro in integrated services networks: the multiple node case," Apr. 1994, IEEE/ACM Transactions on Networking, vol. 2, No. 2, pp. 137-150.

Prasad et al., "Router buffer sizing for TCP traffic and the role of the output/input capacity ratio," Oct. 20009, IEEE/ACM Transactions on Networking, vol. 17, No. 5, pp. 1645-1658.

Raina and Wischik, "Buffer sizes for large multiplexers: TCP queueing theory and instability analysis", Proc. IEEE Conference 'Next Generation Internet Networks', Rome, Italy, Apr. 18-20, 2005, pp. 173-180.

Roberts, "A Radical New Router." Jul. 2009, IEEE Spectrum, pp. 36-39.

Szymanski, "A low-jitter guaranteed-rate scheduling algorithm for packet-switched IP routers," Nov. 2009, IEEE Transactions on Communications, vol. 57, No. 11, pp. 3446-3459.

Szymanski, "A low-jitter Guaranteed-Rate scheduling algorithm for crosspoint-buffered switches", Proc. IEEE Pacific Rim Conference on Communications, Computers and Signal Processing, Victoria, BC, Aug. 23-26, 2009, pp. 682-690.

Szymanski, "A Conflict-Free Low-Jitter Guaranteed-Rate MAC Protocol for Base-Station Communications in Wireless Mesh Networks." Proceedings Third Int. Conf. on Access Networks, Las Vegas, Oct. 15-17, 2008. (Revised paper published in Lecture Notes of the Institute for Computer Sciences, Social Informatics and Telecommunications Engineering, Springer Berlin Heidelberg, 2009, pp. 118-137.).

Szymanski, "Bounds on end-to-end delay and jitter in input-buffered and internally-buffered IP networks." Proc. IEEE Sarnoff Symposium, Princeton, NJ, Mar. 30-Apr. 1, 2009, pp. 1-7.

Szymanski, "Bounds on Memory Requirements in Internet Routers", submitted to the IEEE Conf. 'Globecom', submitted on Mar. 31, 2010. Revised and published in Proc. IEEE Globecom Workshop CCNET, Miami, Florida, Dec. 6-10, 2010, pp. 442-447.

Szymanski, "Internet multicasting of IPTV with essentially-zero delay jitter," Mar. 2009, IEEE Transactions on Broadcasting, vol. 55, No. 1, pp. 20-30.

Szymanski, "Provisioning backhaul traffic flows in TDMA/OFDMA infrastructure Wireless Mesh Networks with near-perfect QoS." Proc. IEEE Sarnoff Symposium, Princeton, NJ, Apr. 12-14, 2010, pp. 1-7.

Szymanski, "Provisioning mission-critical telerobotic control systems over internet backbone networks with essentially-perfect QoS," Jun. 2010, IEEE Journal on Selected Areas in Communications, vol. 28, No. 5, pp. 630-643.

(56) References Cited

OTHER PUBLICATIONS

Vu-Brugier et al., "A critique of recently proposed buffer-sizing strategies," Jan. 2007, ACM SIGCOMM Computer Communication Review, vol. 37, No. 1, pp. 43-47.
USPTO, Notice of Allowance Communication, dated Aug. 29, 2013, in U.S. Appl. No. 13/074,834.
USPTO, Office Action Communication, dated Sep. 30, 2014, in U.S. Appl. No. 14/093,874.
USPTO, Final Office Action Communication, dated Apr. 3, 2015, in U.S. Appl. No. 14/093,874.

* cited by examiner

```
150   Method Add_Flow (label, rate, voqn)
152   global   VOQR;
154   num_flows = VOQR(voqn).num_flows
156   VOQR(voqn).num_flows = num_flows+ 1;
158   VOQR(voqn).list_flows = [VOQR(voqn).list_flows, label];
160   Flow_VOQ(label) = [];
162   VFT(label) = infinity
```

FIG. 8A

```
170   Method Remove_Flow (label, rate, voqn)
172   global   VOQR;
174   num_flows = VOQR(voqn).num_flows;
176   VOQR(voqn).num_flows = num_flows - 1;
178   remove label from the list of flows in VOQR(voqn).list_flows;
180   Flow_VOQ(label) = [];
182   VFT(label) = infinity;
```

FIG. 8B

```
200   Function  FVOQS = Static_Flow_Schedule(rate(1:NF), VOQS)
202   global F, NF;
204   FVOQS = zeros(1,F);
206   SP    = zeros(1,NF);
208   VFT = (infinity)*ones(1,NF);
210   for j = 1:NF
212         if (rate(j) > 0) t
214               VFT(j) = F/rate(j)
216               SP(j) = 1;
218         end;
219   end
220   for ts = 1:F
222         if (VOQS(ts) == 1)
224               [minVFT, flow] = min(VFT(1:NF))
226               if (minVFT < infinity)
228                     FVOQS(ts) = flow;
230                     VFT(flow) = VFT(flow) + F/rate(flow);
232                     if (SP(flow) < rate(flow))
234                           SP(flow) = SP(flow)+1;
236                     else
238                           VFT(flow) = inf;
240                     end
242               end
244         end
246   end
```

FIG. 9A

```
250   Function W = Find_Weight(rate(1:NF), NF)
251   rsum = 0;
252   for j=1:NF
253         if (rate(j) > 0)
254               rsum = rsum + rate(j);
255         end
256   end
257   for flow = 1:NF
258         W(flow) = rate(flow)/rsum;
259   end;
```

FIG. 9B

```
260    Function FVOQS = Static_Flow_Schedule_RealTime(rate(1:NF), VOQS)
262    global F, NF;
264    FVOQS = zeros(1,F);
266    SP    = zeros(1,NF);
268    VFT = (infinity)*ones(1,NF);
270    for j = 1:NF
272        if (rate(j) > 0)
274            VFT(j) = F/rate(j)
276            SP(j) = 1;
278        end;
279    end
280    Rsum = sum(rate(:));
281    for ts = 1:F
282        if (VOQS(ts) == 1)
283            [minVFT, flow] = min(VFT(1:NF))
284            if (minVFT <= ts+X) || (Rsum >= (F-ts-1))
285                FVOQS(ts) = flow;   Rsum = Rsum -1;
286                VFT(flow) = VFT(flow) + F/rate(flow);
287                if (SP(flow) < rate(flow))
288                    SP(flow) = SP(flow)+1;
289                else
290                    VFT(flow) = inf;
292                end
294            end
296        end
298    end
```

FIG. 9C

```
300    Function Dynamic_Add_Packet(flow, voqn)
302    global   F, NF, cVT;
304    global   flow_VOQ, pVFT(F,NP), SP(1,NF), rate(1,NF);
306    pkt = SP(flow) +1;  SP(flow) = pkt;
308    if (flow_VOQ(flow) == 0)
310            pVFT(flow,pkt) = cVT + F/rate(flow);
314    else
316            pVFT(pkt,flow) = pVFT(flow, pkt-1)+ F/rate(flow);
318    end
319    flow_VOQ(flow) = flow_VOQ(flow) + 1;

325    pVFT(flow,pkt) = cRT + F/rate(flow);
```

FIG. 10A

```
330    Function [flow, pkt] = Dynamic_Rem_Packet(voqn)
332    global SP, VOQR,  pVFT, flow_VOQ;
336    flow_list = VOQR(voqn).flow_list;
338    nf = VOQ(VOQ_num).num_flows;
340    minVFT = inf; minf = inf; minpkt = inf;
342    for j = 1:nf
344            flow = flow_list(j);
345            [fvft, pkt] = min(pVFT(flow,:));
346            if (fvft < minVFT)
348                    minVFT = fvft;  minf = flow; minpkt = pkt;
350            end;
352    end
354    if (minVFT < inf)
356            flow = minf;  pkt = minpkt;  pVFT(flow,pkt) = infl;
357            flow_VOQ(flow) = flow_VOQ(flow) -1;
358    else
360            flow = -1; pkt = -1;
362    end                                    370    if (minVFT >= cRT)
                                               372    if (minVFT >= cRT - X)
```

FIG. 10B

```
370  Function  Rand_addpacket(flow, pkt)
372    global    flow_VOQ;

374   flow_VOQ(flow) = [flow_VOQ(flow), pkt]
```

FIG. 11A

```
378  Function [pkt,flow] = Rand_rempacket(voqn)
379  VOQR, flow_VOQ;

380   flow_list = VOQR(voqn).flow_list;
382   num_flows = VOQR(voqn).num_flows;
384   randperm = random_perm(num_flow);
386   for j = 1:num_flows
388       flow = flow_list(randperm(j));
390       if (flow_VOQ(flow) is not empty)
392           pkt = remove head-of-line packet from flow_VOQ(flow)
394           return
395       end
396   end
397   flow = -1; pkt = -1;
```

FIG. 11B $$\begin{pmatrix} 490 & 533 & 563 & 462 \\ 520 & 570 & 462 & 496 \\ 440 & 491 & 574 & 543 \\ 598 & 454 & 449 & 547 \end{pmatrix}$$
FIG. 16A $$\begin{pmatrix} 545 & 534 & 496 & 473 \\ 503 & 519 & 496 & 530 \\ 449 & 531 & 541 & 527 \\ 551 & 464 & 515 & 518 \end{pmatrix}$$
FIG. 16B FIG. 16C. VOQ-Transmission-Schedule

| Time-slot | 1 | 2 | 3 | 4 | 5 | 6 | 7 | 8 |
|---|---|---|---|---|---|---|---|---|
| IP(0) | 3 | 2 | 2 | 1 | 3 | 1 | 2 | 0 |
| IP(1) | 1 | 0 | 3 | 0 | 2 | 0 | 3 | 1 |
| IP(2) | 2 | 3 | 1 | 2 | 1 | 3 | 0 | 2 |
| IP(3) | 0 | 1 | 0 | 3 | 0 | 2 | 1 | 3 |

FIG. 16D. Flows in VOQ(1,1):

| Flow | 5 | 33 | 37 | 49 | 85 | 93 | 97 | 109 | 121 | 125 |
|---|---|---|---|---|---|---|---|---|---|---|
| Rate | 12 | 11 | 1 | 3 | 12 | 7 | 18 | 17 | 2 | 25 |

FIG. 16D. Flows VOQ(1,1) continued.

| Flow | 141 | 157 | 173 | 181 | 189 | 197 | 201 | 225 | 237 | 253 |
|---|---|---|---|---|---|---|---|---|---|---|
| Rate | 3 | 10 | 19 | 22 | 11 | 18 | 27 | 14 | 26 | 21 |

FIG. 16D. Flows in VOQ(1,1) continued:

| Flow | 273 | 281 | 317 | 345 | 353 | 361 | 385 | 405 | 417 | 421 |
|---|---|---|---|---|---|---|---|---|---|---|
| Rate | 24 | 10 | 12 | 9 | 30 | 21 | 27 | 7 | 13 | 13 |

FIG. 16D. Flows in VOQ(1,1) continued:

| Flow | 433 | 489 | 497 |
|---|---|---|---|
| Rate | 6 | 30 | 9 |

FIG. 16E. Flow-Transmission-Schedule

| Time-slot | 1 | 2 | 3 | 4 | 5 | 6 | 7 | 8 |
|---|---|---|---|---|---|---|---|---|
| IP(0) | 413 | 41 | 221 | 429 | 249 | 241 | 500 | 385 |
| IP(1) | 246 | 242 | 386 | 342 | 130 | 194 | 214 | 134 |
| IP(2) | 471 | 499 | 383 | 275 | 67 | 123 | 223 | 11 |
| IP(3) | 2160 | 172 | 312 | 448 | 308 | 144 | 32 | 488 |

| LABEL IN | LABEL OUT | OP-PORT | RATE |
|---|---|---|---|
| 27 | 103 | 1 | 45 |
| 415 | 276 | 2 | 30 |
| 130 | 314 | 1 | 25 |
| 94 | 760 | 1 | 35 |
FIG. 17A
| LABEL IN | LABEL OUT | OP-PORT | RATE |
|---|---|---|---|
| 27 | 103 | 1 | 45 |
| 415 | 276 | 2 | 30 |
| 130 | 103 | 1 | 25 |
| 94 | 103 | 1 | 35 |
FIG. 17B
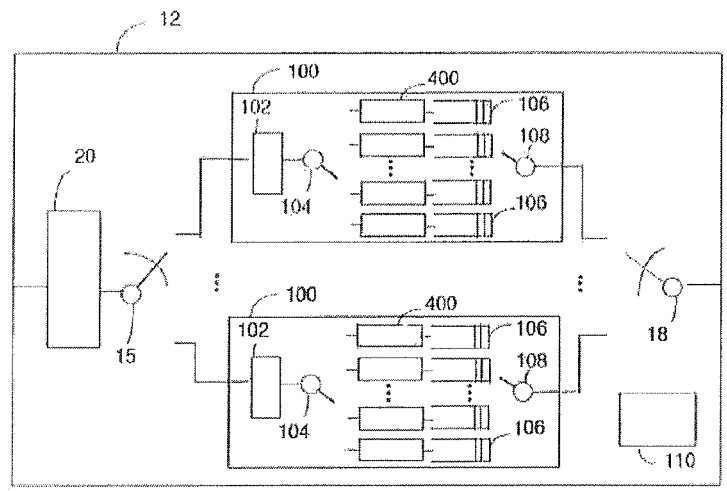
FIG. 17C
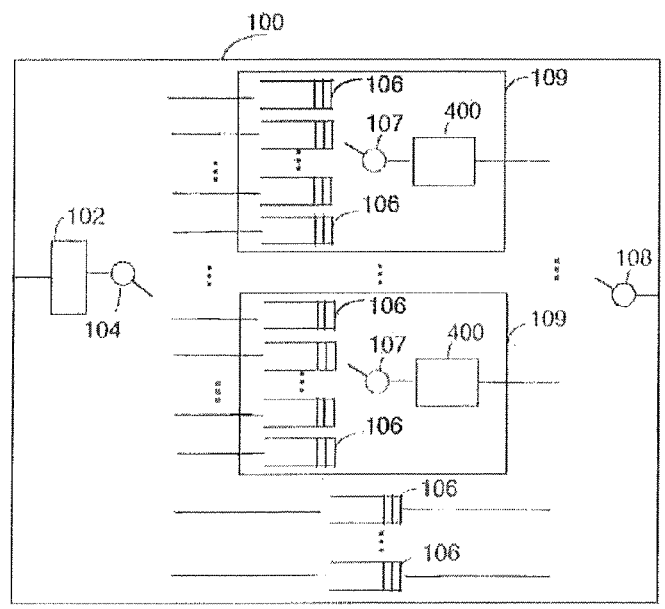
FIG. 17D

METHOD TO ACHIEVE BOUNDED BUFFER SIZES AND QUALITY OF SERVICE GUARANTEES IN THE INTERNET NETWORK

CROSS-REFERENCE TO RELATED APPLICATIONS

This application is a continuation of U.S. application Ser. No. 14/093,874 filed on Dec. 2, 2013, which is a continuation of U.S. application Ser. No. 13/074,834 filed on Mar. 29, 2011, which claims priority from the benefit of the filing date of U.S. Provisional Application No. 61/318,663 filed on Mar. 29, 2010, entitled "METHOD TO ACHIEVE BOUNDED BUFFER SIZES AND QUALITY OF SERVICE GUARANTEES IN THE INTERNET NETWORK"; the contents of which are hereby incorporated by reference.

FIELD OF THE INVENTION

The present invention relates generally to communications networks, devices and methods, and more particularly to methods to achieve bounded buffer sizes and mathematically provable Quality of Service (QoS) guarantees in packet switched networks, including the Internet Protocol (IP) network, ATM networks, MPLS networks, optical networks and wireless mesh networks. These bounds and strict QoS guarantees hold even when the network is operated at 100% of capacity.

BACKGROUND OF THE INVENTION

Articles Incorporated by Reference

The following documents are hereby incorporated by reference. These documents may be referred to by their title or by their numeric value.

[1] A. K. Parekh and R. G. Gallager, "A Generalized Processor Sharing Approach to Flow Control in Integrated Service Networks: the Single Node Case", IEEE/ACM Trans. Networking, vol. 1, pp. 344-357, 1993.
[2] A. K. Parekh and R. G. Gallager, "A Generalized Processor Sharing Approach to Flow Control in Integrated Service Networks: the Multiple Node Case", IEEE/ACM Trans. Networking, vol. 2, no. 2, pp. 137-150, 1994.
[3] A. Leon-Garcia and I. Widjaja, "Communication Networks, Fundamental Concepts and Key Architectures", second Edition, McGraw Hill, 2004.
[4] US patent, J. W. Marshal et al, "Supplemental queue sampling technique for packet scheduling", U.S. Pat. No. 7,640,355, December 2009.
[5] L. G. Roberts, "A Radical New Router", IEEE Spectrum, July 2009.
[6] C. E Koksal, R. G. Gallager, C. E. Rohrs, "Rate Quantization and Service Quality over Single Crossbar Switches", IEEE Infocom Conference, 2004.
[7] I. Keslassy, M. Kodialam, T. V. Lakshman and D. Stiliadis, "On Guaranteed Smooth Scheduling for Input-Queued Switches", IEEE/ACM Trans. Networking, Vol. 13, No. 6, December 2005.
[8] W. J. Chen, C-S. Chang, and H-Y. Huang, "Birkhoff-von Neumann Input Buffered Crossbar Switches for Guaranteed-Rate Services", IEEE Trans. Comm., Vol. 49, No. 7, July 2001, pp. 1145-1147.
[9] S. R. Mohanty and L. N. Bhuyan, "Guaranteed Smooth Switch Scheduling with Low Complexity", IEEE Globecom Conference, 2005, pp. 626-630
[10] S. Iyer, R R. Kompella, N. Mckeown, "Designing Packet Buffers for Router Linecards", IEEE Trans. Networking, Vol. 16, No. 3, June 2008, pp. 705-717
[11] R. S. Prasas, C. Dovrolis, M. Thottan, "Router Buffer Sizing for TCP Traffic and the Role of the Output/Input Capacity Ratio", IEEE Trans. Networking, 2009.
[12] Y. Ganjali, N, McKeown, "Update on Buffer Sizing in Internet Routers", ACM Sigcomm Comp. Comm. Rev., pp. 67-70, October 2006.
[13] G. Appenzeller, I. Keslassy and N. McKeown, "Sizing router buffers", ACM Sigcomm Comp. Comm. Rev., USA, pp. 281-292, 2004.
[14] G. Raina and D. Wishick, "Buffer sizes for large multiplexers: TCP queueing theory and instability analysis", EuroNGI, Italy, April 2005.
[15] M. Enachescu, Y. Ganjali, A. Goel, N. McKeown, T. Roughgarden, "Routers with very small buffers", IEEE Infocom Conference, Spain, April 2006.
[16] A. Dhamdhere and C. Dovrolis, "Open Issues in Router Buffer Sizing", ACM/SIGCOMM Comp. Comm. Rev., vol. 36, no. 1, pp. 87-92, January 2006.
[17] G. Vu-Brugier, R. S. Stanojevic, D. J. Leith, and R. N. Shorten, "A Critique of recently proposed buffer sizing strategies", ACM/SIGCOMM Comp. Comm. Rev., vol. 37, no. 1, pp. 43-47, May 2007.
[18] T. H. Szymanski, "A Low-Jitter Guaranteed Rate Scheduling Algorithm for Packet-Switched IP Routers", IEEE Trans. Communications., Vol. 57, No. 11, November 2009, pp. 3446-3450.
[19] T. H. Szymanski, "Bounds on the End-to-End Delay and Jitter in Input-Buffered and Internally Buffered IP Networks", IEEE Sarnoff Symposium, Princeton, N.J., April 2009.
[20] T. H. Szymanski and D. Gilbert, "Internet Multicasting of IPTV with Essentially-Zero Delay Jitter", IEEE Trans. Broadcasting, Vol. 55, No. 1, March 2009, pp. 20-30.
[21] T. H. Szymanski and D. Gilbert, "Provisioning Mission-Critical Telerobotic Control Systems over Internet Backbone Networks with Essentially-Perfect QoS", IEEE JSAC, Vol. 28, No. 5, June 2010.
[22] T. H. Szymanski, "Scheduling of Backhaul Traffic Flows in TDMA/ODFMA Infrastructure Wireless Mesh Networks with Near-Perfect QoS", IEEE 2010 Sarnoff Symposium, Princeton University, NJ, April 2010.
[23] T. H. Szymanski, "A Low-Jitter Guaranteed-Rate Scheduling Algorithm for Crosspoint Buffered Switches", IEEE 2009 Pacific Rim Conference on Computers, Communications and Signal Processing, August 2009, Victoria BC.
[24] T. H. Szymanski, "Conflict-Free Low-Jitter Guaranteed-Rate MAC Protocol for Base-Station Communications in Wireless Mesh Networks", 2008 Int, Conf. on Access Networks (ACCESSNETS-08), Las Vegas, October 2008. Also in Springer ACCESSNETS—Lectures Notes in Computer Science LNICST 6, 2009, pp. 118-137.
[25] T. H. Szymanski, "Bounds on Memory Requirements in Internet Routers", submitted, IEEE Globecom conference, 2010.
[26] D. Bertsekas and R. Gallager, 'Data Networks", 2nd edition, Prentice Hall.

The closely-related issues of buffer sizing and QoS guarantees in the Internet network have been studied extensively in the literature. Unfortunately, to date the there are no proven techniques to achieve small and bounded buffer sizes in Internet network routers, except for a special case of ideal output queued routers using the Weighted Fair Queueing scheduling algorithm. To date there are no techniques to achieve strict guarantees on the Quality of Service (QoS) for multiple traffic flows or multiple classes of traffic flows in the Internet network, except for a special case of ideal output queued routers using the Weighted Fair Queueing scheduling algorithm. To date there are no proven techniques to enable practical networks to operate at essentially 100% of their capacity, while maintaining small and bounded buffer sizes in the routers and meeting strict QoS guarantees.

The Generalized Processor Sharing/Weighted Fair Queueing (GPS/WFQ) scheduling algorithm is described in the paper [1] by A. K. Parekh and R. G. Gallager, entitled "A Generalized Processor Sharing Approach to Flow Control in Integrated Service Networks: the Single Node Case", IEEE/ACM Trans. Networking, 1993. The GPS/WFQ method is also described in the paper [2] by A. K. Parekh and R. G. Gallager, entitled "A Generalized Processor Sharing Approach to Flow Control in Integrated Service Networks: the Multiple Node Case", IEEE/ACM Trans. Networking, 1994.

Recently, the original designers of the Internet have argued that The Internet is Broken, i.e., the current Internet routers are too slow, they consume too much power, and they offer poor QoS [5]. The following quote from [5] illustrates the problem:

"(users) enjoy those services only because the Internet has been grossly over-provisioned. Network operators have deployed mountains of optical communication systems that can handle traffic spikes, but on average these run much below their full capacity . . . . So although users may not perceive the extent of the problem, things are already dire for many Internet service providers and network operators. Keeping up with bandwidth demand has required huge outlays of cash to build an infrastructure that remains underutilized. To put it another way, we've thrown bandwidth at a problem that really requires a computing solution."

Over the last few years, the issue of buffer sizing in IP routers has been debated in the ACM Computer Communications Review [11]. A classic design rule called the 'Bandwidth-Delay Product rule' states that each link in each IP router requires a buffer of $B=O(C*T)$ bits, where C is the link capacity and T is the round-trip time of the flows traversing the link [15]. According to data in [15], a 40 Gbps link handling TCP flows with a round-trip time of 250 millisec requires a buffer size B of about one million IP packets. In practice, IP packets may contain up to 1,500 bytes, and therefore a buffer for a 40 Gbps link may require several Gigabytes of expensive high-speed memory, which consumes significant power.

A 'small buffer rule' was proposed in [15], where $B=O(CT/N^{(1/2)})$ and where N is the number of long-lived TCP flows traversing the router. With the same parameters reported above, the buffer size B is reduced to about fifty thousand IP packets [15]. [15] also proposed a 'Tiny Buffer rule' where $B=O(\log W)$, where W is the maximum TCP congestion window size. With the same parameters, it was postulated that average buffer sizes of between 20-50 IP packets or equivalently about 30K-75K bytes of memory may suffice if 3 conditions can be met; (a) the jitter of incoming traffic at the source node is sufficiently small, (b) the IP routers introduce a sufficiently small jitter, and (c) 10-20% of the current throughput is sacrificed. The paper [15] however did not propose a low-jitter scheduling algorithm, which was in itself a major theoretical unsolved problem. Furthermore, [16,17] have argued that small buffers may cause significant losses, instability or performance degradation at the application layer.

There are a number of problems with the small buffer rule in [15]. First, the buffers can be quite large, and there is no proof that the buffer sizes are bounded. Without any strict upper bounds on buffer sizes, a manufacturer of routers will have to build routers with unnecessarily large buffers, to handle the worst-cases buffer sizes that may be encountered. Second, the small-buffer rule does not offer any strict Quality of Service guarantees for any traffic flows. It does not address the Quality of Service problem. Third, it offers no solution to the fact that current networks are over-provisioned to achieve reasonable QoS. In other words, it does not offer any means to operate networks at nearly 100% of their capacity and achieve QoS guarantees. Current Internet links operate at a small fraction of their peak capacity. Finally, it does not propose a low-jitter scheduling algorithm for the switches or routers, which has been a major theoretical unsolved problem in the literature for several years.

Many new services are being developed for the Internet. New services such as telerobotically-assisted surgery require that a surgeon at one location controls a medical robot at a remote location over a network. Such new services may present a risk to human lives if the network cannot provide strict QoS guarantees. Therefore these new services will require strict QoS guarantees which existing Internet networks cannot provide.

A quote from a recent 2009 journal article on buffer-sizing [11] further illustrates the problem:

"the basic question—how much buffering do we need at a given router interface?—has received hugely different answers in the last 15 to 20 years, such as 'a few dozens of packets', 'a bandwidth-delay product', or 'a multiple of the number of large TCP flows in that link.' It cannot be that all these answers are right. It is clear that we are still missing a crucial piece of understanding despite the apparent simplicity of the previous question."

In summary, today's Internet routers are based on complex designs, they are large, costly and consume great deals of power. They are based largely in heuristic algorithms for scheduling. As a result, they cannot provide any strict QoS guarantees, they cannot operate at 100% of capacity, and they rely upon significant over-provisioning to provide reasonable Quality of Service. The current Internet functions because the backbone networks have been significantly over-provisioned, to accommodate spikes in traffic.

It has recently been estimated that the inefficient use of Internet resources such as link bandwidth and router buffers results in excess operating costs of several hundred million dollars per year. It has also been estimated that the Internet is contributing a noticable percentage of all worldwide greenhouse gasses, thereby contributing to Global Warming and Climate Change.

In this paper, we present methods to achieve strict (i.e., mathematically provable) bounds on router buffer sizes and guarantees for the QoS of provisioned traffic flows in a packet switched network. A provisioned traffic flow is assigned to one or more paths through the network, where sufficient bandwidth has been allocated (provisioned) for the flow on each link in each path(s). The bounds on the router buffer sizes and QoS guarantees can hold even when network links are operated at 100% of their capacity, i.e., in practice links in the network can be operated at close to 100% of its peak capacity. The bounds apply to general networks, including Internet Protocol (IP) and hierarchical IP networks, ATM networks, MPLS networks, IP networks using the Integrated Services (IntServ) or Differentiated Services (DiffServ) service models, optical networks and wireless mesh networks. The routers can require several orders of magnitude less buffers compared to current router designs, i.e., buffer memory use in routers can potentially be reduced by factors of 100 to 10,000 or more. Routers will cost less to build, they will be smaller, they will have higher performance and higher energy efficiency. Network links using these methods can operate at essentially 100% of their peak capacity, and there is no need for significant over-provisioning to achieve QoS guarantees. These methods can make all-optical packet switched networks which operate at nearly 100% of capacity with QoS guarantees viable, since the amount of buffering feasible in an all-optical router is limited to a very small number of packets, for example 10-20 packet buffers per input port or output port.

Switches are important components of Internet Protocol (IP) routers, optical routers, wireless routers, ATM and MPLS switches, computing systems and many other systems.

The textbook [3] by A. Leon-Garcia and I. Widjaja, entitled "Communication Networks, Fundamental Concepts and Key Architectures", second Edition, McGraw Hill, 2004, describes several terms, including Internet Protocol (IP) networks, MPLS networks, the Integrated Services and Differentiated Services models, the RSVP protocol, and ATM networks. The Internet carries variable-size Internet Protocol (IP) packets, which typically vary in size from 64 bytes up to a maximum of 1500 bytes. These packets are typically buffered in the switches and routers, and the amount of buffers required in a typical router or switch can be very large. The buffers are typically organized into one of three basic queuing schemes, the Input-Queued (IQ) Switches, the Output-Queued (OQ) switches, and the Crosspoint Queued (XQ) switches. Combinations of these queuing scheme are also used.

Input-Queued switches typically buffer packets at the input side of the switch. The packets are scheduled for transmission through the switch to the output side. The transmission from the input side to the output side may be accomplished using a slotted or unslotted switch. In a slotted switch, a variable-size packet at the input size is first segmented into small fixed-sized packets called 'cells'. The cells are scheduled and transmitted through the switch to the output side, where the original variable-size packet may be reconstructed. A slotted switch operates in discrete time-slots, where a time-slot has sufficient duration to transmit a cell from the input side to the output side. In contrast, in an unslotted switch the variable-size packet is transmitted through the switch directly, without segmentation.

Our designs will apply to both slotted and unslotted switches.

An Output Queued switch places the buffers at the output side of the switch. If multiple packets arrive simultaneously and if they all have the same desired output port, then the switch must have an internal 'speedup' to be able to deliver multiple packets to one output port simultaneously. Speedup requires a higher memory bandwidth at the output side of the switch than necessary, which increases the cost of the switch and limits its practicality. Large OQ switches are considered impractical.

A Crosspoint Queued switch places the buffers or queues within the switching matrix. There are typically N-squared crosspoints within the switching matrix, and each crosspoint contains a queue with the capacity to store one or more packets. Crosspoint queued switches are easier to schedule than input queued switches, but they incur a cost of N-squared buffers within the switching matrix, which will increase the cost of the switching matrix. It is well known that the cost of a silicon integrated circuit is related to the VLSI area of the circuit, and the N-squared buffers will add a significant area requirement, which will increase cost.

Combinations of these basic buffering schemes are possible, for example Combined Input and Crosspoint Queued switches, and Combined Input and Output Queued switches. The methods to be presented in this paper apply to all these switch designs.

A necessary condition to guarantee bounded queue sizes and near-perfect QoS for a selected traffic flow in a packet-switched network, regardless of the mean rate of the traffic flow, is the concept of a bounded 'Normalized Service Lead/Lag', here after denoted NSLL, which is defined in detail later in this document. Informally, the NSLL represents how much service a traffic flow has received, relative to the same flow receiving perfectly scheduled service. A positive NSLL indicates that the flow has received more service than the perfectly-scheduled flow. A negative NSLL indicates that the flow has received less service than the perfectly scheduled flow.

The proposed methods to achieve bounded router buffer sizes and strict QoS guarantees are a combination of techniques. First, each application-layer traffic flow entering the network may be shaped at the source node using an 'Application-Specific Traffic Shaper' or ASTS module. This ASTS module will accept bursty application-layer packets, and it will generate a stream of smooth network-layer packets which are injected into the network with a bounded NSLL. Each provisioned traffic flow is assigned to one or more paths through the network, and sufficient bandwidth should be allocated (provisioned) for each flow on each link in each path. Second, routers may use a switch-scheduling method which achieves a bounded NSLL for the traffic leaving the output ports of the switch. (Some routers may use switch scheduling methods which do not achieve a bounded NSLL, but some routers should re-shape the traffic to achieve a bounded NSLL at least periodically.) Third, the switch may use a flow-scheduling method to schedule each individual provisioned traffic flow, to achieve a bounded NSLL for each provisioned traffic flow departing the switch. (Some routers may use flow-scheduling methods which do not achieve a bounded NSLL, but some routers should re-shape the traffic flows to achieve a bounded NSLL on each flow, at least periodically.) Fourth, the bursty application-layer traffic flows may be reconstructed in 'Application-Specific Playback Queue' (ASPQ) modules at their destinations, to regenerate the original bursty application-layer traffic flows with strict QoS guarantees. Under these combination of conditions, it can be proven that a provisioned traffic flow can buffer as few as O(K) packets per router [18,19], where K is an integer equal to the bound on the NSLL. (The bound of O(K) buffers per flow per router will be achieved if every router achieves the bounds on the NSLL.) It can also be proven that every flow can achieve strict Quality of Service guarantees [18,19]. A bursty application-layer traffic flow can be regenerated at the destination node and can receive strict QoS guarantees, where it can achieve a near-minimal normalized end-to-end delay, a very low packet loss rate, and a very low network-introduced delay jitter. (The normalized end-to-end delay of a flow is defined as the end-to-end delay of the flow, dividing by the mean time between packets in a perfectly scheduled transmission for the flow.)

The proposed methods are in contrast to some methods currently in use in the Internet. In the current Internet, most links and switches are scheduled so that any excess capacity on a link is exploited by traffic flows which have queued packets awaiting transmission. Consider the US patent [4] by J. W. Marshal et al, entitled "Supplemental queue sampling technique for packet scheduling", U.S. Pat. No. 7,640,355, December 2009. This patent describes a technique in which the 'excess capacity' of a link is allocated to traffic flows which have queued packets, to improve the utilization of a link. Rather than having a link remain idle, these flows can receive extra service, to use up the excess capacity of the link and improve the link's utilization. The difficulty with this approach is that it violates the property of the bounded NSLL of a traffic flow. A flow may receive more service than a perfectly scheduled flow, for some period of time. Once this property of a bounded NSLL is violated for one flow, it may be violated for other flows, as the flows do interfere with each other. The network can quickly deteriorate to the case where all flows have lost the property of a bounded NSLL. Therefore, one cannot bound the sizes of the router buffers in the Internet. Packets may be dropped at routers due to buffer overflow. One cannot provide strict Quality of Service guarantees, and one cannot operate the network at 100% of its capacity, due to the large queue sizes within the routers and the possibility of router buffer overflow. To achieve the three desired goals of bounded router buffer sizes, strict QoS guarantees and the ability to operate a network link at nearly 100% of its capacity, the approach to utilize excess capacity on a link by offering extra service to traffic flows should not be used excessively, since it may increase the NSLL. Alternatively, if this bandwidth-sharing approach is used extensively, some routers should periodically re-shape traffic flows to achieve a bounded NSLL.

SUMMARY OF THE INVENTION

A method to achieve bounded router queue sizes and strict Quality of Service guarantees for provisioned application-layer traffic flows in a packet-switched network are described. In one embodiment, the network can be a packet-switched Internet Protocol (IP) network. In another embodiment, the IP network can use the Integrated Services or Differentiated Services models. In another embodiment, the network can be a packet-switched MPLS network. In another embodiment, the network can be an all-optical packet-switched network. In another embodiment, the network can be a packet-switched wireless mesh network. The switches or routers in the network can use any combination of queueing disciplines, for example Input Queueing, possibly in combination with crosspoint queueing and/or output queueing. An 'Application-Specific Traffic Shaper' module can be used to shape a potentially-bursty application-layer traffic flow at the traffic source node, to generate a stream of network-layer packets. The network-layer packets associated with the application-layer traffic flow are injected into the network with a bounded normalized service lead/lag. One or more end-to-end paths through the network may be provisioned for each traffic flow. Sufficient bandwidth should be allocated for the traffic flow on links in each path. An 'Application-Specific Playback Queue' module may be used at each destination node, to regenerate the original potentially-bursty application-level traffic flows at every destination, with strict Quality of Service guarantees. A switch scheduling algorithm with a bounded normalized service lead/lag may be used to schedule the transmission of the provisioned traffic flows through some or all switches or routers. Some or all switches or routers may use a flow-scheduling algorithm to schedule the transmission of the provisioned traffic flows, so that the network-layer packets associated with each provisioned traffic flow will depart from the switch or router with a bounded normalized service lead. Under this combination of conditions, it can be shown that a provisioned application-layer traffic flow can buffer O(K) packets per router, where K is the bound on the normalized service lead/lag. By controlling the NSLL of traffic flows or traffic classes, the amount of buffering required in an Internet router or an MPLS switch can be reduced by several orders of magnitude, i.e., potentially by factors of 100-10,000 or more, compared to current router technology. The method in which provisioned traffic flows are selected for service within a switch or router can have a significant impact on the buffer sizes and the end-to-end performance. Three flow-scheduling methods are defined and analysed. Work-conserving flow-scheduling methods can guarantee a bounded normalized service lead/lag, while non-work-conserving flow-scheduling methods typically cannot make such guarantees. To ensure a bounded normalized service lead/lag, the flow-scheduling method should not be work-conserving. To further reduce buffer requirements, aggregated traffic flows are considered. Each aggregated end-to-end traffic flow can buffer O(K) packets per router, in addition to O(K) packet buffers per flow at the aggregation or dis-aggregation node. In another embodiment, the network can support multiple prioritized traffic classes, compatible with the IP Integrated Services and Differentiated Services models. Each class of traffic requires O(K) packet buffers per router.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

7B shows another embodiment of an Input Port with Flow-VOQs for traffic flows with bounded buffer sizes and QoS guarantees.

FIGS. 8A and 8B show two methods Add_Flow and Remove_Flow.

FIG. 9A shows a method Static_Flow_Schedule, for computing a flow-transmission-schedule for a VOQ with bounded buffer sizes and QoS guarantees. FIG. 9B shows a method Find Weight. FIG. 9C shows a slightly modified method Static_Flow_Schedule_RealTime, for computing a flow-transmission-schedule for a VOQ with bounded buffer sizes and QoS guarantees.

FIGS. 10A and 10B show two methods, Dynamic_Add_Packet, and Dynamic_Remove_Packet, used in a method to dynamically schedule the traffic flows in a VOQ with bounded buffer sizes and QoS guarantees.

FIGS. 11A and 11B show two methods Rand_Add_Packet and Rand_Rem_Packet, used in a method to randomly schedule the traffic flows in a VOQ.

FIGS. 12A, 12B, 12C, 12D, 12E and 12F illustrate the performance of the method Static-Flow-Schedule from FIG. 9.

FIGS. 13A, 13B, 13C, 13D, 13E and 13F show performance of the methods to dynamically schedule flows from FIG. 10.

FIGS. 14A, 14B, 14C, 14D, 14E and 14F illustrate the performance of the methods to randomly schedule flows from FIG. 11.

FIGS. 15A, 15B, 15C, 15D, 15E and 15F illustrate the performance of the methods to randomly schedule flows, when the traffic injected into the network has a larger bound on the normalized service lead/lag, equal to plus or minus 20 packets.

FIGS. 16A, 16B, 16C, 16D and 16E show a traffic matrix, a VOQ-transmission-schedule, and a flow-transmission-schedule, for an input queued switch.

FIGS. 17A and 17B shows routing tables for combining (aggregating) traffic flows.

FIG. 17C shows an Input Port which includes traffic shapers.

FIG. 17D shows an Input Port, which includes aggregation modules.

Figure 18A:
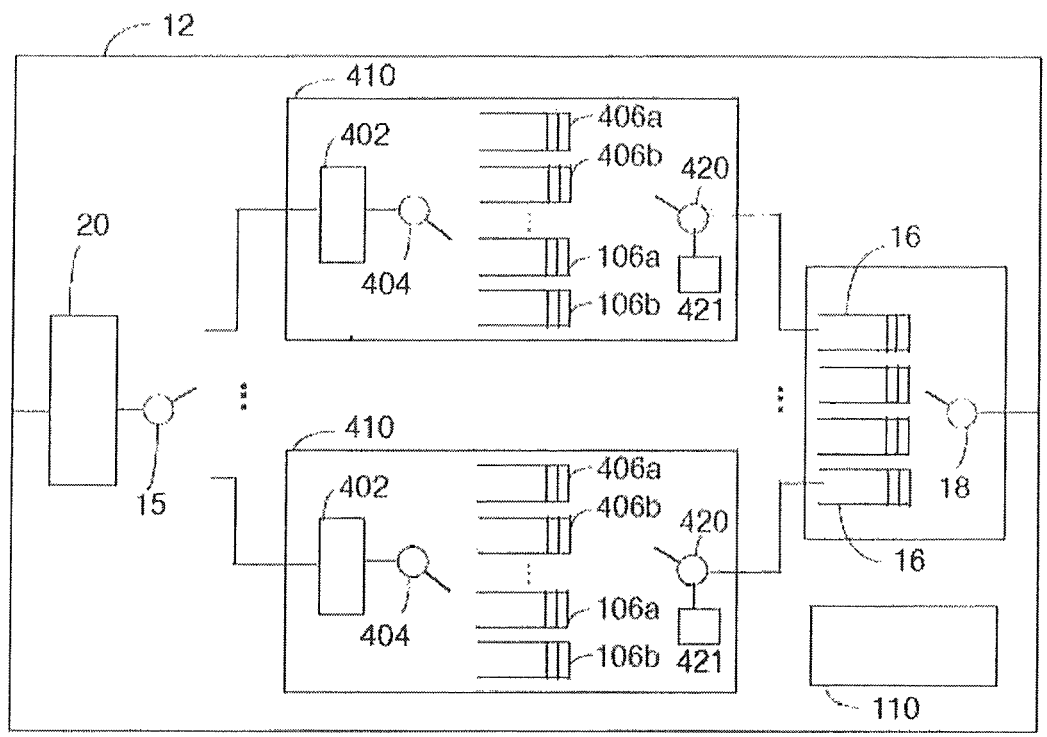

FIG. 18A shows an Input Port which supports traffic classes and traffic flows for QoS-enabled traffic, each with bounded buffer sizes and QoS guarantees.

Figure 18B:
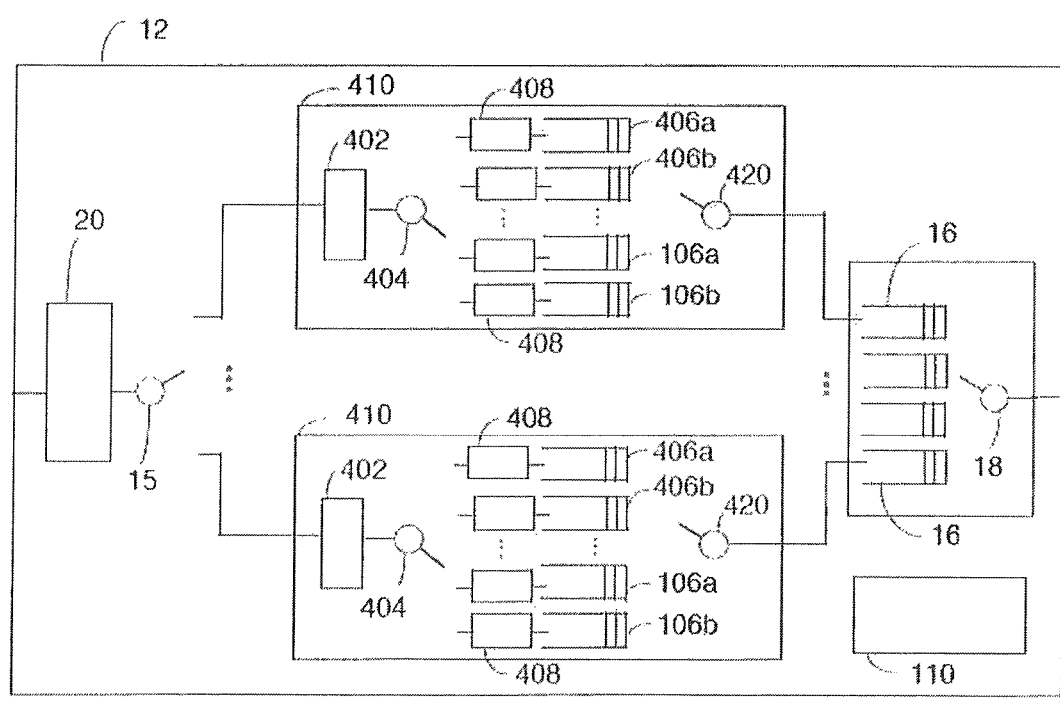

FIG. 18B shows an Input Port which supports traffic classes and traffic flows for QoS-enabled traffic, with the addition of token bucket traffic shapers to regulate the NSLL of the traffic classes and traffic flows.

Figure 19A:
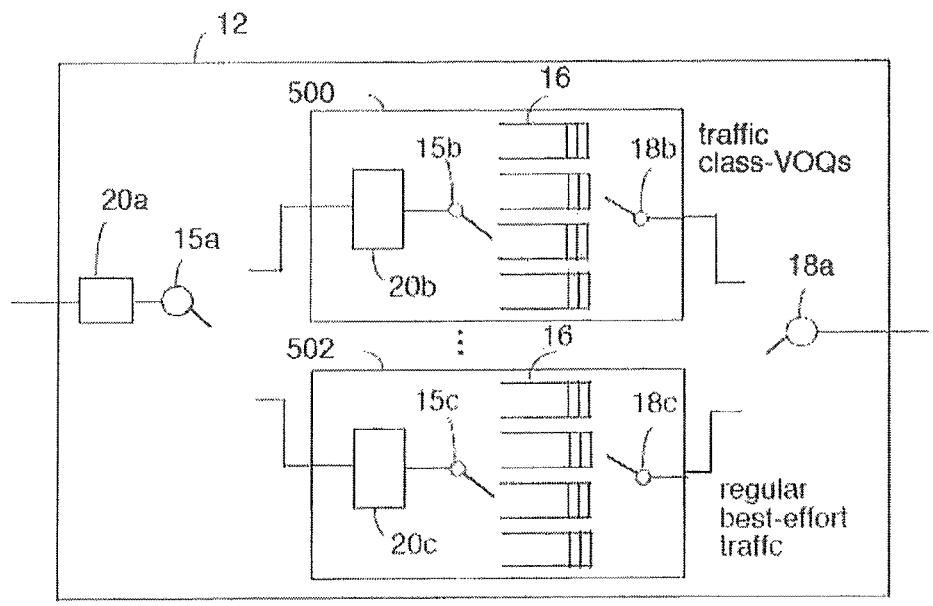

FIG. 19A illustrates an Input Port which supports QoS-enabled traffic with QoS guarantees, which can co-exist with regular Best-Effort Internet traffic.

Figure 19B:
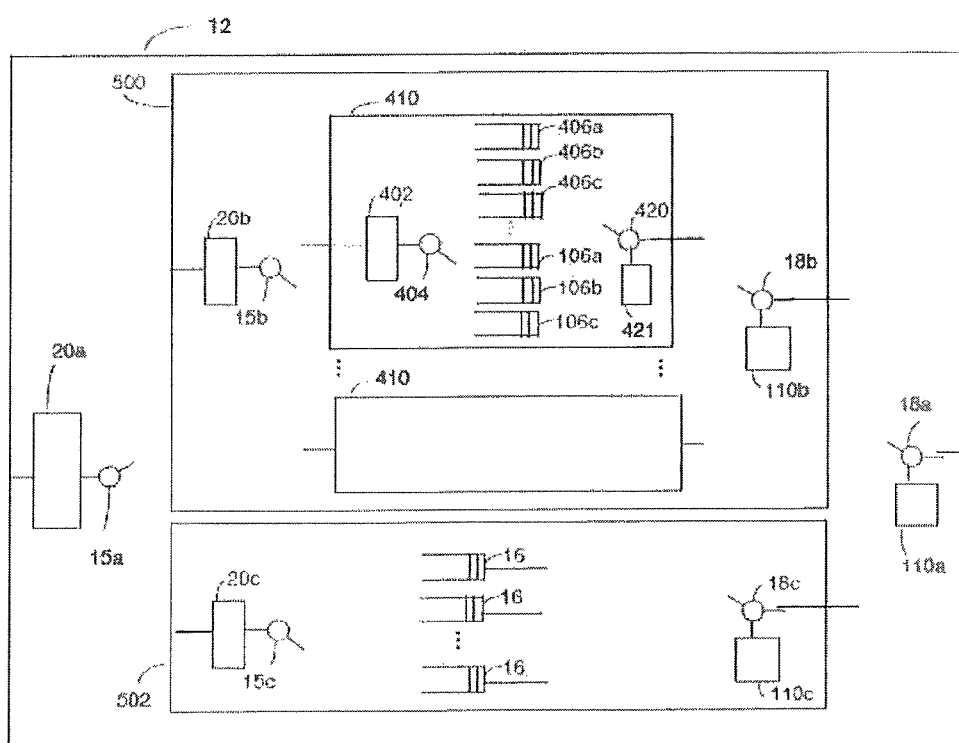

FIG. 19B illustrates the Input Port from FIG. 19A, in more detail.

DETAILED DESCRIPTION

Basic Switch Designs

Figure 1A:
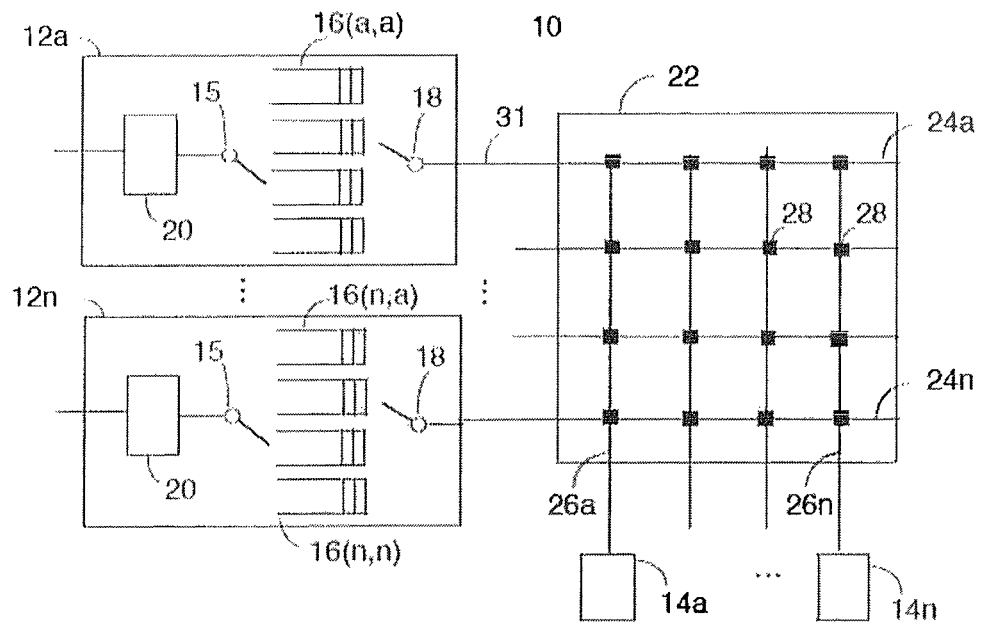
FIG. 1A shows an Input Queued IQ switch system.

FIG. 1A illustrates a conventional Input queued (IQ) switch 10. IQ Switch 10 has N input ports 12a, 12b, ..., 12n on the left side, herein collectively and individually referred to as input ports 12. IQ Switch 10 has N output ports 14a, 14b, ..., 14n on the bottom, herein collectively and individually referred to as output ports 14. In general the switch may have N input ports and M output ports. Each input port 12 has a router module 20, a VOQ demultiplexer switch 15, N Virtual Output Queues (VOQs) 16, and a VOQ multiplexer switch 18. The VOQ-demultiplexer switch 15 is also called a VOQ-demultiplexer 15. The VOQ multiplexer switch 18 is also called a VOQ-server 18.

The switch 10 can use variable-size or fixed-sized packets. Each incoming packet of data contains destination information in its header. The routing module 20 processes each incoming packet, to determine the appropriate output port 14 of the switch 10. In an Internet Protocol (IP) network, the routing module 20 may process IP packet headers, for example IPv4 or IPv6 packet headers, to determine the output port. An IP network can use several service models, such as the integrated Services and Differentiated Services models. In these models, the routing module 20 may examine IP packet headers to identify packets which are handled by these models, and to determine the output port. In an MPLS network, the routing module 20 may process the MPLS packet headers to identify the desired output port 14 of the switch 10. The Routing Module 20 controls the VOQ-demultiplexer 15 through a control signal (not shown), to forward the incoming packet into the appropriate VOQ 16 associated with the desired output port 14. The routing module 20 may also perform traffic policing functions. Traffic policing functions are described in [3].

Let the N VOQs 16 at each input port 12$j$ be denoted VOQ 16 $(j,k)$, for input ports $1<=j<=N$ and output ports $1<=k<=N$, herein collectively and individually referred to as VOQs 16. Each VOQ 16$(j,k)$ stores all the packets at input port 12$j$ which are destined for output port 14$k$. Switch 10 also includes an N×N 'switching matrix 22. The switching matrix 22 contains N-squared crosspoints 28, at the intersection of each row 24 and column 26. A programmable ON-OFF crosspoint switch exists at each crosspoint (not shown in FIG. 1A), to connect a row 24 to a column 26. When the crosspoint switch $(j,k)$ is enabled, a cell which is transmitted by input port 12$j$ on a row 24$j$ will appear at on column 24$k$ and output port 14$k$. The switching matrix 22 is typically implemented on one or more VLSI integrated circuits which typically reside on one or more printed circuit boards, which in turn reside in a rack or cabinet of electronic equipment (not shown in FIG. 1A). Links 31 connect the input ports 12 to the switching matrix 22.

Figure 1B:
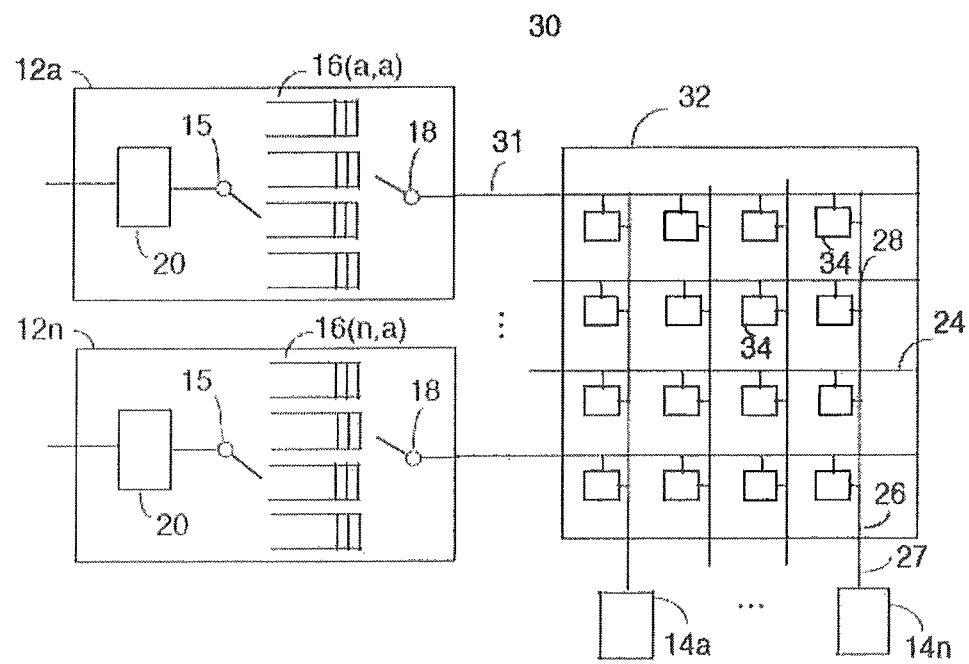
FIG. 1B shows a Combined Input and Crosspoint Queued (CIXQ) switch system.

FIG. 1B illustrates a simplified model of a combined input and crosspoint queued (CIXQ) switch 30. CIXQ switch 30 has N input ports 12 and N output ports 14, and a switching matrix 32. Each input port 12 has a routing module 20, a VOQ-demultiplexer switch 15, up to N Virtual Output Queues (VOQs) 16, and a VOQ-multiplexer switch 18, also called a VOQ-server 18. Each crosspoint 28 in the switching matrix 32 has an associated crosspoint queue 34, denoted as XQ 34, capable of storing one or more packets or cells of data. During an interval of time, an input port 12$j$ can transmit one packet of data from one VOQ 16$(j,k)$, over the transmission line 31$j$ to the switching matrix 32. The packet will be directed into the appropriate XQ 34 in row 24$j$ by logic (not shown in FIG. 1B). Similarly, during an interval of time, each column 26$k$ of the switching matrix can transmit one packet of data from one non-empty XQ 34 in column 26$k$, over the outgoing transmission line 27$k$ to the output port 14$k$.

Figure 1C:
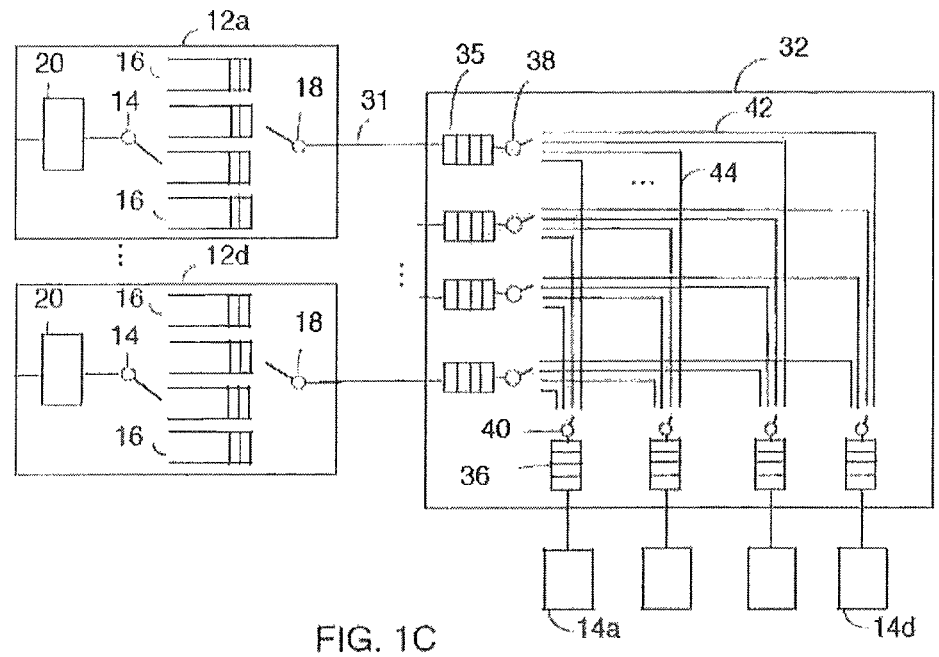
FIG. 1C shows a Combined Input-Input and Output Queued (CIIOQ) switch system.

FIG. 1C illustrates a switch using combined input and output queueing, denoted the CIIOX switch since it has 2 levels of input queues, each of which must be scheduled. The input ports 12 have the same structure as shown in FIG. 1A. The switching matrix 32 consists of internal input queues 35 and internal output queues 36. Each input port 12 has an associated internal input queue 35 within the switching matrix 32. Packets are sent from the input ports 12 to the internal input queues 35. Therefore, there are two levels of input queues, and transmissions from each level of input queue should be scheduled. Each output port 14 has an associated internal output queue 36 within the switching matrix 32. Each internal input queue 34 has an input-demultiplexer 38. Each internal output queue has an associated output multiplexer 40. The input demultiplexers 38 and the output multiplexers 40 must be scheduled to move packets from the internal input queues 34 to the internal output queues 36. Limited speedup can be introduced to the switching matrix 32 to simplify this scheduling if desired. For example, the internal input queues 34 may be able to remove 2 packets simultaneously per time-slot, or the internal output queues 36 may be able to receive up to 2 packets simultaneously per time-slot.

Figure 1D:
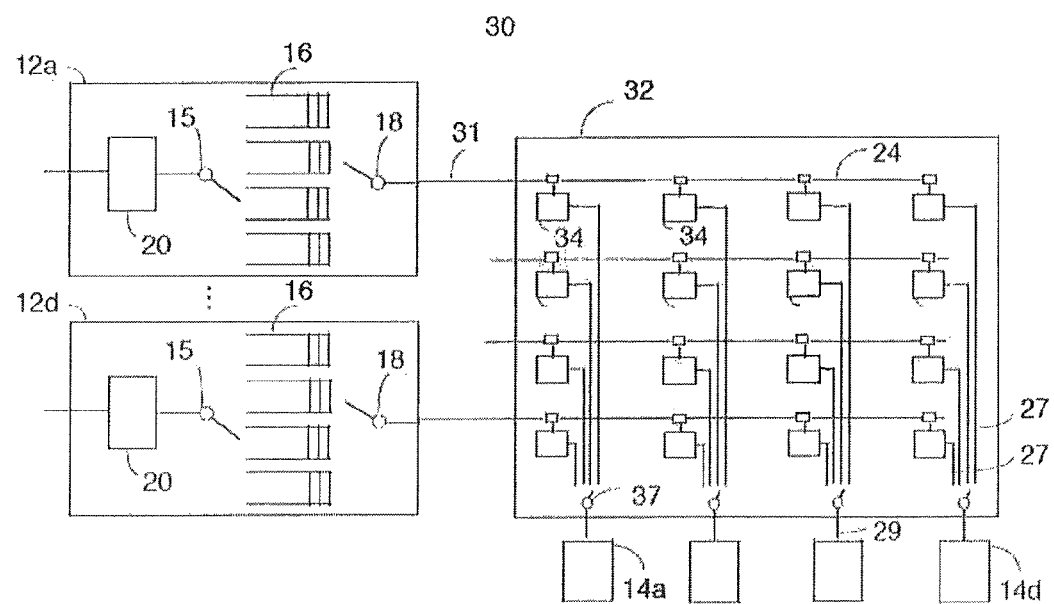
FIG. 1D shows a CIXQ switch system in more detail.

FIG. 1D illustrates a more detailed view of a CIXQ switch shown in FIG. 1B. The input ports 12 have the same structure as shown in FIG. 1A, where each input port 12 is associated with one row 24 of the switching matrix. The switching matrix 32 consists of N rows 24. A packet transmitted from an input port 12j and is delivered to the desired XQ 34 in the same row using information in the packet header. The packet can be delivered to an XQ in a row using a row bus, or by using a demultiplexer with horizontal wires, as shown in FIG. 1C. Each output port is associated with one column of the switching matrix. Each output port has an associated output multiplexer 37, which is used to select a packet from an XQ 34 in the same column, and forward it to the output port.

Traffic Arrival Curves and Service Lead/Lag

Figure 2A:
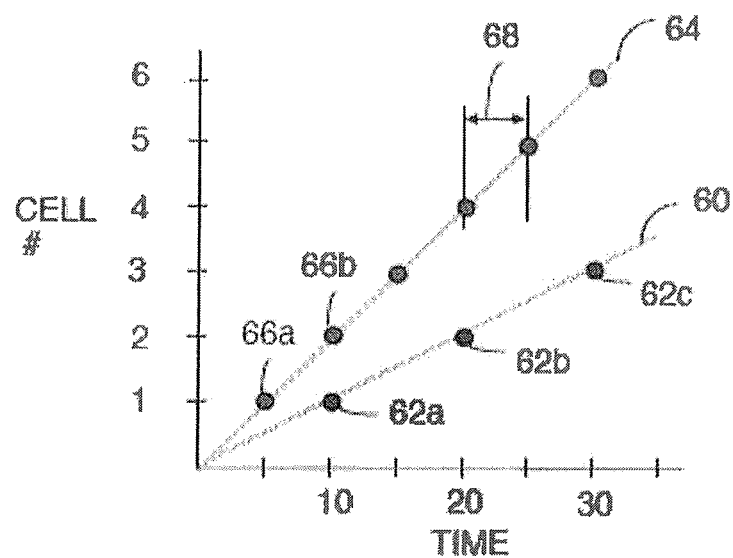
FIG. 2A illustrates the cumulative arrival curve versus time for 2 traffic flows with perfectly scheduled packet arrivals.

FIG. 2A illustrates the concept of the Cumulative Arrival Curve on a graph. Assume that the packets are fixed-sized, i.e., a fixed-size packet can be called a cell and each cell may have 64, 256 or 1,024 bytes. The y-axis denotes the number of an arriving packet. The x-axis denotes the arrival time, which is measured in milliseconds. The arriving packets for two perfectly-scheduled traffic flows are shown by the dots 62 and 66. The rate of flow #1 is fixed at 1 packet every 10 milliseconds. Points 62 denote the arrival times of the packets in flow #1. For example, point 62a denotes the 1st packet in flow #1, point 62b denotes the 2nd packet in flow #1, etc. The arriving packets in flow #1 are perfectly spaced apart in time. Each packet j arrives at its perfect arrival time of j*10 milliseconds, for j>=1.

The time between 2 consecutive arrivals is called the Inter-Arrival-Time (IAT), as denoted by the arrow 68. The time between 2 consecutive arrivals in a perfectly scheduled traffic flow is call the 'Ideal Inter-Arrival-Time' (IIAT). The time between 2 consecutive departures is called the Inter-Departure-Time (IDT). The time between 2 consecutive departures in a perfectly scheduled traffic flow is call the 'Ideal Inter-Departure-Time' (IIDT). The points 62 for arriving packets in flow #1 can be joined by a straight line 60 in FIG. 2A. This line 60 denotes the Ideal Cumulative Arrival Curve for traffic flow #1. Its slope is equal to the rate of the traffic flow, i.e., 1 packet every 10 milliseconds. Given any perfectly-scheduled traffic flow, when its packet arrivals are plotted on FIG. 2A, the arrivals will lie on a straight line with a slope determined by the rate of the flow.

The rate of flow #2 is fixed at 1 packet every 5 milliseconds. The arriving packets in flow #2 are also perfectly scheduled, i.e., perfectly spaced apart in time. Points 66 denote the arrival times of the packets in flow #2. Each packet j arrives at its perfect arrival time of j*5 milliseconds. The points 66 for arriving packets in flow #2 can also be joined by a straight line 64 in FIG. 2A. This line 64 denotes the Ideal Cumulative Arrival Curve for traffic flow #2. Its slope is equal to the rate of the traffic flow, i.e., 1 packet every 5 milliseconds.

Many mathematical proofs for establishing bounds on the sizes of packet queues use graphical arguments. These graphical methods typically plot the Cumulative Arrival Curve and Cumulative Departure Curve for a queue on one graph, and then infer the maximum queue size. The textbook [26] by D. Bertsekas and R. Gallager, entitled 'Data Networks", 2nd edition, Prentice Hall, 1992 describes graphical techniques to analyse queues and establish Little's theorem, on pages 152-157.

It is difficult to plot the cumulative arrival curves of multiple flows on one graph, when all the traffic flows have different rates. If we are processing for example 1000 traffic flows, all with different rates, there will be 1000 different Cumulative Arrival Curves on one graph, all with different slopes. Therefore, it is difficult to create one theorem which applies to thousands of distinct traffic flows, each with a different rate. To overcome this problem, we propose to change the x-axis in the graph to a normalized time.

Figure 2B:
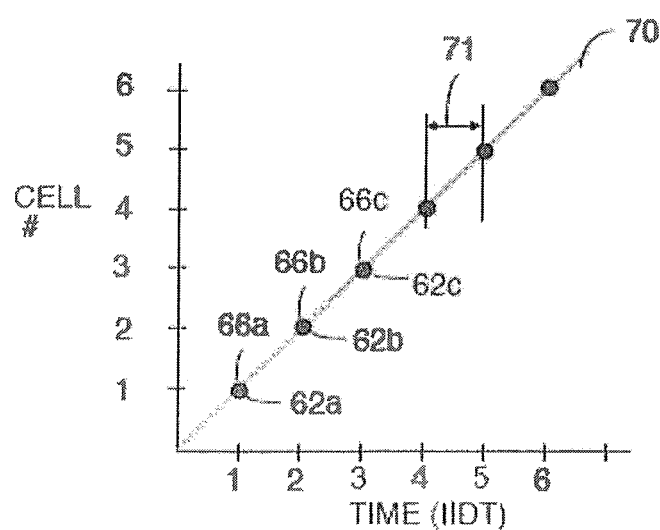
FIG. 2B illustrates the cumulative arrival curve versus normalized time for 2 traffic flows with perfectly scheduled arrivals.

FIG. 2B illustrates the concept of the Normalized Cumulative Arrival Curve on a graph. Assume that the packets are fixed-sized (i.e., cells). The y-axis denotes the number of an arriving packet. The x-axis of the graph denotes the normalized arrival time. The normalized arrival time of a packet is equal to its arrival time, divided by the Ideal-Inter-Arrival-Time (IIDT) for the traffic flow. In FIG. 2B the arriving packets in flow #1 are perfectly scheduled in time. In the steady-state a traffic flow at a queue has the same arriving rate and departing rate. Therefore, the Ideal IAT equals the Ideal IDT, i.e., IIAT=IIDT. In Flow #1, each packet j arrives at its perfect arrival time of j*10 milliseconds, equivalently each packet j arrives at normalized time equal to j IIDT. Therefore, packet 1 arrives at time 1 IIDT as shown by point 62a, packet 2 arrives at time 2 IIDT as shown by point 62b, etc. Observe that the points 62 for arriving packets in flow #1 can be joined by a straight line 70 in FIG. 2B. This line 70 denotes the Normalized Ideal Cumulative Arrival Curve for traffic flow #1. Its slope is equal to the rate of the traffic flow, i.e., 1 packet every IIDT.

In FIG. 2B the arriving packets in flow #2 are also perfectly scheduled in time. Each packet j arrives at its perfect arrival time of j*5 milliseconds, equivalently each packet j arrives at a normalized time equal to j IIDT. Therefore, packet 1 arrives at time 1 IIDT as shown by point 66a, packet 2 arrives at time 2 IIDT as shown by point 66b, etc. The points 66 for arriving packets in flow #2 can also be joined by a straight line 70 in FIG. 2B. This line 70 also denotes the Normalized Ideal Cumulative Arrival Curve for traffic flow #2. Its slope is equal to the rate of the traffic flow, i.e., 1 packet every IIDT.

Observe that one graph can now represent thousands of traffic flows, each with a different traffic rate, in FIG. 2B. Every traffic flow has one Normalized Ideal Cumulative Arrival Curve, with a slope of 45 degrees, i.e., 1 cell arrives every IIAT. Every traffic flow has one Normalized Ideal Cumulative Departure Curve, with a slope of 45 degrees, i.e., 1 cell departs every IIDT.

Figure 3A:
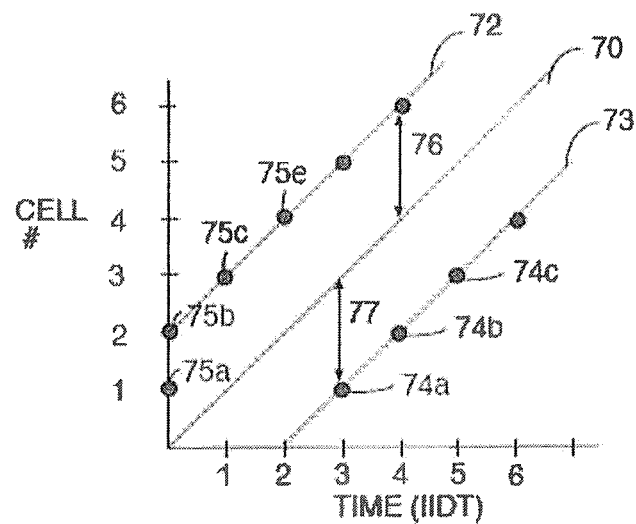
FIG. 3A illustrates the cumulative arrival curve versus time for 2 traffic flows with imperfectly scheduled packet arrivals.

FIG. 3 illustrates the arrivals of 2 traffic flows, which are not perfectly scheduled. Points 74 correspond to the arrival times of cells in a traffic flow #3 which exhibits a normalized service lag. In particular, the first cell denoted by point 74a arrives late at normalized time 3 IIDT, so this traffic flow experiences a normalized service lag. The normalized service lag is 2 packets, since the flow has received 2 fewer packets than a perfectly scheduled for flow. In particular, packets were not received at times 1 IIDT and 2 IIDT. Points 75 correspond to the arrival times of cells in traffic flow #4 which exhibits a normalized service lead. The normalized service lead is 2 packets, since the flow has received 2 more packets than a perfectly scheduled flow. In particular, 2 extra packets were received at time 0 IIDT.

Figure 3B:
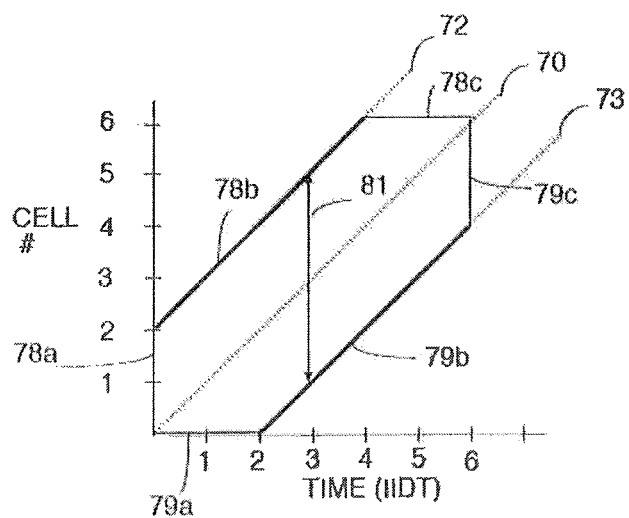
FIG. 3B illustrates the cumulative arrival curve versus normalized time for 2 traffic flows with imperfectly scheduled arrivals.

FIG. 3B illustrates the occupancy of a queue, given a normalized arriving packet stream and a normalized departing packet stream. The cumulative arrival curve has an upper bound at any normalized time, which is illustrated by line segments 78a, 78b, 78c. These line segments indicate that this traffic flow has a normalized service lead of at most 2 cells. The cumulative departure curve has a lower bound at any normalized time, which is illustrated by line segments 79a, 79b, 79c. These line segments indicate that this traffic flow has a normalized service lag of at most 2 cells. At any given normalized time, the vertical difference between the cumulative arrival curve 78 and cumulative departure curve 79 equals the number of packets in the queue. For example, the vertical line 81 illustrates that a queue that experiences this cumulative arrival curve and cumulative departure curve will have at most 4 packets. If the cumulative arrival curve has a bounded NSLL of K cells, where K is a small integer, and the cumulative departure curve has a has a bounded NSLL of K cells, then the maximum number of packets in the queue is bounded by 2K in this example.

It is shown in [19] that provided the cumulative arrival stream has a bounded NSLL<=K packets and the cumulative departure stream has a bounded NSLL<=K packets, then the number of packets in any queue is bounded by a small integer multiple of K. For the case of variable-size packets, the same curves and methodology apply. However, the y-axis can be expressed in terms of bytes of data served, rather than packets served, and the x-axis can be expressed in the IIDT for a single byte.

Formal Definitions and Theorem

Assume a network of slotted switches, where fixed-sized packets are transmitted through the network. A time-slot has sufficient time to allow a packet to be transmitted from an input port to an output port in a switch or router.

Definition: A traffic flow f consists of a series of packets transmitted from one source node to one destination node, in a network. A source node may be identified by an IP address and a port number. A destination node may be identified by an IP address and a port number.

Definition: A traffic flow f can be provisioned in a network by ensuring that sufficient bandwidth exists on the edges in the network that the flow traverses.

The following definitions apply to a selected queue in a network.

Definition: Let $s(f,c)$ denote the service time of packet c in flow f. The 'Inter-Departure Time' (IDT) of packet c in a provisioned flow f is defined as $s(f,c)-s(f,c-1)$ for $c>=2$. The 'Ideal Inter-Departure Time' (IIDT) of packets in a provisioned flow f with a guaranteed traffic rate equal to $rate(f)$ time-slot reservations per frame is given by $IIDT(f)=F/rate(f)$ time-slots.

Definition: The 'Service lead/lag' of a traffic flow f at time-slot t is defined as the cumulative service (expressed in bytes) received by traffic flow f at time-slot t, relative to the cumulative service received by a perfectly-scheduled flow with the same rate at time-slot t. Intuitively, a positive Service Lead/Lag represents how many bytes behind service the flow has fallen, relative to an ideal service schedule. A negative Service Lag is called a Service Lead, and represents how many bytes ahead of service the flow has moved, relative to an ideal service schedule. (The NSLL is different from the network 'jitter', since the jitter does not compare the cumulative received service to the cumulative ideal service.)

Definition: The 'Normalized Service Lead/Lag' (NSLL) of a flow f at time t is defined as the Service Lead/Lag of the flow f at normalized time t*IIDT, expressed as fractions of a fixed packet size, where IIDT denotes the Ideal Inter-Departure Time of the fixed-sized packets in the flow. A positive NSLL represents how many packets behind schedule the flow has fallen, relative to an ideal service schedule. A negative NSLL represents how many packets ahead of schedule the flow has moved, relative to an ideal service schedule. (The NSLL can also be defined for variable-sized packets, for example by treating one byte as the fixed-packet size in the prior definition.)

The following four theorems have been established in the paper [19] by T. H. Szymanski entitled "Bounds on End-to-End Delay and Jitter in Input-Buffered and Internally-Buffered IP Networks", presented at the IEEE Sarnoff Symposium, Princeton, N.J., March 30-Apr. 1, 2009, which was incorporated by reference earlier. These theorems assume that every traffic flow is shaped at the entry point to the network to have a bounded NSLL. These theorems assume that every switch or router schedules its traffic flows so that every provisioned traffic flow departing a switch or router has a bounded NSLL. They also assume that packets have a fixed size, for example 1 Kbytes on a backbone network, and that the scheduling frame has a fixed duration. However, the similar theorems and bounds apply for variable-size packets operating in unslotted networks.

Theorem 1:

Given a flow f traversing a queue, with a normalized cumulative arrival curve which has a bounded normalized service lead/lag of $<=K$ packets, and with a normalized cumulative departure curve which has a bounded normalized service lead/lag of $<=K$ packets, then the maximum queue size is a small multiple of K packets, typically 4K packets.

Theorem 2:

When all queues in all intermediate routers have reached steady-state, the maximum end-to-end queueing delay of a provisioned guaranteed-rate flow traversing H routers is O(KH) IIDT time-slots.

Theorem 3:

In the steady-state, the departures of traffic flow f at any router along an end-to-end path of H routers are constrained by the scheduling opportunities, and will exhibit a maximum normalized service lead/lag of K packets. In other words, the normalized service lead/lag of a flow is not cumulative when traversing multiple routers.

Theorem 3:

In the steady-state, if an arriving traffic flow has a bounded NSLL, and the switch or router uses a scheduling algorithm with a bounded NSLL, then every provisioned traffic flow which departs the switch or router has a bounded NSLL. In other words, the normalized service lead/lag of a provisioned flow is not cumulative when traversing multiple switches or routers.

Theorem 4:

A provisioned traffic flow which traverses H switches or routers along an end-to-end path can be delivered to the end-user with zero network-introduced delay jitter, when an appropriately sized Application-Specific Playback Queue module is employed.

Theorem 1 states that the number of packets buffered for any provisioned flow in any router in any network can be limited to a small integer multiple of the NSLL bound of K for all loads up to 100%. Theorem 2 states that provisioned end-to-end traffic flows may experience no congestion, excessive delay or throughput degradation. A provisioned end-to-end flow can experience a small but effectively negligible queueing delay at a router compared to current router technologies. Theorem 3 states that the normalized service lead/lag is not cumulative when traversing multiple routers in any network. This property allows networks to grow to arbitrary sizes, where traffic flows can pass through hundreds of routers and the performance will not degrade, provided that the traffic is periodically re-shaped to have a bounded NSLL. Theorem 4 states that every provisioned end-to-end traffic flow can be delivered at every destination router with strict end-to-end Quality of Service guarantees. In particular, a bursty application-layer high-definition IPTV traffic flow can be transmitted through a network and can be regenerated at every destination router with strict QoS guarantees, with small normalized queueing delays, with small packet loss rate and small delay jitter. The service each flow receives will be 'essentially-perfect' if every router along an end-to-end path achieves a bounded NSLL. The service each flow receives will be very good if occasional routers along an end-to-end re-shape traffic to achieve a bounded NSLL. The simulation results reported in FIGS. 12, 13 and 14 will demonstrate these 4 theorems.

These theorems are very general, and apply to any type of switch, including the input queued switch in FIG. 1A, the CIXQ switch in FIG. 1B, and the CIIOQ switch in FIG. 1C. They also apply to any type of packet switched network, i.e., an Internet Protocol network, an MPLS network, an optical network or a wireless network.

Traffic Shaping

Figure 4A:
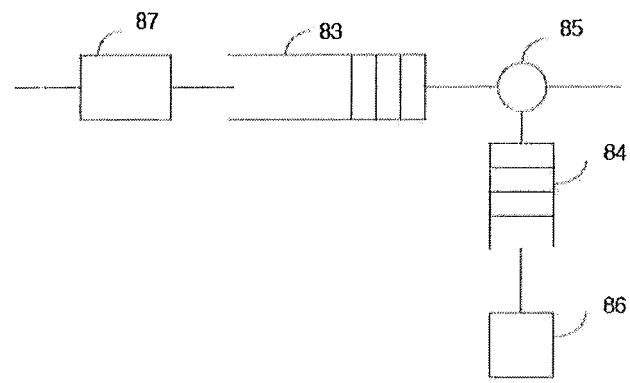
FIG. 4A shows a Token Bucket Traffic Shaper.

FIG. 4A illustrates a Token Bucket Traffic Shaper module 82. The traffic shaper module accepts in incoming bursty application-layer traffic flow, corresponding to some multimedia application, for example a compressed high-definition video stream. The application-layer traffic flow consists of application-layer packets, which may have very large differences in sizes. Application-layer video packets may vary in size from 1,000 bytes up to 500,000 bytes, and they may arrive at regular time intervals, such as 30 packets per second, creating an extremely bursty traffic flow. The token bucker traffic shaper module 82 can be designed to smoothen out the bursts in the application-layer traffic flow. The large variable-size application-layer packets may be converted to smaller relatively fixed-sized network-layer packets, for example 1000 bytes each. (The network layer packets need not be strictly fixed size, they may have some variability.) The network-layer packets can be queued, processed and may then be injected into the network with a sufficiently small normalized service lead/lag. The token bucket shaper module 82 will accept a bursty application-layer traffic flow, and may generate a stream of network-layer packets with a low normalized service lead/lag, for injection into the network.

Referring to FIG. 4A, the shaper module 82 includes a Packet Segmentation unit 87, a Data-Queue 83, a Token Queue 84, a Token-Controlled-Server 85, and a Token Generator 86. Incoming application-layer packets arrive into the segmentation unit 87. The application-layer packet may represent a high-definition digital video image, or some other multimedia information. The segmentation unit 87 may segment a large application-layer packet into several smaller sized network-layer packets, for example network-layer packets with a maximum size of 1 Kbytes each. These network-layer packets are forwarded to the data queue 83. Network-layer packets will hereafter be referred to as packets. The token generator 86 generates tokens periodically, which are stored in the token queue 84. Each token represents permission for the server 85 to remove a predetermined amount of data from the data queue 83. A token may represent permission to send for example 64 bytes, or 256 bytes, or 1 Kbytes of data. The token-controlled server 85 will remove the head-of-line packet from the data queue 83 and transmit it, when some or all of the tokens in the token queue 84 together have sufficient permission to send the packet. Once the packet is sent, the tokens whose permissions was used are removed from the token queue 84. The token bucket shaper 82 can work with fixed-sized packets (cells) or with variable-size packets. A token bucket traffic shaper 82 is described on pages 554-558 in the textbook [3].

Figure 4B:
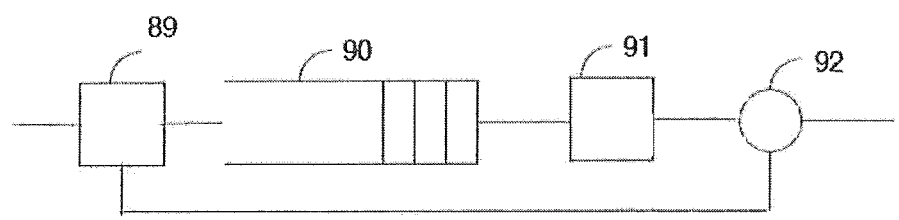
FIG. 4B shows a Playback Queue.

FIG. 4B illustrates a Playback Queue module 88. The playback queue module 88 operates in tandem with a corresponding token bucker traffic shaper module 82. The playback queue 88 is used to accept an incoming stream of maximum-sized network-layer packets generated by a token bucket traffic shaper module 82 corresponding to a bursty application-layer traffic flow, and to regenerate the bursty application-layer traffic flow on the output stream. The incoming network-layer packets will typically arrive at the playback queue module 88 with a bounded normalized service lead/lag, so that the time taken to reconstruct every variable-size application-layer packet can be computed and it is upper-bounded. The application-layer packets on the output stream are generated and released, so that the output stream is essentially an exact model of the incoming bursty application-layer traffic flow received at the corresponding traffic shaper module 82, except delayed in time.

The playback queue module 88 consists of a controller 89, a packet queue 90, a reassembly queue 91 and a playback server 92. The controller 89 will process the incoming stream of packets. The controller 89 will control the reassembly unit 91 to reassemble the application-layer packet, and the controller 89 will control the playback server 92 to release the application-layer packet at the appropriate time.

Figure 5:
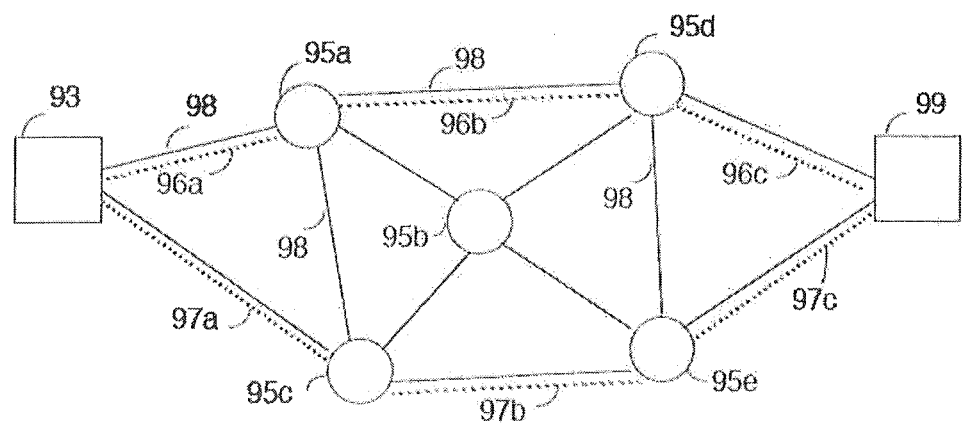
FIG. 5 shows an Internet network which can transmit a high-definition digital television traffic flow across the network with essentially-perfect Quality-of-Service guarantees.
Figure 6A:
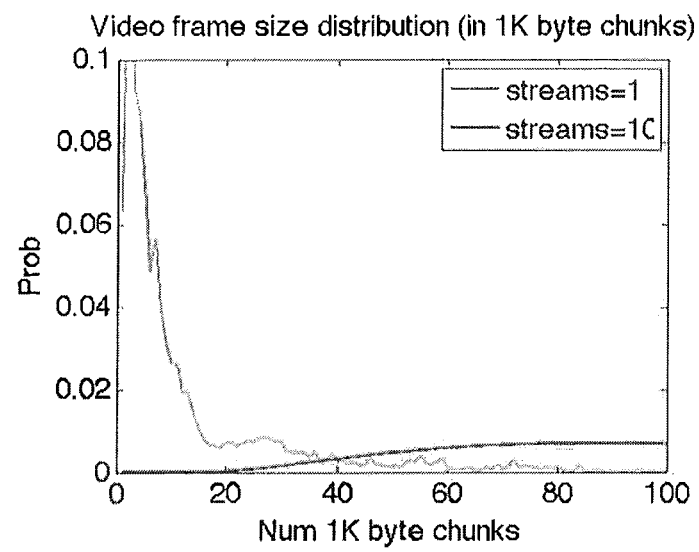
FIG. 6A shows the distribution of video frame sizes in a high-definition digital video traffic flow.

FIG. 6 is described next, followed by FIG. 5. FIG. 6 illustrates the characteristics of a bursty high-definition application-layer video traffic flow. The application-layer video traffic flow has 30 video frames per second, where each video frame consists of the compressed data for a digital image. These video frames are called the application-layer packets. The x-axis in FIG. 6A indicates the number of Kilobytes in an application-layer packet. The y-axis illustrates the probability of occurrence. For a single video traffic flow, the average application-layer packet has a size of 13.56 Kbytes, while the maximum application-layer packet has a size of 319 Kbytes.

FIG. 6 also illustrates the results for an aggregation of 10 high-definition video traffic flows.

Figure 6B:
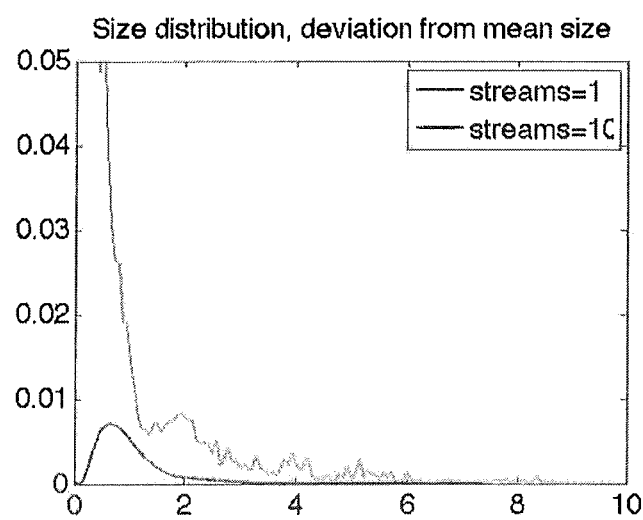
FIG. 6B shows the distribution of video frame sizes in the digital video traffic flow, after the streams have been normalized to have the same mean value.

In this aggregated traffic flow, 10 application-layer packets from 10 video streams arrive simultaneously, 30 times per second. These 10 application-layer packets are viewed as belonging to one larger application-layer packet belonging to the aggregated application-layer video traffic flow. The burstiness of the aggregated video traffic flow is reduced. Referring to FIG. 6B, the single video traffic flow has a high burstiness, where the largest application-layer packet may be well over 10 times larger than the average size of an application-layer packet. Referring to FIG. 6B, the aggregated video traffic flow has a lower burstiness, where the largest aggregated application-layer packet may be only about 4 or 5 times larger than the average size of the aggregated application-layer packet. The more application-layer flows that are aggregated, the less bursty the resulting aggregated traffic flow is. The token bucket shaper module 82 and the playback queue module 88 can be designed to regenerate aggregated traffic flows too, in addition to individual traffic flows. In general, the higher the level of aggregation, the lower the burstiness of the aggregated traffic flow. Define the normalized buffer size as the maximum size of a buffer divided by the average size of the buffer. Traffic flows with higher levels of aggregation will have lower burstiness, and will result in smaller normalized buffer sizes in the traffic shaper module 88 and the playback module 88, to regenerated the output streams.

FIG. 5 illustrates a network, consisting of routers (or switches) 95 and links (or edges) 98 between routers. The routers 95 can use the router or switch designs in FIG. 1A, 1B, 1C or 1D. Consider the transmission of a digital video stream from source node 93 to destination node 99 through the network as shown in FIG. 5. Variable-size application-layer video packets may be processed by a Token Bucket Traffic Shaper module 82 located at source node 93. This token bucket traffic shaper module 82 is designed explicitly for the application-layer traffic flow of high-definition digital video, as shown in FIG. 6. Therefore, this token bucket traffic shaper module 82 is called an 'Application-Specific Traffic Shaper' module 82. In this video application, the traffic shaper module 82 accepts application-layer packets 30 times a second, with an average size of 13.56 Kbytes, and a maximum size of 319 Kbytes. It segments these application-layer packets into network-layer packets, which are injected into the network. The network-layer packets can have fixed or variable size. Let the network layer packets have a maximum size of 1 Kbytes. The network-layer packets are injected into the network, with a bounded NSLL. For example, if the token bucket has a depth of K packet tokens, then the NSLL has a bound of approx. K packets, and network-layer packets are injected into the network within K IIDT of their ideal injection time in a perfectly scheduled traffic flow.

Multiple traffic flows from the same or different applications may compete with each other at a source node 93, for injection into the network. In this case, the GPS/WFQ scheduling method can be used to select packets to inject from multiple competing flows, such that the NSLL of every flow is bounded to a sufficiently small number. For example, the methods of FIGS. 9 and 10 to be described ahead can be used at the source node.

In FIG. 5, an application-layer traffic flow may be provisioned from the source node 93 to the destination node 99, using a protocol similar to the Internet Resource Reservation Protocol (RSVP) which is described in the textbook [3]. A provisioned traffic flow may be routed over 1 end-to-end path from the source node to the destination node, or it may use multiple end-to-end paths from the source node 93 to the destination node 99. For example, one path 96 may use links 96a, 96b and 96c. Another path 97 may use links 97a, 97b, and 97c. The provisioning protocol may allocate a fixed amount of bandwidth for the traffic flow, for links along each end-to-end path. Each end-to-end path associated with a provisioned traffic flow should support a fixed amount of bandwidth for the traffic flow, and the fixed bandwidths for each end-to-end path can be different. Therefore, each end-to-end path carrying traffic for a provisioned traffic flow may have its own data-rate and IIDT. Source node 93 can transmit network-layer packets with a small and bounded normalized service lead/lag, along each provisioned end-to-end path. The traffic shaper 82 at source node 93 will constrain the transmission of packets to have an average rate, a maximum rate and a maximum NSLL, for each end-to-end path. Source node 93 will incur a queuing delay, since the bursty application-layer packets are segmented may be queued before they are transmitted with a bounded NSLL. There may be many network-layer packets stored in the data queue 83 of the token bucket traffic shaper module 82 at source node 93 at any one time.

If multiple end-to-end paths are used to support one provisioned traffic flow, then the token bucket traffic shaper 82 in FIG. 4A can be modified. In one embodiment, each path can have its own traffic shaper 82 configured at an appropriate traffic rate (i.e. the rate assigned to the path). In another embodiment, there is one shared data queue 83. The units 85, 84 and 86 are replicated for each end-to-end path, and are configured at an appropriate traffic rate (i.e. the rate assigned to the path). In both embodiments, the end-to-end delay along the paths can be small and bounded, which makes the reconstruction of the application-layer packets at the destination node relatively easy.

In FIG. 5, the network-layer packets are transmitted over the provisioned end-to-end path(s), for example the path 96 denoted by lines 96a, 96b, 96c, to the destination node 99. Hereafter, the phrase 'packet' denotes a network-layer packet. The destination node 99 has a playback queue module 88. The playback queue module 88 will receive network-layer packets belonging to one application-layer traffic flow, and reconstruct the original bursty application-layer packets which were segmented and transmitted at the source node 93. The playback queue module 88 may have to re-order packets slightly, if packets are received over multiple end-to-end paths. Destination node 99 will also incur a queuing delay, since fixed-size network-layer packets may be received with a bounded NSLL, they must be queued in the playback queue 90, and the original bursty application-layer packets should be reassembled and released by the playback server 92 at the rate of 30 video frames per second.

The bandwidth provisioned for one traffic flow along links 96 in one or more end-to-end paths should have sufficient capacity to transmit the application-layer video stream. The average bit-rate of the video stream in FIG. 6 is 4.85 million bits per second, or roughly 592 Kbytes per second. To transmit this traffic flow through the network, bandwidth should be provisioned over one or more end-to-end paths at a rate not less than this amount. The queueing delay at the source node 93 and the destination node 99 is closely related to the total amount of bandwidth provisioned for the traffic flow. For a small queuing delay, the total amount of provisioned bandwidth should have some 'excess capacity', i.e., the provisioned rate should be greater than 592 Kbytes per second. The 'excess capacity' will determine the queueing delays at the source node 93 and the destination node 99. For low levels of aggregation, an excess capacity of 10-50% percent will typically result in queuing delays in the range of a few seconds, while an excess capacity in the range of 50-100% or more will typically result in queueing delays in the range of fractions of a second. For high levels of aggregation, an excess capacity of only 1-5% percent can typically result in queuing delays in the range of fractions of a second.

Flow Scheduling Algorithms

To achieve bounded queue sizes in a router 95 in FIG. 5, a traffic flow departing a switch or router 95 in FIG. 5 should achieve a bounded NSLL<=K, as stated in theorem 1.

The routers 95 in FIG. 5 may use the router designs in FIG. 1A, FIG. 1B, or FIG. 1C. Referring to FIG. 1A, it is possible that thousands of traffic flows share one VOQ in a national backbone router. In FIG. 1A, in each input port 12, each VOQ 16 is served by a VOQ-server 18. Whenever a VOQ 16 is selected for service in a time-slot, there may be potentially thousands of traffic flows associated with the VOQ 16 which are candidates for service. Methods to schedule traffic flows within a VOQ which guarantee that each traffic flow achieves a bounded NSLL are required.

The IQ switch 10 in FIG. 1A has two important constraints that must be satisfied when scheduling packets between input ports 12 and output ports 14. Constraint #1 requires that in each time-slot, every input port 12 transmits at most one packet to at most one output port 14. Constraint #2 requires that in each time-slot, every output port 14 receives at most one packet from at most one input port 12. Effectively, in each time-slot each input port 12 is connected to at most 1 output port 14, and each output port 14 is connected to at most one input port 12. The paper [18] describes a method which can be used to schedule an IQ switch. A switch with N input ports and N output ports requires an N×N traffic rate matrix T. The matrix T can be maintained by an autonomic network controller according to current or anticipated traffic demands, or it can be maintained by a network administrator according to current or anticipated traffic demands. Each element T(i,j) specifies the requested number of transmission opportunities (time-slots) between input port 12$i$ and output port 14$j$, in a scheduling frame consisting of F time-slots. The method in [18] can be used to process the traffic matrix T, and compute a 'VOQ-transmission-schedule' for each input port 12$i$ of the IQ switch 10. A VOQ-transmission-schedule is a vector VOQS' of length F. Each element VOQS(t) controls the input port 12$i$ for one time-slot t, where $0<=t<F$. If VOQS(t)=−1, then the input port 12$i$ is not enabled to transmit any packet from any VOQ during that time-slot. If VOQS(t)=an integer j for $0<=j<N$, then the input port 12$i$ is enabled to transmit one packet from the chosen VOQ(i,j) to output port 14$j$ in the time-slot. The method in [18] can used to schedule the transmissions from VOQs in the switch in FIG. 1A. The method in [18] will guarantee that the total traffic leaving each VOQ has a bounded NSLL. However, the method in [18] provides no guarantees on the NSLL for the individual traffic flows which are associated with each VOQ.

Input Port Design for Static Flow-Scheduling Methods

Figure 7A:
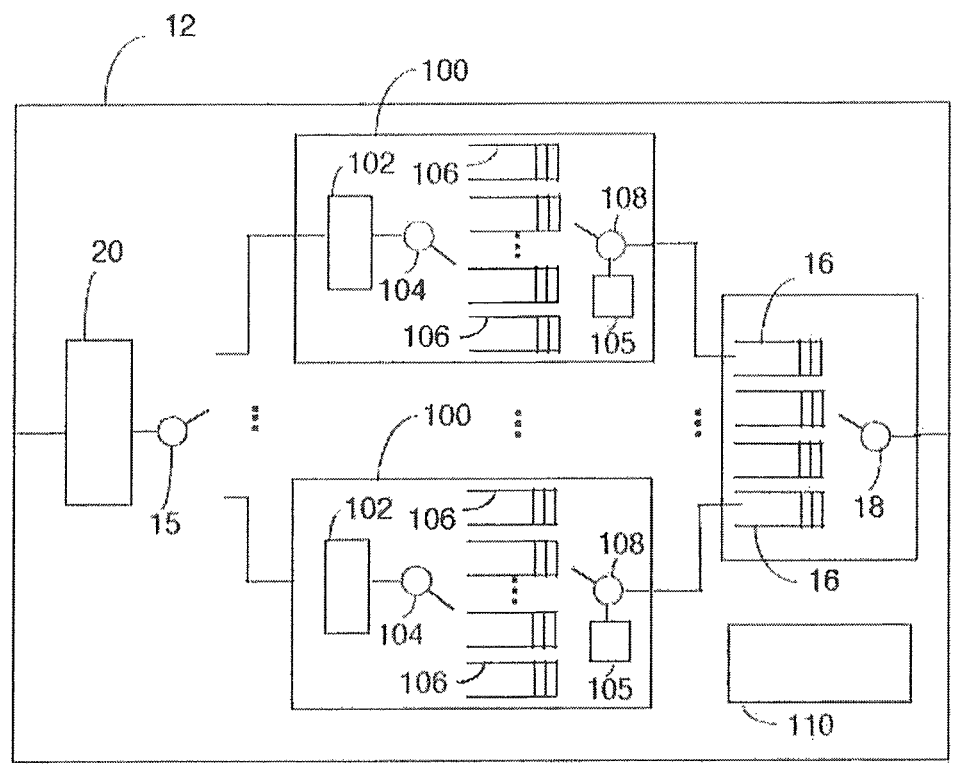
FIG. 7A shows an Input Port with Flow-VOQs for traffic flows with bounded buffer sizes and QoS guarantees. FIG.

FIG. 7A illustrates an input port 12 from FIG. 1A in more detail. This input port 12 can use the method Static-Flow-Schedule shown in FIG. 9A, to guarantee that every traffic flow within a VOQ 16 will receive a bounded NSLL. The input port 12 consists of the routing module 20, the VOQ-demultiplexer 15, the VOQs 16, and the VOQ-server 18, which were shown in FIG. 1A. Each VOQ 16 has an associated VOQ-module 100. Each VOQ-module 100 consists of a flow-controller 102, a flow-demultiplexer 104, a set of flow-VOQs 106, a flow-server 108, and an optional controller 105, which may contain a look-up-table to store control signals for the flow-server 108. Each traffic flow f passing through a VOQ 16 is assigned its own flow-VOQ 106, which contains the packets which belong to the flow f. The flow-VOQ 106 is not necessarily a separate memory or separate structure from the VOQ 16. The flow-VOQs 106 could be 'virtual' and exist as logical abstractions. For example, the VOQ 16 can be implemented in one block of memory, and all the flow-VOQs 106 associated with the VOQ can be implemented using pointers to the same memory. Each input port 12 also has an input-port-controller 110, also called an IP-controller 110.

Figure 7B:
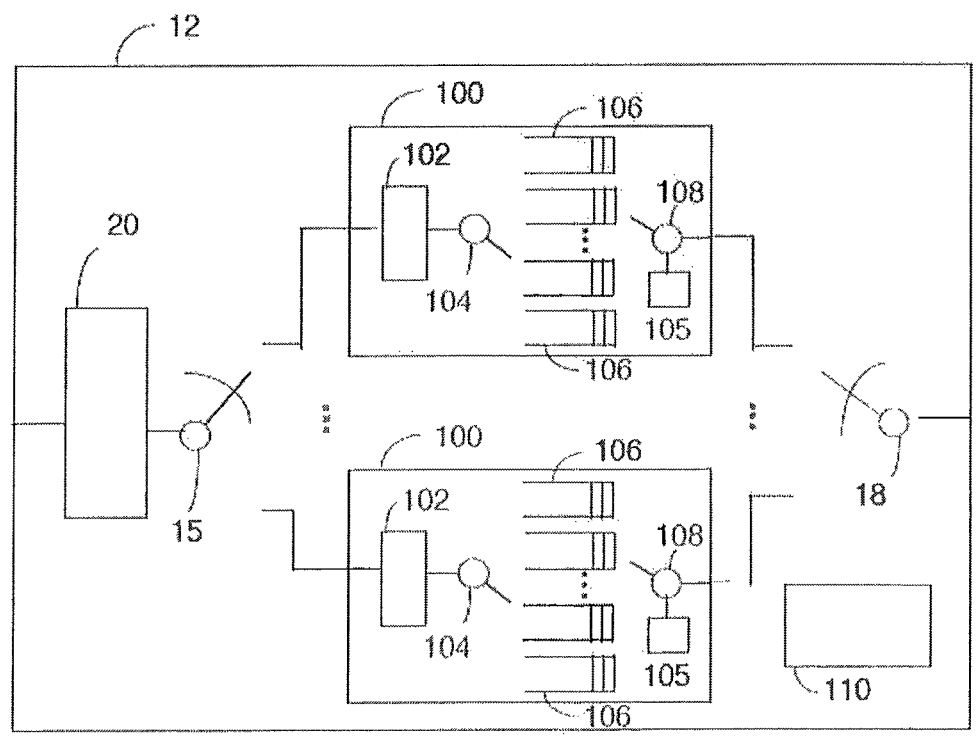

FIG. 7B illustrates an input port 12, where the VOQ-modules 100 have replaced the VOQs 16. Therefore, when a packet is forwarded to a VOQ 16, it is forwarded and stored in the VOQ-module 100, as the VOQ has been replaced by the VOQ-module. FIG. 7B illustrates the concept that the VOQ-modules 100 and the VOQs 16 can represent the same physical memory.

Referring to FIG. 7A, packets arriving to the input port 12 are processed by the routing module 20. The routing module 20 processes the packet header and determines the appropriate output port 14 and the appropriate VOQ 16 to store the packet. The routing module 20 controls the VOQ-demultiplexer 15 to forward the packet towards the appropriate VOQ-module 100. Within the VOQ module 100, the packet is first forwarded to the flow-controller module 102, which processes the packet header and determines which flow the packet belongs to. The flow-controller 102 forwards the packet to the appropriate flow-VOQ 106, and updates its internal state. The flow-controller 102 maintains the number of packets in each flow-VOQ 106 in its internal state.

The flow controller 102 may also implement a traffic policing algorithm. A typical traffic policing algorithm is described in [3] on pages 550-558. A traffic policing algorithm may process incoming packets associated with a traffic flow, to ensure that those packets conform to a traffic profile associated with the traffic flow. A traffic profile may specify an average data rate, a burst data rate, and a maximum burst size. If some packets in a traffic flow do not conform to the traffic profile, they may be marked as nonconforming, and they may be dropped. Dropped packets will not be forwarded into a flow-VOQ 106.

Scheduling in an Input Queued switch shown in FIG. 1A is known to be a difficult problem. The method in [18] by T. H. Szymanski can be used to schedule the IQ switch in FIG. 1A. Referring to FIG. 1A, given a traffic rate matrix which specifies the requested traffic rates between the input ports 12 and output ports 14, this algorithm will compute the VOQ-transmission-schedules used by the IP controllers 110, which will control the VOQ-servers 18. The algorithm in [18] will schedule transmissions between the input ports 12 and the output ports 14 in an IQ switch, for a scheduling frame consisting of F time-slots. It will guarantee that the total traffic leaving any VOQ 16 in any input port 12 will have a bounded NSLL. However, it will not guarantee that every traffic flow leaving a VOQ 16 will have a bounded NSLL. Referring to an input port 12 shown FIG. 7A, the VOQ-server 18 will be activated by the IP-controller 110 in certain time-slots when the input port 12 is enabled to transmit a packet to an output port 14 from the appropriate VOQ 16. The IP-controller 110 will enable the VOQ-server 18 to transmit a packet from the given VOQ 16. The flow-controller 102 will control the flow-server 108 associated with the VOQ 16, to select an appropriate flow-VOQ 106 to service, when the associated VOQ 16 has been selected for service.

In the paper [18], it was also proven that any recursive scheduling algorithm which schedules the packets in a traffic flow relatively evenly over each half of a time interval, such that the amount of traffic allocated to each half of the time interval differs by a constant number of packets, will achieve a bounded NSLL for the traffic flow, provided that the length of the time-interval is bounded. A method called 'Static_Flow_Schedule' is shown in FIG. 9A. This method can be used to select a flow-VOQ 106 to service, when the associated VOQ 16 is selected for service by the IP-controller 110. The method will effectively schedule the packets in a traffic flow relatively evenly over both halves of a time interval (a scheduling frame consisting of F time-slots), and this property will apply recursively. Therefore, this method will achieve a bounded NSLL for every flow departing a VOQ.

Referring to FIG. 7A, the flow-controller 102 may implement the method Static-Flow-Schedule shown in FIG. 9A. Consider a slotted IQ switch, where all packets have a maximum size. Assume the time axis is divided into scheduling frames, each consisting of F time-slots. The method Static-Flow-Schedule will compute a 'flow-transmission-schedule' for each VOQ 16 in FIG. 7A. The flow-transmission-schedule will identify the traffic flow-VOQ 106 to be serviced, for each time-slot in which the associated VOQ 16 is enabled for service within a schedule frame. The flow-transmission-schedule will remain constant, as long as all the traffic rates of all the traffic flows associated with the VOQ 16 remain constant. Whenever a new flow is added to a VOQ or a flow is removed from a VOQ, or the traffic rate demanded by a traffic flow changes, then the flow-transmission-schedule must be recomputed. While the flow-transmission-schedule remains unchanged, it may be computed once in the flow-controller 102 and stored in controller 105. The controller 105 can then control the flow-server 108.

Before examining FIG. 9, we first examine 2 methods shown in FIG. 8, to add a traffic flow to a VOQ 16 and to remove a traffic flow from a VOQ 16.

Methods Add_Flow, Remove_Flow

The MATLAB mathematical modeling language syntax is used. MATLAB is a mathematical programming language developed by MathWorks, with headquarters at Natick, Mass. 01760-2098, USA, http://www.mathworks.com/.

As described earlier, in a backbone router 12 as shown in FIG. 1A or 1B, a VOQ 16 may contain packets from thousands of provisioned traffic flows. In general, each input port 12 needs to maintain controllers, for example the IP controller 110, the flow-controller 102 and the optional controller 105, which keeps track of the provisioned traffic flows which are associated with each VOQ 16. A method is needed to add a provisioned traffic flow to a VOQ 16 in an input port 12. Another method is needed to remove a provisioned traffic flow from a VOQ 16 in an input port 12.

Referring to an input port 12 shown in FIG. 7A, the method Add_Flow shown in FIG. 8A can be used to add a provisioned traffic flow to a VOQ 16 in the input port 12. Line 150 starts the method Add_Flow. Assume that every flow is identified by a unique number called a label. The parameter 'label' identifies the flow to be added, the parameter 'rate' equals the traffic rate of the flow (expressed in a number of time-slot reservations per scheduling frame), and the parameter 'voqn' identifies the VOQ to which the flow is to be added. These 3 parameters are integers. Line 152 declares a globally visible data structure called VOQR. The number of flows associated with each VOQ 16 in the input port 12 is stored in this data structure, as well as the list of flows associated with each VOQ 16.

Line 154 reads the data structure element VOQR(voqn) to retrieve the number of flows associated with VOQ(voqn) 16, and initializes a variable 'num_flows' to equal this value. Line 156 updates the element VOQR(voqn), to record the addition of a new flow. Line 158 adds the label of the flow to the list of flows associated with VOQ(voqn) 16, in the element VOQR(voqn). Line 160 initializes the Flow_VOQ 106 with index 'label' to be empty. Line 162 assigns a variable VFT(label) to equal infinity. This variable VFT (label) is used in a subsequent method, and will be discussed later.

The method Remove_Flow is shown in FIG. 8B, which removes a traffic flow from one VOQ 16 in an input port 12. Line 170 starts the method Remove_Flow. The input parameters 'label', 'rate' and 'vqon' have the same definitions as in method 8A. Line 172 declares the globally visible data structure called VOQR. Line 174 decrements the number of flows associated with VOQ(voqn) 16, in the element VOQR (voqn). Line 178 causes the flow with the given label to be removed from the list of flows associated with VOQ(voqn) 16 in the element VOQR(voqn). Line 180 sets the Flow_VOQ 106 with index 'label' to be empty. Line 182 sets the variable VFT(label) to be infinity. This variable VFT (label) is used in a subsequent method, and will be discussed later.

Method Static_Flow_Schedule.

The method Static-Flow-Schedule is shown in FIG. 9A. Assume an IQ switch 10 as shown in FIG. 1A, using packets with a maximum size and a scheduling frame of length F time-slots. The method can also be used for the switches in FIGS. 1B, 1C and 1D. This method will compute a vector FVOQS which represents a flow-transmission-schedule, for one VOQ 16 in an input port 12. It will accept a binary VOQ-transmission-schedule vector VOQS, which indicates the time-slots in which the VOQ will receive service. The method will process the list of flows associated with this VOQ, and will schedule the flows for service for the time-slots when the VOQ receives service. The flow-transmission-schedule will identify which flow-VOQ 106 to service, when a VOQ 16 is enabled for service.

On line 200, the method accepts a vector 'rate', and a vector 'VOQS'. The vector element rate(j) equals the rate of an active flow with label j, expressed as a number of time-slot reservations in a scheduling frame of length F time-slots. The vector VOQS is the binary VOQ-transmission-schedule. The vector element VOQS(ts) equals 1 if the VOQ 16 is scheduled for service in time slot ts. Line 200 will return a vector FVOQS of length F, which identifies the flow to be serviced, for the F time-slots in a scheduling frame. This schedule will only select a flow-VOQ 106 for service in a time-slot when the VOQ 16 is selected for service.

Line 202 defines some globally visible parameters, the length of a scheduling frame F and the maximum number of flows NF. Line 204 initializes the vector FVOQS to be a vector of zeros with length F. Line 206 initializes a vector SP to be a vector of zeros with length NF. Element SP(j) indicates how many packets have been scheduled for the flow with label j. Line 208 initializes a vector VFT of length NF so that all elements are infinity. VFT(j) represents the 'Virtual Finishing Time' of flow j.

Lines 210-219 will assign the VFT for the first packet associated with each flow with a non-zero rate to be equal to the IIDT associated with the flow, which equals F divided by the rate of the flow. Line 216 indicates that the first packet of each such flow has been scheduled. Lines 220 to 246 define a second loop, which processes each time-slot ts in a scheduling frame of length F. Line 222 tests to see if the VOQ 106 is scheduled for service in time-slot ts, in the VOQ-transmission-schedule. If true, lines 224-244 are performed. Line 224 searches through the vector VFT, to find the flow with the minimum VFT value. The VFT with minimum value is stored in variable 'minVFT', and the index (or label) of the flow is stored in variable 'flow'. Line 226 tests to see if the minVFT is less than infinity. If true, lines 228-242 are performed. Line 228 assigns the vector FVOQS(ts) to equal the variable 'flow', thereby scheduling the flow with index 'flow' to be serviced in time-slot ts. Line 230 updates the VFT. The new VFT equals the current VFT plus the IIDT of the flow Line 232 tests to see if the number of scheduled packets for the flow is less than the rate of the flow. If true, then line 232 increments the vector element SP(flow) representing the number of packets already scheduled for service in this flow. If line 232 is false, then line 238 sets the VFT of the flow to be infinity since all its packets have been scheduled. As a result, no more packets will be scheduled for this flow.

The vector FVOQS represents the flow-transmission-schedule, which controls the flow-server 18 for each time-slot in a scheduling frame of F time-slots. It identifies the flow-VOQ 106 to be serviced, when the VOQ 16 is enabled for service. The flow-transmission schedule will remain unchanged when the traffic flows not change. Therefore, it can be computed and stored in the controller 105, and be re-used for several scheduling frames, while the traffic flows do not change. When the traffic flows change, the VOQ-transmission-schedule and the flow-transmission-schedule must be recomputed.

If variable-size packets are used, then line 230 which updates the VFT of a flow when the next packet is scheduled should be changed. The VFT of the next packet of the flow should equal the current VFT of the flow plus the length of the next packet in bits, divided by the weight of the flow. The method in FIG. 9B can be used to compute the weight of all the flows traversing one VOQ, with different rates.

The method in FIG. 9A can be modified in several ways, while still guaranteeing a bounded NSLL for each flow. For example, the assignment of the initial VFTs to traffic flows, in lines 210-219, can use other initial values. The method is also general and can be used to schedule any type of time-slot requests, i.e., it is not constrained to schedule only flow-VOQs within a VOQ.

Method Static_Flow_Schedule_Realtime.

The method Static_Flow_Schedule_RealTime is shown in FIG. 9C. It is a slightly modified version of method Static_Flow_Schedule in FIG. 9A. This method can be used to schedule multiple flows for the special case when all time-slots are available to be used for scheduling, i.e., the input vector VOQS is a vector of ones. The method in FIG. 9C will compute a vector FVOQS which represents a flow-transmission-schedule, for one VOQ 16 in an input port 12. It will accept a binary VOQ-transmission-schedule vector VOQS, which indicates the time-slots in which the VOQ will receive service (which are all ones). The method will process the list of flows associated with this VOQ, and will schedule the flows for service. The flow-transmission-schedule will identify which flow-VOQ 106 to service.

Only the changes from the method in FIG. 9A will be described. Line 280 computes the sum of all the packet transmission requests to be scheduled in the vector 'rate'. Line 284 tests to see if the packet with the smallest VFT can be scheduled in the current time-slot 'ts'. Line 284 also tests to see if the number of packet transmission requests remaining to be scheduled in 'Rsum' equals the number of remaining time-slots in the frame schedule. If either condition is true, then the packet is scheduled for service in the current time-slot in lines 85-292. Line 285 also increments the counter 'Rsum', to record the newly scheduled packet.

The method in FIG. 9C can be modified in several ways, while still guaranteeing a bounded NSLL for each flow. For example, the assignment of the initial VFTs to traffic flows, in lines 270-279, can use other initial values.

Experimental Results, Method Static-Flow-Schedule

To gather results of this method, a computer simulation of a network was performed. The network consists of a linear chain of 10 IQ routers of size 4×4, where each link operates at 10 Gbps. A scheduling frame of duration F=2048 time-slots was selected. Traffic flows were iteratively added and routed through the network in 'phases'. In each phase, the computer program would visit every input port. At every input port, the computer program would attempt to add a new traffic flow, and to route the traffic flow from that input port on the 1st switch, to a randomly selected output port on the last switch. The rate of the traffic flow would be randomly selected between 1 and 60 time-slot reservations per scheduling frame. If the flow could be successfully routed, the flow would be added to the appropriate VOQ 16 in each router, and a flow-VOQ 106 would be created for that flow. The phases were repeated, until the network was 100% saturated. The resulting specification of multiple traffic flows, their sources, their destinations, their paths and their rates, is called a 'traffic specification'. The method in [18] was used to compute the VOQ-transmission-schedules. The method Static_Flow_Schedule in FIG. 9 was then used to compute a flow-transmission-schedule, i.e., to schedule each flow-VOQ 106 associated with a VOQ 16.

Several traffic specifications were generated and simulated, and all traffic specifications yielded similar results. The results for one particular traffic specification are described next. There are 514 traffic flows entering the first router, with an average of 128.5 flows per input port 12, and with an average of 32.125 flows per VOQ. All 514 traffic flows exited the last router, with an average of 128.5 flows per output port 14. Every input port 12 and output port 14 was 100% loaded. This traffic specification represents a very heavily loading of the network, as every link and every router is operating at 100% of its peak capacity.

Before entering the network, the traffic flows were shaped by a token bucket traffic shaper 82 to have a bounded NSLL<=1 packet. A similar computer model is described in the paper [18]. The network would then be simulated for several scheduling frames. Each scheduling frame had a duration of 2,048 time-slots. It would take several scheduling frames for the network to reach equilibrium, as initially all the flow-VOQs 106 are empty. After the network reached equilibrium, the network was simulated for 4 scheduling frames, and various statistics were gathered.

FIG. 12 presents results for the method Static-Flow-Schedule shown in FIG. 9A. FIG. 12A illustrates the end-to-end delay for all 514 flows, expressed in terms of un-normalized time-slots. The end-to-end delay varies from about 400 times-slots up to 2,048 time-slots. FIG. 12B illustrates the end-to-end normalized delay for all 514 flows, expressed in terms of normalized time. The normalized end-to-end time for a flow is the end-to-end time divided by the IIDT of the flow. The normalized delay varies from about 3 IIDT up to 10 IIDT, where the IIDT represents the time between packet departures in a perfectly-scheduled traffic flow. FIG. 12C illustrates the variance in the end-to-end delay of all 514 traffic flows leaving the network, expressed in time-slots. FIG. 12$d$ illustrates the same data as in FIG. 12C, where the x-axis is now expressed in normalized time. Equivalently, FIG. 12D plots the variance of the end-to-end delay of all 514 traffic flows leaving the network, expressed in terms of IIDT of each flow. As stated in the four theorems, the variance of the normalized delay is small and bounded by a few IIDT, and can be easily filtered out at a destination using a small playback queue of depth O(K) packets, to deliver a perfect zero-jitter stream of network-layer packets. To reconstruct variable-size application-layer packets, a larger Application-Specific Playback Queue 88 must be used, as described in FIG. 5.

Figure 12A:
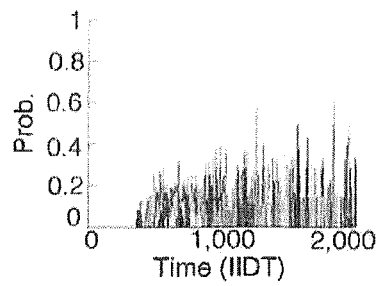
Figure 12B:
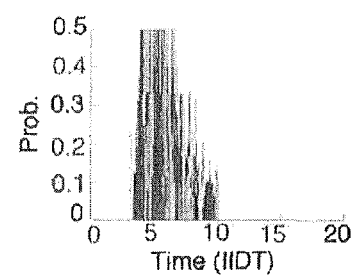
Figure 12C:
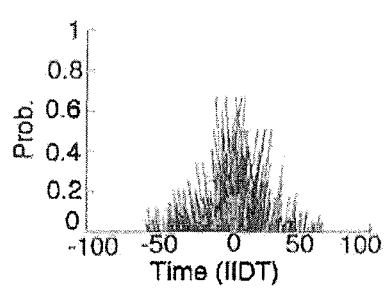
Figure 12D:
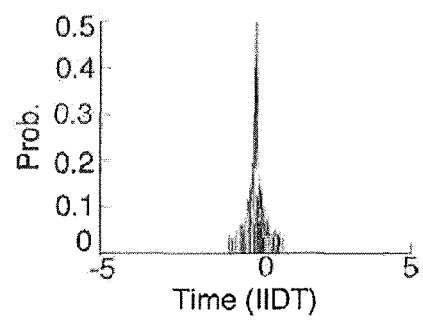
Figure 12E:
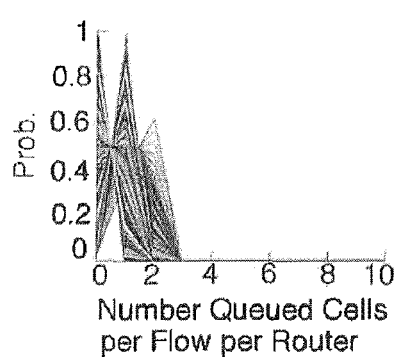
Figure 12F:
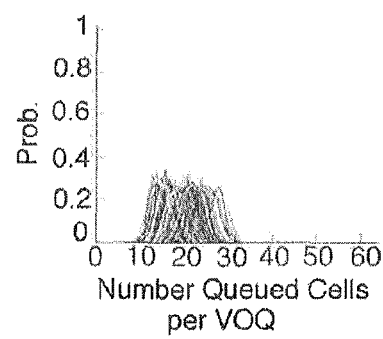
Figure 13A:
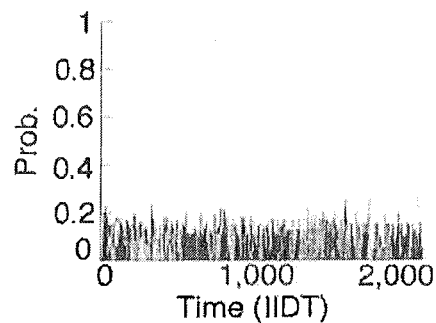
Figure 13B:
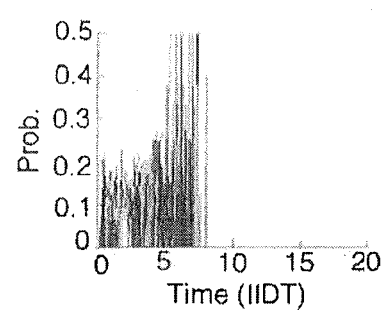
Figure 13C:
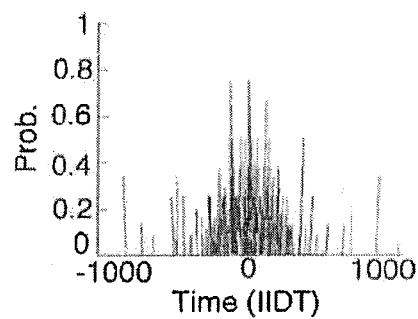
Figure 13D:
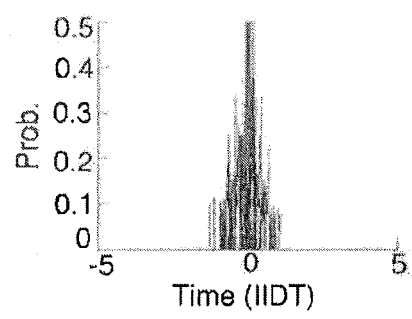
Figure 13E:
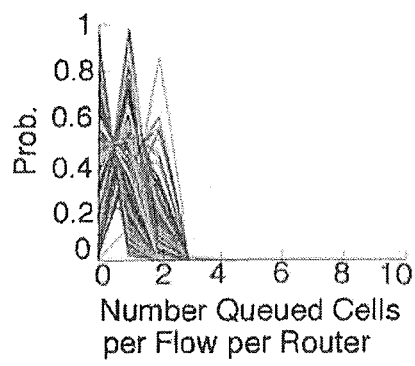
Figure 13F:
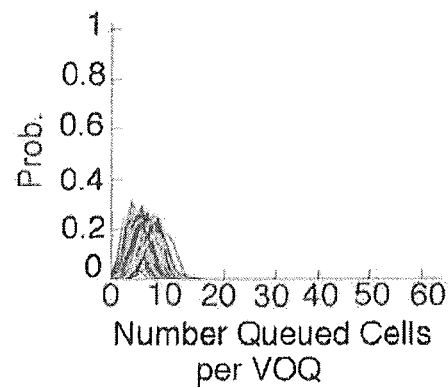
Figure 14A:
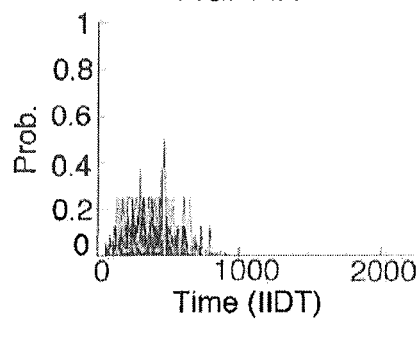
Figure 14B:
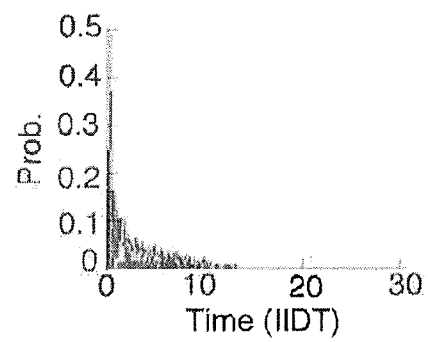
Figure 14C:
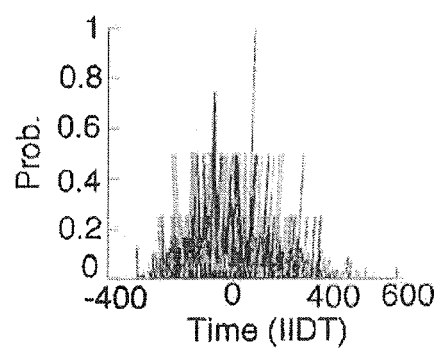
Figure 14D:
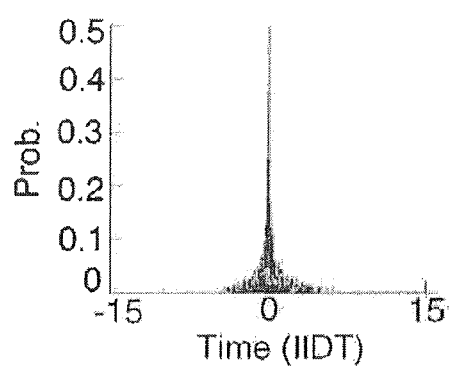
Figure 14E:
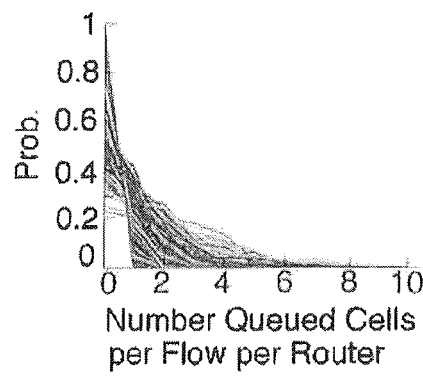
Figure 14F:
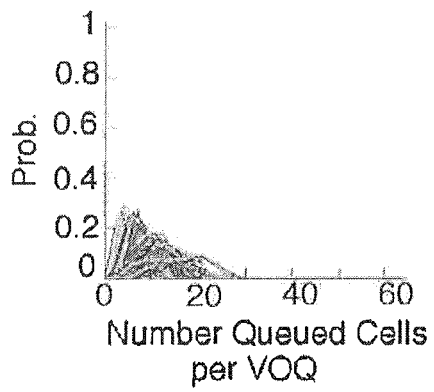
Figure 15A:
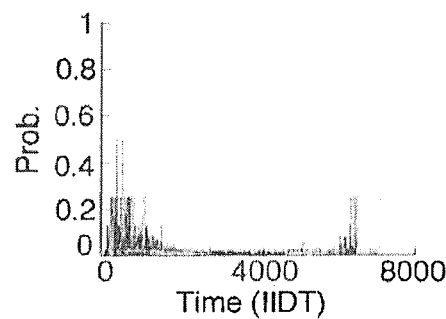
Figure 15B:
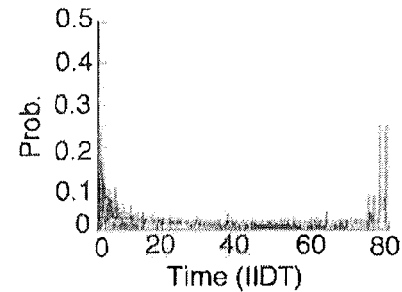
Figure 15C:
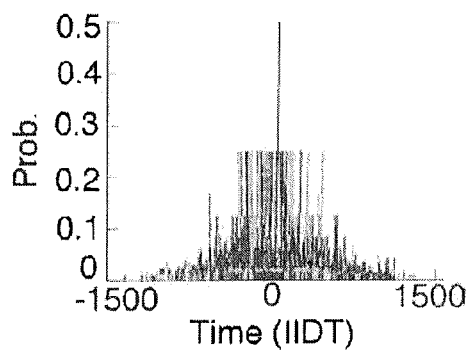
Figure 15D:
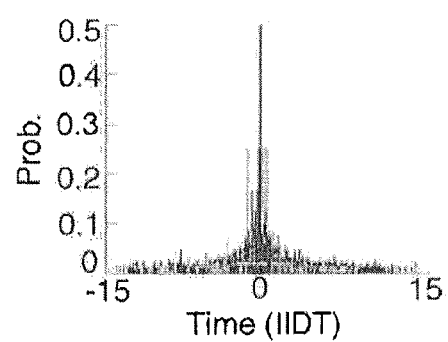
Figure 15E:
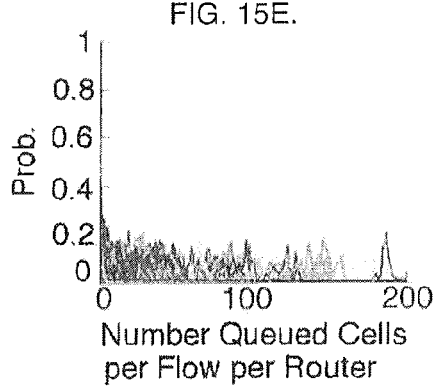
Figure 15F:
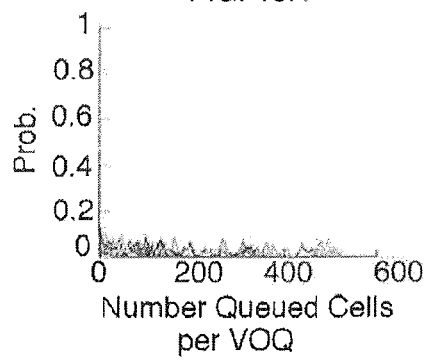

FIG. 12E illustrates the distribution for the number of packets in the flow-VOQs 106. There are 5,140 individual plots, where each plot represents one of the 514 flow-VOQs 106 in each of the 10 routers. Observe that every flow-VOQ 106 is small and bounded in size, to a maximum of 2 packets. FIG. 12F illustrates the distribution for the number of packets in the VOQs 16. There are 160 individual plots, each plot representing one of the sixteen VOQs 16 in each of the 10 routers. Observe that every VOQ 16 has small and bounded in size, to a maximum of 35 packets. Each VOQ 16 supports on average 32.125 traffic flows, i.e., each VOQ 16 has 32.125 active flow-VOQs 106 on average, and each VOQ 16 contains a maximum of 35 packets in this computer simulation.

Note that the method Static-Flow-Schedule in FIG. 9A has allowed traffic flows to be transmitted across the network with a bounded NSLL, while the network operates at 100% load. To transmit application-layer packets across the network with bounded router buffer sizes and QoS guarantees, an Application-Specific Traffic Shaper 82 can be used at each source node 93, and an Application-Specific Playback Queue 88 can be used at each destination node 99. Therefore, a bursty application-layer traffic flow can be transmitted across the network and regenerated at the destination with strict Quality of Service guarantees, as described in FIG. 5.

A Method for Dynamic Flow-Schedules

A work-conserving queueing system is defined as a queueing system in which the server will never be idle when there is a packet in the queue. Equivalently, a server will always be serving a packet as long as there are packets in the queue. The method Static-Flow-Schedule in FIG. 9A is not work-conserving. Referring to FIG. 7A, suppose the VOQ 16 has several non-empty flow-VOQs 106, but the next flow-VOQ 106 selected for service in the method Static-Flow-Schedule is empty. The flow-server 108 and the VOQ-server 18 will both remain idle even when the selected VOQ 16 is non-empty, violating the definition of a work-conserving queuing system. A work-conserving queueing system should have smaller queue sizes on average, compared to a non-work-conserving system. To potentially improve the performance, consider a method Dynamic-Flow-Schedule shown in FIG. 10.

A method to dynamically compute a schedule for the flows-VOQs is presented. The method is based upon the theory of GPS/WFQ developed by Parekh and Gallager in [1] and [2]. In the dynamic method, the arrival time of a packet at a VOQ 16 will determine its Virtual Finishing Time (VFT) and its departure order from the VOQ 16. When packet k of flow f arrives at a non-empty or empty VOQ 16, the GPS/WFQ theory provides the following 2 equations, equation 1 and equation 2, to determine its virtual finishing time, when packets can have variable sizes:

$$VFT(k,f) = VFT(k-1,f) + B(k,f)/W(f) \quad (1)$$

$$VFT(k,f) = cVT + B(k,f)/W(f) \quad (2)$$

B(k,f) denotes the number of bits in packet k of flow f, and W(f) is the weight of the flow.

In our input port 12 shown in FIG. 7A, when the VOQ 16 is enabled to serve a packet, it selects a packet from the flow-VOQ 106 with the smallest VFT.

Referring to the input port 12 in FIG. 7A, when an input port 12 receives an arriving packet, the flow-controller 102 forwards the packet to the appropriate flow-VOQ 106, and updates its internal state. The flow-controller 102 maintains the number of packets in each flow-VOQ 106, and it computes the VFT of each packet as it arrives. The VOQ-server 18 will be activated according to the IP-controller 110. The IP-controller will control the VOQ-server 18 to select a given VOQ 16 in each time-slot. In the dynamic flow-scheduling method, the flow-controller 102 will control the flow-server 108 associated with the VOQ 16, to select an appropriate flow-VOQ 106 to service dynamically, when the VOQ server 18 is enabled.

The flow-controller 102 can select a flow-VOQ within the VOQ to service dynamically by calling the method Dynamic_Rem_Packet in FIG. 10B.

The flow-controller 102 may implement the methods Dynamic_Add_Packet in FIG. 10A and the method Dynamic_Rem_Packet in FIG. 10B. Consider first a slotted switch, where all packets have a maximum size. Assume the switch operates according to scheduling frames, each consisting of F time-slots.

The method Dynamic_Add_Packet is shown in FIG. 10A. This method is used to add an arriving packet to a flow-VOQ 106. The input variable 'flow' equals the label of the flow, and the variable 'voqn' identifies the VOQ 16 which contains the flow-VOQ 106. Line 302 defines some globally visible numbers, the length of a scheduling frame F, the maximum number of flows NF, and the current virtual time (cVT). Line 304 defines some globally visible data structures. Flow_VOQ is a vector which records the number of packets stored in each flow_VOQ 106. pVFT is a matrix with F rows and NP columns, representing the VFTs assigned to the packets associated with each flow, over a window of NP packets, where NP is the number of packets in the window. The virtual finishing time of every packet in every flow is computed and stored here, over a window of time. The SP is a vector recording the number of packets already scheduled (i.e., assigned a VFT) for every flow. The Rate is the vector of traffic rates for each flow, where each rate is expressed in time-slot reservations per scheduling frame of length F time-slots.

Line 306 initializes the variable 'pkt' to be the number of the packet added to this flow-VOQ 106, and it increments the vector element SP(flow) to reflect that this packet has been scheduled (i.e., assigned a VFT). Line 308 tests to see if the flow_VOQ 106 for the current flow is empty. If true, then line 310 is processed, which assigns a VFT to a packet arriving at an empty flow-VOQ. Line 310 assigns the packet a VFT equal to the current virtual time cVT plus the IIDT of the flow. This packet's VFT value is recorded in the matrix element pVFT(flow,pkt). If Line 308 is false, then line 316 is processed. Line 316 computes the VFT of the packet arriving at a non-empty flow-VOQ, which equals the VFT of the packet ahead of it in the flow_VOQ 106, plus the IIDT of the flow. This value is recorded in the matrix pVFT(flow, pkt). The method can be adapted to use variable-size packets and unslotted switches. If variable-size packets are used, the IIDT is replaced by the length of the packet in bits divided by the weight of the flow.

FIG. 10B illustrates the method Dynamic_Rem_Packet. The input parameter 'voqn' identifies the VOQ 16 from which a packet is to be removed. This method is called when a VOQ 16 is scheduled for service by the IP controller 110, and a flow-VOQ 106 must be selected for service. Line 332 lists some globally visible data-structures. SP is a vector which represents how many packets have been scheduled for each flow. VOQR is a data-structure recording the number of flows associated with each VOQ 16, and the list of flows associated with each VOQ 16. pVFT is the matrix of packet VFTs for every flow. Flow_VOQ is a vector representing the number of packets stored in each flow-VOQ 106. Line 336 retrieves the list of flows associated with the VOQ 16, from the data-structure element VOQR(voqn). Line 338 retrieves the number of flows associated with the VOQ 16. Line 340 initializes 3 variables to be infinity. Lines 342 to 352 form a loop, which processes every flow in the list of flows. Line 344 retrieves the label of the next flow in the list of flows and assigns it to variable 'flow'. Line 345 finds the minimum VFT of any packet associated with this flow which is still in the flow-VOQ. The minimum VFT value is stored in 'fvft', and the packet number is stored in 'pkt'. Line 346 tests to see if the minimum VFT in 'fvft' is less than the current minimum VFT in variable 'minVFT'. If true, then line 348 will record the new minimum value of the VFT in variable 'minVFT', it will record the label of the flow in variable 'minf', and it will record the packet number in variable 'minpkt'. After the loop has been completed, line 354 tests to see if the variable 'minVFT' is less than infinity. If true, then a flow-VOQ 106 containing a packet with the minimum VFT has been selected. In line 356, the value 'minf' is assigned to variable 'flow', the value 'minpkt' is assigned to 'pkt', which will be returned by the function. In line 356, the VFT stored in the matrix element pVFT(flow,pkt) is reset to infinity, so that the packet will not be selected again. The label 'flow' returned by the function can be used to control the flow-server 108 to select a flow-VOQ 106 for service.

Excess Bandwidth Sharing

One property of the GPS/WFQ theory and the methods Dynamic_Add_Packet and Dynamic_Rem_Packet in FIGS. 10A and 10B is that any excess bandwidth on a link is shared amongst all non-empty flows. Excess bandwidth is defined as bandwidth which is un-reserved by any provisioned traffic flows. Therefore, a non-empty flow-VOQ 106 may receive more than its fair share of service over a short interval of time, if the link has excess bandwidth, as that excess bandwidth will be allocated to the flows with packets. Therefore, even if an arriving traffic flow has a bounded NSLL<=K, the departing traffic flow may have a NSLL which is greater than K over a short interval of time, and theorems 1-4 do not strictly apply.

In other words, a flow-server 108 using the methods Dynamic_Add_Packet and Dynamic_Rem_Packet in FIG. 10A may not guarantee that every departing traffic flow has a bounded NSLL<=K, for some small integer K. Once one traffic flow looses this property, it may cause other traffic flows to loose the same property, and the entire network may deteriorate to the case were many traffic flows have lost the property that NSLL<=K. Once flows loose this property, the queues may grow to be quite large, packets may be dropped due to queue overflow, the end-to-end delay cannot be guaranteed, and the Quality of Service for any traffic flows cannot be guaranteed. It should be noted that provided each traffic flow is shaped before entering the network to have a NSLL<=K, for some integer K, then the NSLL at any router using the methods Dynamic_Add_Packet and Dynamic_Rem_Packet might still be bounded, but the bound may be larger than K, i.e., it may be 10*K or 50*K. This increase in the NSLL will cause the buffers in the switches or routers to hold many more packets than necessary, and it may cause the loss of packets due to buffer overflow. This effect is especially important for all-optical packet switches, where the size of the buffers in the switches should be kept to a very small number.

In addition to the above issue, the methods Dynamic_Add_Packet and Dynamic_Rem_Packet can suffer from another potentially serious problem. A malicious user could inject a traffic flow without a bounded NSLL into the network. The work-conserving flow-servers 108 may propagate this malicious flow without a bounded NSLL, causing other flows to loose their small bounded NSLL which should be <=K. Once again, once a single flow looses this property, it may cause other flows to loose this property, and the network can deteriorate to the case where many flows have lost this property and where QoS guarantees can no longer be made. To avoid this potentially serious deterioration, work-conserving flow-servers 108 should use extra processing in each router, to ensure that traffic flows departing a router have a bounded NSLL<=K. (Not every router must ensure the bounded NSLL, but periodically some routers should re-shape the traffic to have a bounded NSLL.) For example, each input port 12 could contain a token bucket traffic shaper 82 as described in FIG. 4A, for every flow-VOQ 106. The token bucket traffic shaper 82 will ensure that no flow exceeds its bound on the NSLL.

Method to Disable Excess Bandwidth Sharing

Alternatively, the method Dynamic_Rem_Packet in FIG. 10B can be modified, to disable the excess bandwidth sharing property of the GPS/WFQ algorithm (at least in some routers). Recall that the function Dynamic_Rem_Packet removes a packet for service from a VOQ 16. In line 346 it selects the flow-VOQ with the smallest VFT(virtual finishing time) to service. In line 354 it returns the flow label 'flow' as long as the flow-VOQ is non-empty, i.e., as long as the 'minVFT' is less than infinity. To disable the excess bandwidth sharing, a few lines in these methods must be modified.

Line 310 in FIG. 10A should be replaced by line 325. Line 325 replaces the variable current virtual time (cVT) by the current real time (cRT). The current real-time is the number of the current time-slot. Assume time-slots are numbered by consecutive integers, starting at time-slot 0 at time 0. Each input port 12 must have a time-clock to record the real-time, rather than virtual time, and cRT denotes the current value of the real-time clock, measured in time-slots. The real time is similar to the virtual time, except it is not virtual and it is measured in time-slots. In a system with fixed-sized packets, the real time keeps track of the current time-slot. In FIG. 10A, line 310 assigns a flow-VOQ a virtual finishing time when a packet arrives to an empty flow-queue, and the VFT is based upon the current virtual time plus the IIDT. In contrast, line 325 assigns a flow-VOQ a VFT when a packet arrives to an empty flow-queue, where the VFT equals the current real-time plus the IIDT.

To disable bandwidth-sharing, line 354 in FIG. 10B should also be replaced, by the new line 370 shown in FIG. 10B. This new line 370 ensures that a flow-VOQ is selected for service only if its VFT is greater than the current value of the real-time clock cRT. The line 354 can also be replaced by line 372, which allows the method Dynamic_Rem_Packet to remove a packet with a slight service lead, determined by the variable X. For example, X may be between zero and one IIDT, which allows packets to depart with a slight service lead.

Experimental Results for Dynamic Flow Scheduling Method

FIG. 13 presents results for the methods Dynamic_Add_Packet and Dynamic_Rem_Packet. FIG. 13A illustrates the end-to-end delay for all 514 flows, expressed in terms of time-slots. The delay varies from about 1 up to 2,048 time-slots. FIG. 13B illustrates the normalized end-to-end delay. The normalized end-to-end delay is reduced somewhat compared to FIG. 12A. FIG. 13C illustrates the variance in the end-to-end delay of all 514 traffic flows leaving the network. FIG. 13D illustrates the variance in the end-to-end normalized delay of all 514 traffic flows leaving the network. The variance of the normalized delay is still small and bounded, and can be easily filtered out with a small playback queue. FIG. 13E illustrates the distribution of the number of packets in the flow-VOQs 106. Observe that every flow-VOQ 106 is small and bounded in size, to a maximum of 2 packets. FIG. 13F illustrates the distribution of the number of packets in the VOQs 16. Observe that every VOQ 16 is bounded in size, with a maximum size of about 18 packets. The methods Dynamic_Add_Packet and Dynamic_Rem_Packet have reduced the maximum VOQ 16 size, from about 35 packets using the method Static_Flow_Schedule in FIG. 9A, to about 18 packets. To guarantee that a departing flow has a bounded NSLL<=K, the traffic shapers can be added as explained earlier, or the modified methods Dynamic_Add_Packet and Dynamic_Rem_Packet with the disabled bandwidth-sharing property in FIG. 10 are used.

A Method for a Random Flow Schedules

Consider a method for randomly scheduling the flows within a VOQ, when the VOQ is enabled for service. Referring to FIG. 7A, when a VOQ 16 receives service, any non-empty flow-VOQ 106 is selected at random to receive service. This VOQ-server is clearly work-conserving.

Referring to FIG. 7A, the flow-control module 102 maintains the number of packets in each flow-VOQ 106. The VOQ-server 18 will be activated by the IP-controller 110, and the IP-controller will control the VOQ-server 18 to select a specific VOQ 16 for service. The flow-controller 102 will control the flow-server 108 associated with the VOQ 16, to select an appropriate flow-VOQ 106 to service, when the VOQ-server 18 is enabled.

The flow-controller 102 may implement the methods in FIGS. 11A and 11B. FIG. 11A illustrates the method Rand_Add_Packet. The input parameter flow equals the label (unique identifier) of the flow. The input parameter 'pkt' equals the packet number if the arriving packet. Line 372 identifies the flow_VOQ data-structure as visible. This data-structure now stores the list of packets which are queued in the flow-VOQ 106. Line 374 adds the packet with identifier 'pkt' to the end of the list of packets in the flow-VOQ 106 for the flow.

The method Rand_Rem_Packet is shown in FIG. 11B. The input parameter 'voqn' identifies the VOQ 16 from which a packet is to be removed. Line 397 Indicates that the VOQR and flow-VOQ data-structures are visible. Line 380 retrieves the list of flows associated with the relevant VOQ 16. Line 382 retrieves the number of flows associated with the relevant VOQ 16. Line 384 generates a random permutation of the numbers starting from 1 and ending at num_flow. The flow_VOQs 106 will be examined in a random order determined by this permutation. Lines 386 to 396 form a loop using parameter j. Line 388 identifies the next unexamined flow-VOQ 106. Line 390 tests to see if the flow_VOQ is non-empty. If true, line 392 removes the head-of-line packet from the flow_VOQ and stores it in variable 'pkt'. Line 394 causes the method to return the packet and the flow identifier. The loop is processed until all flow-VOQs 106 have been examined, If all flow_VOQs 106 are empty, line 397 assigns the variables 'flow' and 'pkt' to be −1, which indicates that all flow-VOQs 106 are empty, and the method returns these values. These variables are used by the flow-server 108 to select a flow-VOQ 106 for service, when the associated VOQ 16 is selected for service by the IP controller 110.

While the method Rand_Rem_Packet illustrates as a series of processing steps, the method can be easily implemented in hardware. A hardware tree of binary nodes can be created. The tree has enough binary nodes at the bottom level to process all flows. The tree has one output at the top, which returns the label of a non-empty flow-VOQ selected at random. Each binary node examines two flow_VOQs 106 at its bottom level, selects a non-empty flow-VOQ at random, and propagates the flow-VOQ identifier up the tree. Such a tree is straight-forward to design in hardware.

The methods Rand_Add_Packet and Rand_Rem_Packet may lower the average number of packets queued per flow-VOQ 106 per router compared to the method Static_Flow_Schedule, since it is work-conserving. However, it is also expected to increase the worst-case flow-VOQ queue sizes, and it also has the side-effect of no longer guaranteeing that every flow has a NSLL<=K, just as the methods using dynamic Flow-Scheduling.

FIG. 14 presents results for the methods Rand_Add_Packet and Rand_Rem_Packet. FIG. 14A illustrates the end-to-end delay for all 514 flows. The end-to-end delay has a smaller maximum compared to FIG. 12A, and the maximum delay is about 1000 time-slots. FIG. 14B illustrates the normalized end-to-end delay of all 514 traffic flows leaving the network. The normalized delay is slightly larger compared to FIG. 12A, but it still small and bounded provided that every traffic flow is shaped to have a bounded NSLL at the entry point to the network, and can be filtered out. FIG. 14E illustrates the distribution of the number of packets in the flow-VOQs 106. Observe that the maximum flow-VOQ size is larger, close to 10 packets. The methods for random flow scheduling have increased the maximum size of the flow-VOQs 106, as expected. FIG. 14F illustrates the distribution of the number of packets in the VOQs 16. Observe that every VOQ 16 is bounded in size with a maximum of 32 packets. The methods for random flow scheduling have a reasonably good average performance, according to these computer simulations, but they have poor worst-case performance. If these methods are used in routers, then the traffic should be periodically re-shaped in some other routers to achieve a bounded NSLL.

Large Normalized Service Lead/Lag

FIG. 15 presents the results of the methods for random flow scheduling, when the traffic flows are injected into the network with a larger but bounded NSLL of <=20 packets. Each switch uses the random flow scheduling methods in FIG. 11A and FIG. 11B, which do not minimize the NSLL. FIG. 15A illustrates the end-to-end delay for all 514 flows. The maximum end-to-end delay is approximately 8000 time-slots. FIG. 15B illustrates the normalized end-to-end delay of all 514 traffic flows leaving the network. The maximum normalized delay is now about 80 IIDT, considerably larger than the prior methods. FIG. 15E illustrates the distribution of the number of packets in the flow-VOQs 106. Observe that the maximum flow-VOQ size is about 200 packets. FIG. 15F illustrates the distribution of the number of packets in the VOQs 16. Observe that the maximum VOQ 16 size is approximately 500 packets. This example illustrates several points. When traffic flows are injected into the network with a larger NSLL, even 20 packets, the large bound on the NSLL will increase the buffer sizes in all the switches. In this particular example, each switch selects packets to serve at random, which does not minimize the NSLL. To achieve very small and bounded buffer sizes in every switch, the injected traffic flows should have small and bounded NSLL, and each switch should schedule traffic flows using the non-work-conserving methods which tend to minimize the NSLL.

In some applications, allowing a larger NSLL such as 25 or 50 packets may be acceptable, and allowing the VOQ 16 buffer sizes in the switches to be large enough to accommodate for example 1000 or 10,000 packets may be acceptable. These maximum sizes are still several orders of magnitude smaller than the buffer sizes used in current Internet routers. The important point is that network designers now have a theory for designing buffers in networks. They can now choose the acceptable NSLL bounds, and then design the router buffer sizes accordingly, which was not possible previously.

Other Flow Scheduling Methods

The flow-server 108 can select flow-VOQs 106 in a VOQ 16 for service in several other orders, including: Oldest Cell First (OCF), Largest Flow-Queue First (LFQF), Largest Rate First, round-robin, etc, with similar performances. For example, the Largest Flow-Queue First (LFQF) algorithm could select the flow-VOQ to service with the largest number of queued packets, whenever the VOQ is scheduled for service.

FIG. 15 also illustrates another useful property for network design. Traffic can be reshaped to have a small and bounded NSLL at selected switches or routers within the network, rather than in every router. Every switch or router need not achieve a small and bounded NSLL. Let the switches or routers in a network belong to 2 classes, the traffic-shaping class of routers and the non-traffic-shaping class. The routers in the traffic-shaping class will shape provisioned traffic flows using non-work-conserving schedulers, to achieve a bounded NSLL. The routers in the non-traffic-shaping class will not shape provisioned traffic flows, and may use work-conserving schedulers which do not guarantee a bounded NSLL for the provisioned traffic flows. The sizes of the VOQs 16 in the routers will increase as the bound on the NSLL grows, but the traffic can be reshaped periodically and the bounds on the NSLL can be reduced to acceptable limits, so that all VOQs 16 can be designed with a known upper size, and strict QoS guarantees can still be achieved. Existing IP networks often use periodic traffic-reshaping in selected routers. For example, in the current Internet, DiffServ traffic entering a Differentiated Services domain is typically policed or shaped on entry to the domain to have a maximum burst size. These maximum burst sizes are typically very large. Once the traffic has entered a DiffServ domain, it moves between routers without being reshaped. Existing internet routers are unaware of the concept of the NSLL and they do not guarantee a bounded NSLL. To achieve bounded router buffer sizes and strict QoS guarantees for provisioned traffic flows, the internet routers can be re-programmed to implement traffic shaping with a bounded NSLL on the provisioned traffic flows, periodically (or in every router).

Traffic Matrix Examples

FIG. 16 illustrates several examples of these prior scheduling methods, used to generate the results for FIG. 12. To generate FIG. 12, a computer simulation of a saturated network was performed. The network had 10 input-queued switches in a linear array, each of size 4×4. The scheduling frame had a duration of F-2048 time-slots. FIGS. 16A and 16B illustrates 2 traffic rate matrices T which specify the traffic rates to be supported by the first two 4×4 input queued switches as shown in FIG. 1A. Observe that the sum of every row and every column=2,048, i.e., every input link and every output link is 100% utilized in every time-slot in the scheduling frame. The first element T(1,1) of matrix T in FIG. 16A has rate 490, which represents the sum of the traffic rates of all flows traversing VOQ(1,1). FIG. 16C illustrates the VOQ-transmission-schedules computed for the first input queued switch with the traffic rate matrix T in FIG. 16A. Each row represents a VOQ-transmission-schedule for one input port 12. In each row and in each time-slot, each input port 12$j$ with index j, for 0<=j<4, is connected to one output port 14$k$ with index k, for 0<=k<4. The connections are shown only for the first 8 time-slots out of 2,048 time-slots. (These VOQ-transmission-schedules must be modified slightly for use in the method of FIG. 9A, which requires a VOQS schedule as a binary vector input).

FIG. 16D illustrates the 33 flows which are associated with VOQ(1,1) in the first input queued switch 10 with the matrix T in FIG. 16A. There are a total of 514 traffic flows, and each traffic flow is identified by an integer between 1 and 514.

FIG. 16E illustrates the flow-transmission-schedules, computed using the method Static-Flow-Schedule in FIG. 9A, for each input port 12 in the first switch 10. Each row represents the flow-transmission-schedule for one input port. The flow-transmission-schedule indicates the flow-VOQ to be served in each time-slot, by the flow-server.

Traffic Aggregation and MPLS Networks

In this section, we explore the buffer requirements for aggregated traffic flows in a hierarchical network. Networks are often organized in hierarchies, with local area networks, metro-area networks, and wide-area networks. Referring to FIG. 7A, a VOQ 16 in a wide area backbone network may support potentially thousands of distinct traffic flows without aggregation. It is desirable to aggregate traffic flows at one level of the hierarchy, before injection into the next higher level.

FIG. 17A illustrates a routing table, which can be used in the routing module 20 in an input port 12 of the switch in FIG. 1A. Assume that each traffic flow passing through one VOQ 16 is identified by 2 unique numbers, the incoming label, and the outgoing label. In a typical MPLS network, a packet arrives on an incoming link with an incoming label. This incoming label is used to read a routing table, as shown in FIG. 16A. The routing table will indicate the new outgoing label for the traffic flow, and the output port.

In the table in FIG. 17A, each row represents one traffic flow. There are 4 columns for each flow. The column LABEL-IN identifies the incoming label, the column LABEL-OUT identifies the outgoing label, the column OP-PORT identifies the outgoing output port 14 in FIG. 1A, and column RATE identifies the rate of the traffic flow. In this example, the rate is expressed as a number of time-slot reservations in a scheduling frame of length F time-slots.

In the table in FIG. 17A, three traffic flows with incoming labels 27, 130 and 94 all pass through the same VOQ 16 since they have a common output port with label 1. Without any aggregation, each traffic flow is treated as an independent traffic flow, and has its own flow-VOQ 106 as shown in FIG. 7A. In FIG. 7A, each flow is scheduled separately by the flow-controller 102. Each flow also receives its own unique outgoing label.

With aggregation, all 3 traffic flows with incoming labels 27, 130 and 94 can be aggregated to be treated as one logical flow on the outgoing link of this router and in the following routers. In FIG. 17B, all three traffic flows are assigned the same outgoing label, 103. In the following routers, the traffic flow with incoming label 103 is treated as one logical flow with rate 45+25+35=105. In the following routers, the aggregated traffic flow can use one flow-VOQ 106, and the aggregated traffic flow is scheduled as one flow with a higher rate of 105 time-slot reservations per scheduling frame.

When packets from multiple traffic flows are aggregated into one flow without any buffering, it can be shown that the new bound of the NSLL of the aggregated flow is the sum of the bound on the NSLL for each flow. For example, the aggregation of 100 flows, each with a bounded NSLL<=K packets, may result in a new flow where the bound on the NSLL is 100*K packets. This large bound on the NSLL will result in larger queues, and therefore it is desirable to bound the NSLL of the aggregated flow to some integer K.

Therefore, when multiple flows are aggregated into a single aggregated-flow care should be taken to ensure a bounded NSLL. One method to aggregate multiple flows while maintaining a bounded NSLL<=K is to use a token bucket traffic shaper 82 as shown in FIG. 4A for each flow being aggregated. The capacity of the token bucket queue 84 determines the allowable burstiness for any one flow, and determines the bound on the NSLL. This case is illustrated in FIG. 17C. FIG. 17C illustrates an input port 12 for the router in FIG. 7A. In FIGS. 1A and 7A, each VOQ 16 has an associated VOQ-module 100.

In FIG. 17C, the flows in the VOQ module 100 each have a traffic shaper module 400. Each traffic flow entering a flow-VOQ 106 is first shaped by a traffic shaper 400, which redistributes any incoming bursts of packets over a longer time interval. The traffic shaper 400 will prevent bursts of packets associated with any one traffic flow from propagating through the network, and will lower the NSLL.

An alternative embodiment of a VOQ-module 100 as shown in FIG. 17C is shown in FIG. 17D. In FIG. 17D, each VOQ-module 100 now has several aggregation modules 109. Each aggregation module 109 consists of several flow-VOQs 106, an aggregation server 107, and a token bucket traffic shaper 400. Traffic flows entering the input port 12 are forwarded to the appropriate VOQ-module 100 associated with the desired output port 14 by the server 15, as shown in FIG. 17C. As stated earlier, the flow-controller 102 processes the packets to determine which flow they belong to, and controls the flow-demultiplexer 104 to forward the packets to the appropriate flow-VOQs 106. In FIG. 17D, the flow-VOQs are organized into regular flow-VOQs, and into flow-VOQs which reside in an aggregation module 109. The traffic flows which are to be aggregated into one flow are forwarded to flow-VOQs in an aggregation module 109. The aggregation module 109 combines the packets using an aggregation server 107. The aggregation server 107 provides each flow-VOQ with fair service, and adds their packets into the traffic shaper 400. The aggregation server 107 is controlled by a controller, which may be the flow-controller 102. The aggregation server 107 can be controlled by the method Static_Flow_Schedule in FIG. 9A, or the dynamic flow-scheduling methods in FIGS. 10A and 10B with bandwidth-sharing disabled, which will minimize the NSLL. In the traffic shaper 400, packets are served in their order of arrival. The token bucket traffic shaper 400 can only transmit a packet when it is selected by the server 108, and when it has sufficient tokens to enable the packet to be transmitted. Packets which depart the traffic shaper 400 will therefore have a bounded maximum NSLL.

The aggregation server 107 is logically no different from the VOQ-server 18 or the flow-server 108 in FIG. 7A. Therefore, each flow being aggregated will require a flow-VOQ 106 with capacity O(K) cells. Once again, it is convenient to visualize each flow as having its own virtual flow-VOQ 106 in the aggregation module 109, but the memory for these flow-VOQs may be common and shared, just as the flow-VOQs 106 can be logical abstractions and can be maintained using pointers to a common memory. The aggregation server 107 can use any of the flow scheduling methods examined earlier. It can use the method Static_Flow_Schedule in FIG. 9A, or it can use the dynamic flow scheduling methods in FIGS. 10A and 10B with bandwidth-sharing disabled, to minimize the NSLL. It can also use other methods such as the random flow scheduling method, Longest-Queue-First, Oldest-Cell-First, etc, although these will not minimize the NSLL and may lead to an unbounded NSLL.

Traffic aggregation can happen hierarchically, so that traffic flows can be aggregated to create aggregated traffic flows with one level of aggregation. However, these aggregated traffic flows can be further aggregated in other routers. Therefore, in a backbone Internet Protocol/MPLS network, there may a relatively small number of highly-aggregated traffic flows between a pair of cities, rather than a very large number of unaggregated traffic flows between the same pair of cities.

Networks can often be viewed in a hierarchy, with local area networks, metropolitan area networks, and wide area (i.e., backbone) networks. A traffic flow may originate in a local area network in one city, it may traverse the backbone network, and be delivered to a local area network in another city. At the backbone level, the traffic flow may be viewed as originating at a source node and terminating at a destination node within the backbone network. The traffic flow may be injected into the local area network without a bounded NSLL, and it may be shaped at the source node when it enters the backbone network to have a bounded NSLL. Similarly, the traffic flow may be delivered over the backbone network with a bounded NSLL, and it may be delivered over the destination local area network with an unbounded NSLL. In this manner, a traffic flow may use a bounded NSLL within a backbone network at one level of the hierarchy, and it may use an unbounded NSLL at a lower level of the hierarchy. This hierarchical technique will allow many computers and servers to use the bursty TCP flow-control methods at a local area network level. This hierarchical technique will allow routers to achieve bounded buffer sizes, higher capacities and strict QoS guarantees at the higher levels of the hierarchy.

The previous discussion allows for several traffic flows to be aggregated into single flows with higher rates. These aggregated traffic flows can be routed and scheduled through a network, to achieve bounded router buffer sizes and strict Quality of Service guarantees. The next section will present an alternative method to achieve bounded buffer sizes and strict QoS guarantees, which requires less processing in the routers.

Traffic Classes and the Diffserv Model

Much of the existing Internet relies upon the Differentiated Services (DiffServ) service model, which is described in [3] on pages 717-722. This (DiffServ) model allows for several prioritized or differentiated traffic classes in a router. Let the traffic flows between source and destination nodes be assigned a traffic class. For example, the Differentiated Services model currently used by many routers has 3 main traffic classes, the 'Expedited Forwarding' (EF) traffic class, the 'Assured Forwarding' (AF) traffic class, and the 'Best-Effort' (BE) traffic class. The DiffServ model also allows several sub-traffic classes, within each main traffic class. Several sub-classes in the AF class are differentiated by their 'drop-precedence', i.e., how important their packets are, which can be used when packets are dropped due to congestion.

To include traffic classes in an input port 12 as shown in FIG. 1A, separate virtual output queues can be created for each traffic class. For example, a router may have 3 main traffic classes associated with each VOQ, corresponding to the DiffServ EF, AF and BE traffic classes. (A router could have several more traffic classes.) Traffic for each class is forwarded into the appropriate traffic-class-VOQ, which is analogous to the flow-VOQ. The traffic-class-VOQs may be quite large, as the traffic from potentially hundreds or thousands of flows may be assigned to the same traffic-class-VOQ. The router is simplified since it no longer distinguishes significantly between the flows or packets within the same traffic-class-VOQ.

Consider the Input Port 12 shown in FIG. 18A. The input port 12 consists of a router controller 20, a VOQ-demultiplexer 15, several traffic-class modules 410, several VOQs 16, a VOQ-server 18 and an input port controller 110.

In FIG. 18A, arriving packets are processed by the router controller 20, which examines the packet header to determines the appropriate output port 14 and the traffic class (if any) of the packet. Each VOQ 16 has an associated traffic-class module 410, which stores the DiffServ packets associated with the VOQ 16. Each traffic-class module 410 consists of a controller 402, a class-demultiplexer 404, several traffic-class-VOQs 406, zero or more regular flow_VOQs 106, a class server 420 and a controller 421. One traffic-class-VOQ 406 may contain packets from hundreds or thousands of different traffic flows, and these packets all have a common DiffServ traffic class, for example EF, AF or BE. When a packet arrives at the input port 12, its header is examined in router module 20, and it may be forwarded by the demultiplexer 15 to the appropriate traffic-class module 410 associated with a VOQ. Traffic flows and traffic classes which are associated with one VOQ and which have bandwidth provisioned for them are routed to the traffic-class-module 410. When a VOQ 16 receives service from the input port controller 110 according to the VOQ-transmission-schedule, the traffic-class module 410 associated with the VOQ 16 is activated to select a packet to serve, from all the traffic-class-VOQs and the flow-VOQs. The class controller 402 will process the status of the traffic-class-VOQs 406 and the flow_VOQs 106, to determine which VOQ and packet to select for service, and control the server 420.

There are several methods in which a class server 420 can select a VOQ and packet for service, when it is enabled for service. The method Static-Flow-Schedule in FIG. 9A can be used to schedule traffic classes and traffic flows. The method will guarantee a bounded NSLL for an aggregated traffic class leaving the routers and a flow-VOQ leaving the router. If static methods are used, the schedules can be loaded into the controller 421 which can control the server 420, until the schedules are recomputed. Alternatively, the methods which dynamically schedule a flow for service in FIGS. 10A and 10B can be modified slightly to consider both traffic-class-VOQs and flow_VOQs and can be used. The dynamic flow-scheduling methods had 2 options, where the excess bandwidth sharing property is enabled or disabled. If the excess bandwidth sharing property is enabled, then these dynamic flow scheduling methods may result in a larger NSLL for the total traffic of traffic class, and for each flow in a flow_VOQ. This increase in the bound on the NSLL may be undesirable, unless the traffic is shaped periodically in other routers. If the excess bandwidth sharing property is disabled, then the dynamic flow scheduling methods will result in a bounded NSLL for the total traffic of a traffic class leaving the router, and a bounded NSLL for each flow leaving a router.

Another method to ensure a bounded NSLL for each traffic class, we may add a token bucket traffic shaper 408 to each class of traffic, and potentially to each flow_VOQ 106, as shown in FIG. 18B. The token bucket traffic shapers 408 are based on the design in FIG. 4A. The method Static-Flow-Schedule in FIG. 9A can be used to schedule traffic classes and traffic flows by the class controller 402 in FIG. 18B. Alternatively, the methods for dynamically scheduling a traffic flow in FIGS. 10A and 10B can be modified to include both traffic classes and traffic flows, and these methods can be used by the class controller 402 in FIG. 18B.

Co-Existence of QoS-Enabled Traffic and Best-Effort Traffic

In may be desirable to integrate the proposed flow-VOQs and class-queues with bounded buffer sizes and QoS guarantees into routers, along with the existing Best-Effort Internet traffic. This concept is illustrates in FIG. 19A. Let the network distinguish between two types of traffic: 'QoS-enabled' traffic which is periodically reshaped to have a bounded NSLL and is delivered with QoS guarantees, and regular 'Best-Effort' (BE) internet traffic which does not have a bounded NSLL and is delivered on a best-effort basis. For example, regular best-effort Internet traffic may use the bursty TCP flow-control protocol, so that a traffic flow does not have a bounded NSLL.

FIG. 19A illustrates an input port 12, where the buffers are logically partitioned into two types, buffers for QoS-enabled traffic and buffers for regular Best-Effort Internet traffic. The router controller 20a can distinguish between these two types of traffic on the network: the QoS-enabled traffic and the regular Best-Effort Internet traffic.

The QoS-enabled traffic may consist of a new DiffServ traffic class (i.e., a new EF class for traffic with a bounded NSLL). Traffic belonging to this new QoS-enabled class is transmitted into the network at the source node with a bounded NSLL (when viewed at the appropriate level of the network hierarchy). The QoS-enabled traffic may also consist of a traffic flow which is transmitted into the network with a bounded NSLL, and which has provisioned bandwidth along its path using an RSVP-like control protocol. The QoS-enabled traffic may also consist of an MPLS traffic flow or an aggregated MPLS traffic flow which is transmitted into the network at the source node with a bounded NSLL, and which has provisioned bandwidth along its path using an MPLS-like control protocol.

Incoming packets are processed by a controller 20a, which controls a demultiplexer 15a.

Module 500 contains all the VOQs 16 for QoS-enabled traffic. Module 502 contains all the VOQs for existing Best-Effort Internet traffic. The controller 20a reads the packet header, and directs each incoming packet to the appropriate module 500 for QoS-enabled traffic or module 502 for Best-Effort traffic. Controller 20a may also perform policing functions. Any packets which have excessively bursty traffic characteristics are forwarded to the Best-Effort module 502. Module 500 has a controller 20b,a demultiplexer 15b to direct the packet into the appropriate class-based VOQ 16, and a VOQ server 18b for QoS-enabled traffic. Similarly, the Best-Effort module 502 has a controller 20c, a demultiplexer 15c to direct the packet into the appropriate best-effort VOQ 16, and a VOQ server 18c for Best-Effort traffic. The demultiplexers 15a, 15b and 15c are drawn as logically distinct entities, but they may be realized in fewer physical demultiplexers 15 which logically perform the same functions. Similarly, the servers 18a, 18b and 18c are drawn as logically distinct entities, but they may be realized in fewer physical servers 18 which are logically perform the same functions.

The servers 18a, 18b, 18c can be controlled using the static flow-scheduling methods described earlier, or the dynamic flow scheduling methods described earlier, with minor changes. If static flow-scheduling methods are used, the schedules can be stored in the controllers 110 and re-used, until they are recomputed.

FIG. 19B illustrates the input port 12 from FIG. 19A, in more detail. The input port 12 in FIG. 19B consist of a controller 20a and a server 15a. It also has several VOQ-modules 410 for QoS-enabled traffic. Each VOQ-module 410 is associated with one VOQ or output port and contains several class-VOQs 406 and flow-VOQs 106. The input port 12 also has a controller 20b and a demultiplexer 15b for QoS-enabled traffic. The input port 12 also has a controller 20c, a demultiplexer 15c, and several VOQs 16 for best-effort traffic. It has a VOQ-server 18b for QoS-enabled traffic, a VOQ-server 18c for best-effort traffic, and a server 18a which may select a QoS-enabled VOQ or a best-effort VOQ for service in one time-slot. The usual Best-Effort internet traffic, including the usual DiffServ traffic which has no guaranteed bound on the NSLL, can be handled by the Best-Effort VOQs 16. QoS-enabled traffic flows, which request bounded buffer sizes and guaranteed QoS and which have a bounded NSLL, are handled by the VOQ-modules 410.

The router controller 20a will distinguish between the two types of traffic on the network: QoS-enabled traffic which is reshaped periodically to have a bounded NSLL, and regular Best-Effort internet traffic which does not have a bounded NSLL. The QoS-enabled traffic may consist of a new DiffServ traffic class (i.e., a new EF class). Traffic belonging to this new class is transmitted into the network at the source node with a bounded NSLL (at an appropriate level of the hierarchical network). The QoS-enabled traffic may also consist of a traffic flow which is transmitted into the network with a bounded NSLL, and which has provisioned bandwidth along its path using an RSVP-like control protocol. The QoS-enabled traffic may also consist of an MPLS traffic flow or an aggregated MPLS traffic flow which is transmitted into the network at the source node with a bounded NSLL, and which has provisioned bandwidth along its path using an MPLS-like control protocol.

In FIG. 19B, arriving packets are processed by the controller 20a, which examines the packet header to determine the appropriate output port 14 and the type of service, i.e., QoS-enabled or Best-Effort. Packets belonging to a QoS-enabled traffic class or traffic flow with a bounded NSLL can be forwarded to controller 20b. Controller 20b will control the demultiplexer 15b and direct the packet to the appropriate VOQ-module 410. Each VOQ-module 410 has several traffic-class-VOQs 406 and several flow_VOQs 106. Each traffic-class-VOQ 406 stores all the packets belonging to one QoS-enabled traffic class. Each flow-VOQ 106 stores all the packets belong to one QoS-enabled traffic flow or one aggregated QoS-enabled traffic flow. The basic VOQs 16 will store all other best-effort packets, i.e., packets which are not QoS-enabled, or packets which do not have a bounded NSLL.

In each time-slot, the IP-controller 110a in an input port will enable the VOQ-server 18a to select either a VOQ-module 410 for service, or a regular best-effort VOQ 16 for service.

The control signals for the controller 110a can be computed using the static flow scheduling methods of FIG. 9 or the dynamic flow-scheduling methods of FIG. 10 (with excess bandwidth sharing disabled). These control signals can be computed dynamically, or they can be precomputed for a scheduling frame and re-used for subsequent scheduling frames, when the provisioned traffic rates between the input ports and output ports for QoS-enabled traffic flows do not change. When a VOQ-module 410 receives service from the VOQ-server 18, the server 420 must select a class-VOQ 406 or a flow-VOQ 106 for service.

The control signals for the server 420 can be computed using the static scheduling methods of FIG. 9 or the dynamic scheduling methods of FIG. 10. If the static methods are used, the schedules can be stored in controller 421 and be reused, until they are recomputed. Each virtual queues in VOQ-module 410 may have an associated rate, i.e., each class-VOQs 406 may have a rate, and each flow_VOQs 106 may have a rate. These rates are expressed as time-slot reservations per scheduling frame, and the sum of all these rates must be <=F, which is the number of time-slot reservations in an scheduling frame.

For example, the method Static_Flow_Schedule in FIG. 9A can be used to compute the control signals for VOQ-servers 18b and 18c. The method can schedule traffic class-VOQs and traffic flow-VOQs together, rather than just traffic flows-VOQs alone. The method accepts 2 inputs, a vector 'rate' and a vector 'VOQS'. To compute a schedule for server 18b, let the incoming vector VOQS be a vector where VOQS(t)=1 indicates that the server 18b is enabled for service in time-slot 't'. Let the input vector 'rate' be the rates of the class-VOQs and the flow-VOQs. The vector FVOQS returned by the method in FIG. 9A will be a schedule, which identifies which class-VOQ 406 or which flow-VOQ 106 should be served in time-slot T (assuming the server 18b is enabled in time-slot T). This schedule will have a bounded NSLL for each class-VOQ or flow-VOQ, since the traffic requirements of each VOQ are scheduled approximately evenly in each half of the scheduling frame, and this property applies recursively. This schedule can therefore be used to control the VOQ-server 18b. The method Static_Flow_Schedule_RealTime in FIG. 9C can also be used to control the server 18a to schedule between two types of traffic, QoS-enabled traffic or Best-Effort traffic, for the special case where every time-slot is available for scheduling. The method Static_Flow_Schedule in FIG. 9A can also be used to compute control signals for the server 18c, to select a best-effort VOQ 16 for service when the best-effort server 18c is enabled. The dynamic flow-scheduling methods in FIGS. 10A and 10B can also be used to schedule servers 18a, 18b and 18c. The excess bandwidth sharing property may be disabled, to minimize the NSLL.

Within a VOQ-module 410, here are several methods in which a server 420 can select a packet for service, when it is enabled for service. The method Static_Flow_Schedule in FIG. 9A can be used to schedule all QoS-enabled traffic classes and traffic flows. The method can guarantee a bounded NSLL for QoS-enabled traffic classes leaving the routers and QoS-enabled flows leaving the router. Alternatively, the dynamic flow-scheduling methods in FIGS. 10A and 10B can be modified slightly to consider both QoS-enabled traffic-class-VOQs 406 and flow-VOQs 106 and can be used. (For dynamic flow-scheduling, the excess bandwidth sharing property may be disabled in some routers, to reshape the traffic and achieve a bounded NSLL).

The router controller 20 will forward all non-QoS-enabled traffic, or traffic with inherently bursty traffic profiles, to the best-effort VOQs 16, where it is handled as it is in the current Best-Effort Internet network. The VOQs 16 are scheduled for service by a best-effort controller 110c, which controls the best effort VOQ-server 18c. For example, all existing Internet routers use heuristic best-effort schedulers for scheduling the transmissions of the best-effort VOQs.

The VOQ-modules 410 will require negligible buffer space in a router, compared to the basic best-effort VOQs 16. Theorems 1-4 and extensive simulations indicate that a VOQ-module 410 can require a small fraction, i.e., 1% or less, of the amount of buffer space associated with a best-effort VOQ 16.

Other Embodiments

Applications to CIXQ and CIOQ Switches

Referring to the Input queued switch 10 shown in FIG. 1A, the VOQ-transmission-schedules for the input ports 12 in FIG. 1A can be computed using the method described in [18], which guarantees that each VOQ 16 receives its requested service with a bounded NSLL, provided that the switch size N and the length of the scheduling frame F are bounded. The method in [18] can also be used to schedule the switches in FIGS. 1B, 1C and 1D.

Other methods exist to schedule the switches in FIGS. 1B, 1C and 1D while achieving bounded buffer sizes and strict QoS guarantees. According to Theorems 1-4 stated earlier, each of these switches will maintain bounded queue sizes and achieve strict QoS guarantees for all traffic flows, if the traffic at each class-VOQ or flow-VOQ arrives with a bounded NSLL<=K, if the traffic at each class-VOQ or flow-VOQ departs with a bounded NSLL<=K. According to Theorem 1, the class or flow-VOQ sizes will be bounded. Therefore, it is desirable to explore alternative scheduling methods which achieve bounded NSLL.

FIG. 1B illustrates a CIXQ switch with input ports 12 and a switching matrix 32 which contains internal crosspoint queues 34. FIG. 10 illustrates a CIIOQ switch with input ports 12 and a switching matrix 32, which contains internal input queues 35 and internal output queues 36.

The CIXQ switch in FIG. 1B can be made simpler to schedule, at the expense of having larger (but bounded) buffers and queues within the switching matrix 32. According to theorems 1-4, let each crosspoint queue 34 have a size of 2K or 4K packets. Let each input port 12 transmit packets into the switching matrix 32 with a bounded NSLL=K, at any rate less than or equal to 100%, i.e., the links 31 from the input port 12 to the switching matrix 32 can be partially or fully loaded. If the internal crosspoint queues 34 are sufficiently large, i.e., have a size of 2K or 4K packets, then the computation of the VOQ-transmission-schedule can be simplified. Let the CIXQ switch have a traffic matrix T, which specifies the traffic between input ports 12 and output ports 14, as shown in FIG. 16A. This matrix can be configured by an autonomic controller, or by the system administrator. Each row j of the matrix T, for $1<=j<=N$, can be processed to yield a VOQ-transmission-schedule for input port j, which guarantees a bounded size for the VOQ. There are 2 methods for processing the row j of the matrix. The first method is a Static-VOQ scheduling method. The method Static_Flow_Schedule_RealTime in FIG. 9C can be used to schedule VOQs instead of individual traffic-flows, for the special case when every time-slot is available for scheduling. The method accepts 2 inputs, a vector 'rate' and a vector 'VOQS'. Let the incoming vector VOQS be a vector of all 1s, indicating that all time-slots in the scheduling frame are available to be used. Let the input vector 'rate' be the row j of the matrix T. The vector FVOQS returned by the method in FIG. 9A will be a VOQ-transmission-schedule, which identifies which VOQ should be served in which time-slot. This VOQ-transmission-schedule will have a bounded NSLL for each VOQ, since the traffic requirements of each VOQ are scheduled approximately evenly in each half of the scheduling frame, and this property applies recursively. This VOQ-transmission-schedule can be used in the input port 12, to control the VOQ-server 18. The method Static_Flow_Schedule in FIG. 9A can also be used to schedule the flows within each VOQ, or the traffic classes within each VOQ, as described earlier. Therefore, the CIXQ switch can be scheduled to achieve bounded buffer sizes and strict QoS guarantees for every class-VOQ or flow-VOQ, sharing a VOQ.

The CIIOQ switch in FIG. 1C can also be simpler to schedule relative to the pure IQ switch in FIG. 1A, at the expense of having larger (but bounded) buffers and queues. The CIIOQ switch in FIG. 1C can use sufficiently large internal input queues 35 in the switching matrix, and sufficiently large internal output queues 36 in the switching matrix. According to theorems 1-4, let each internal input queue 35 or internal output queue 36 have a size of approx. 2K or 4K packets. Let each input port 12 transmit packets from the class-VOQs or the flow-VOQs with a bounded NSLL, at any rate less than or equal to 100%, i.e., the links 31 from the input port 12 to the switching matrix 32 can be fully loaded.

The method Static_Flow_Schedule_RealTime in FIG. 9C can be used to compute a VOQ-transmission-schedule for the 01100 switch, in the same manner it was used for the CIXQ switch. The same method Static_Flow_Schedule in FIG. 9A can also be used to schedule the flows within each VOQ, or the traffic classes within each VOQ, as described earlier. Therefore, the 01100 switch can be scheduled to achieve bounded buffer sizes and strict QoS guarantees for every class-VOQ or flow-VOQ, sharing a VOQ, using static scheduling algorithms.

The above methods compute static schedules, which are valid as long as the traffic rates in the traffic rate matrix remain constant. In practice, in a backbone router these traffic rates may change periodically, perhaps 100 times a second, so the schedules must be recomputed at this rate. The static transmission-schedules may be stored and re-used for subsequent frames, until they are recomputed.

The CIXQ switch and the CIIOQ switch can also be scheduled using the methods to dynamically schedule traffic flows, as shown in FIGS. 10A and 10B. For example, the methods Dynamic_Add_Packet and Dynamic_Rem_Packet can be modified and used, with the bandwidth sharing option disabled. Every time a packet arrives for a traffic-class-VOQ or a flow-VOQ, the method Dynamic_Add_Packet is used to assign a VFT. In each time-slot, the method Dynamic_Remove_Packet can be used to identify a class-VOQ or a flow-VOQ for service within a VOQ. The same dynamic scheduling methods can be modified and can also be used to schedule the VOQs, using a VOQ-server 18. Therefore, the CIIOQ switch can be scheduled to achieve bounded buffer sizes and QoS guarantees for class-VOQs or flow-VOQs sharing a VOQ, using dynamic scheduling algorithms.

In a one-level Dynamic scheduling method, the method Dynamic_Add_Packet of FIG. 10A and Dynamic_Remove_Packet of FIG. 10B can be used to add and remove packets from each input port, where all VOQs within one input port are no longer differentiated. The excess bandwidth sharing feature should be disabled, so ensure that the traffic is transmitted with a bounded NSLL. In a two-level Dynamic scheduling method, the method Dynamic_Add_Packet of FIG. 10A and Dynamic_Remove_Packet of FIG. 10B can be used add and remove packets from each VOQ. A first server selects the VOQ to service using server 18, and a second server selects the flow within the to service, as described earlier.

In a CIXQ switch, each column server 37 in the switching matrix 32 can be scheduled using the methods of FIG. 9 or 10, or any other heuristic algorithm such a Random-Selection, Longest-Queue-First, or Oldest-Cell-First, etc. When the methods of FIGS. 9 and 10 are used, then according to theorems 1-4 stated earlier, the sizes of the flow-VOQs 106 and the XQs 34 will remain small and bounded. When other methods such as Oldest-Cell-First are used, then according to extensive simulations, the sizes of the flow-VOQs 106 and the XQs 34 will remain small and statistically bounded.

All-Optical Networks

All optical networks typically buffer optical packets in fiber loops. Typically, each nanosecond of transmitted optical data occupies about 0.2 meters of fiber. At a 40 Gbps transmission rate, a packet with 1000 bytes will hold approx. 8000 bits which requires 200 nanoseconds to transmit. Therefore, a fiber loop buffer for an optical packet requires about 40 meters of fiber. It is desirable to minimize the number of optical packet buffers in an optical packet switch. All optical networks should transmit provisioned traffic flows with the smallest possible NSLL, and each switch should use a non-work-conserving flow-scheduler to maintain a very small and bounded NSLL.

To minimize the amount of buffering, an optical switch can use an IQ switch design as shown in FIG. 1A. According to the data in FIG. 12, an optical switch can be designed with approximately 2 optical packet buffers per provisioned traffic flow per optical packet-switch. Traffic aggregation and traffic classification could be used, to limit the amount of buffering. The Static-Flow-Scheduling scheduling method in FIG. 9A can be implemented in an electronic processor, to compute a flow-transmission-schedule for each input port. This schedule can be stored and used to control the optical buffers, so that every class-VOQ or flow-VOQ achieves a bounded NSLL and bounded buffer sizes.

Wireless Mesh Networks

It has been shown that the problem of scheduling traffic in an infrastructure wireless mesh network can be transformed to the problem of scheduling traffic in an IQ switch as shown in FIG. 1A. In the paper [24] by T. H. Szymanski entitled "A Conflict-Free, Low-Jitter Guaranteed-Rate MAC Protocol for Base-Station Communications in Wireless Mesh Networks", Proc. First Int. Conference on Access Networks, Las Vegas, October 2008, a schedule computed for IQ switches can be transformed to a schedule for a multi-hop wireless mesh network. In the transformation, the Input ports of the IQ switch become the output ports of a wireless router in the wireless mesh network. Wireless mesh routers have a unique property that the router typically only receives one packet per time-slot over its wireless radio. Therefore, by following the transformation methodology described in the paper [24], schedules computed for an IQ switch can be transformed to schedules for a wireless mesh network.

The static flow scheduling method in FIG. 9A can be implemented in an electronic processor, to compute a flow-transmission-schedule for each wireless router. These schedules can be stored and used to control the wireless router. The dynamic flow-scheduling method in FIG. 10 can be used to compute a flow-transmission-schedule for each wireless router. These schedules can be stored and used to control the wireless router, so that every class-VOQ or flow-VOQ achieves a bounded NSLL, bounded buffer sizes and QoS guarantees.

SUMMARY

Of course, the above described embodiments are intended to be illustrative only and in no way limiting. The described embodiments of carrying out the invention are susceptible to many modifications of form, arrangement of parts, details and order of operation. The invention, rather, is intended to encompass all such modifications within its scope, as defined by the claims.

For example, the buffers and queues in the routers have been described as flow-VOQs, VOQs, class-VOQs, etc. In practice, all these queues may reside in the same memory and may be defined through pointers to memory, and they may exist only as logical abstractions. In the CIXQ switch, the multiple VOQs in each input port are technically not required, as they could be collapsed into one large virtual queue which contains all packets arriving at one input port. This variation is easily handled with the proposed methods.

What is claimed is:

1. A switch for transmitting a plurality of traffic flows over a scheduling frame comprising F time-slots for integer F>0, wherein each of the traffic flows belongs to either a first traffic class or a second traffic class, and wherein each of the traffic flows has an associated data rate, comprising:

N input ports, M output ports for integers N>0 and M>0;

N×M Virtual Queues (VQs) for buffering data associated with the traffic flows, wherein each of the N×M VQs is associated with an input port and an output port, and M of the VQs are associated with each one of the N input ports, wherein each of the traffic flows is associated with one VQ, and wherein each of said VQs is associated with a guaranteed data rate;

wherein each of said VQs is further partitioned into a first sub-queue and a second sub-queue, wherein said first sub-queue buffers data associated with those of the traffic flows belonging to the first traffic class, wherein said second sub-queue buffers data associated with those of the traffic flows belonging to the second traffic class, and wherein each of said sub-queues is associated with a guaranteed data rate;

memory for storing a first schedule, wherein said first schedule specifies for each input port which associated VQ, if any, has a reservation to transmit data to its associated output port in each time-slot in said scheduling frame;

memory for storing a second schedule, wherein said second schedule specifies for each of said VQs which has a reservation to transmit data in a time-slot in said scheduling frame, which of its associated sub-queues, if any, has a reservation to transmit data in said time-slot;

wherein the first schedule provides each of said VQs with a guaranteed rate of transmission through said switch in each scheduling frame, sufficient to satisfy its guaranteed data rate requirement; and wherein the second schedule provides each of the first and second sub-queues associated with each of said VQs with a guaranteed rate of transmission through said switch in each scheduling frame, sufficient to satisfy its guaranteed data rate requirement.

2. The switch of claim 1, wherein the first schedule provides each of the VQs with a relatively constant guaranteed rate of transmission through said switch in each scheduling frame, wherein for each VQ the number of transmission reservations allocated to that VQ in each quarter of the scheduling frame differ by at most K, where K is a positive integer <=3.

3. The switch of claim 2, wherein the second schedule provides each sub-queue with a relatively constant guaranteed rate of transmission through said switch in each scheduling frame, wherein the number of transmission reservations allocated to each sub-queue in each quarter of the scheduling frame differ by at most K, where K is a positive integer <=3.

4. The switch of claim 3, further comprising a controller, wherein said controller comprises a processor to process incoming packets associated with a sub-queue, and memory to record the state of said sub-queue, wherein said controller determines which of said packets is admissible and will be forwarded into said sub-queue, and wherein an admissible packet will not cause the size of said sub-queue to exceed a predetermined upper limit.

5. The switch of claim 4, wherein said controller will forward at most R packets associated with one traffic flow into the sub-queue which stores packets for said traffic flow per scheduling frame when averaged over many scheduling frames, when said traffic flow has an associated data rate equivalent to R time-slot reservations per scheduling frame, where R is a positive integer <=F.

6. The switch of claim 3, wherein the first traffic class is a new traffic class in a differentiated services model, wherein each traffic flow belonging to said new traffic class will receive a deterministic and guaranteed rate of transmission in each scheduling frame.

7. The switch of claim 3, further comprising a plurality of third queues, wherein each of the third queues is associated with an input port and an output port, and wherein data which is to be transmitted on a best-effort basis between an input port and an output port is buffered in the third queue associated with said input and output ports, and wherein a third queue is eligible to transmit data through the switch in the time-slots when the connection through the switch between said input and output ports is not used by one of the VQs.

8. The switch of claim 3, wherein the output ports contain buffers, and wherein the data transmitted from each of the VQs to an output port will be buffered at the output port.

9. The switch of claim 3, wherein buffers are interposed between the input ports and the output ports, and wherein the data transmitted from each of the VQs to an output port will be buffered at one of said interposed buffers.

10. The switch of claim 3, wherein each of the VQs stores data in all-optical format.

11. The switch of claim 1,
wherein for each of said VQs with a guaranteed rate of transmission equal to B transmission reservations per scheduling frame for positive integer B<=F, the number of transmission reservations for that VQ in time-slots 1 . . . E of said first schedule for positive integer E<=F deviates from the pro-rated number of transmission reservations equal to (E/F)*B, by no more than a positive integer K<=4.

12. The switch of claim 11,
wherein for each of said sub-queues with a guaranteed rate of transmission equal to C transmission reservations per scheduling frame for positive integer C<=F, the number of transmission reservations for that sub-queue in time-slots 1 . . . E of said second schedule for positive integer E<=F deviates from the pro-rated number of transmission reservations equal to (E/F)*C, by no more than a positive integer K<=4.

13. A switch for transmitting a plurality of traffic flows over a scheduling frame comprising F time-slots for integer F>0 wherein each of the traffic flows belongs to either a first traffic class or a second traffic class, and wherein each of the traffic flows has an associated data rate, comprising:

N input ports, M output ports for integers N>0 and M>0;
N×M Virtual Queues (VQs) for buffering data associated with the traffic flows, wherein each VQ is associated with an input port and an output port, wherein M VQs are associated with each input port, wherein each traffic flow is associated with one VQ, and wherein each of said VQs is associated with a guaranteed data rate;

wherein each of said VQs is further partitioned into a first sub-queue and a second sub-queue, wherein said first sub-queue buffers data associated with traffic flows belonging to the first traffic class, wherein said second sub-queue buffers data associated with traffic flows belonging to the second traffic class, and wherein each of said sub-queues is associated with a guaranteed data rate;

memory for storing a first schedule, wherein said first schedule specifies for each input port which associated VQ, if any, has a reservation to transmit data to its associated output port in each time-slot in said scheduling frame;

a scheduling-processor, wherein for each time-slot in which a particular VQ has a reservation to transmit data, said scheduling-processor processes its associated sub-queues and specifies which of its associated sub-queues, if any, is enabled to transmit data;

wherein the first schedule provides each of said VQs with a guaranteed rate of transmission through said switch in each scheduling frame, sufficient to satisfy its guaranteed data rate requirement; and wherein the scheduling-processor provides each of the sub-queues with a guaranteed rate of transmission through said switch in each scheduling frame, sufficient to satisfy its guaranteed data rate requirement.

14. The switch of claim 13, wherein the first schedule provides each of the VQs with a relatively constant guaranteed rate of transmission through said switch in each scheduling frame, wherein for each VQ the number of transmission reservations allocated to that VQ in each quarter of the scheduling frame differ by at most K, where K is a positive integer <=3.

15. The switch of claim 14, wherein the scheduling-processor provides each sub-queue with a relatively constant guaranteed rate of transmission through said switch in each scheduling frame, wherein the number of transmission reservations allocated to each sub-queue in each quarter of the scheduling frame differ by at most K, where K is a positive integer <=3.

16. The switch of claim 15, further comprising a controller, wherein said controller comprises a processor to process incoming packets associated with a sub-queue, and memory to record the state of said sub-queue, wherein said controller determines which of said packets is admissible and will be forwarded into said sub-queue, and wherein an admissible packet will not cause the size of said sub-queue to exceed a predetermined upper limit.

17. The switch of claim 16, wherein said controller will forward at most R packets associated with one traffic flow into the sub-queue which stores packets for said traffic flow per scheduling frame when averaged over many scheduling frames, when said traffic flow has an associated data rate equivalent to R time-slot reservations per scheduling frame, where R is a positive integer <=F.

18. The switch of claim 15, wherein the first traffic class is a new traffic class in a differentiated services model, wherein each traffic flow belonging to said new traffic class will receive a deterministic and guaranteed rate of transmission in each scheduling frame.

19. The switch of claim 15, further comprising a plurality of third queues, wherein each of the third queues is associated with an input port and an output port, and wherein data which is to be transmitted on a best-effort basis between an input port and an output port is buffered in the third queue associated with said input and output ports, and wherein a third queue is eligible to transmit data through the switch in the time-slots when the connection through the switch between said input and output ports is not used by one of the VQs.

20. The switch of claim 15, wherein the output ports contain buffers, and wherein the data transmitted from each of the VQs to an output port will be buffered at the output port.

21. The switch of claim 15, wherein buffers are interposed between the input ports and the output ports, and wherein the data transmitted from each of the VQs to an output port will be buffered at one of said interposed buffers.

22. The switch of claim 13,
wherein for each of said VQs with a guaranteed rate of transmission equal to B transmission reservations per scheduling frame for positive integer B<=F, the number of transmission reservations for that VQ in time-slots 1 . . . E of said first schedule for positive integer E<=F deviates from the pro-rated number of transmission reservations equal to (E/F)*B, by no more than a positive integer K<=4.

23. The switch of claim 22,
wherein for each of said sub-queues with a guaranteed rate of transmission equal to C transmission reservations per scheduling frame for positive integer C<=F, the number of transmission opportunities provided to that sub-queue in time-slots 1 . . . E of a scheduling frame for positive integer E<=F deviates from the pro-rated number of transmission opportunities equal to (E/F)*C, by no more than a positive integer K<=4.

24. A switch for transmitting a plurality of guaranteed-rate traffic flows over a scheduling frame comprising F time-slots for integer F>0, wherein some traffic flows are associated with a traffic class, and wherein each traffic flow has an associated guaranteed rate of transmission, comprising:
N input ports, M output ports for integers N>0 and M>0;
N×M Virtual Queues (VQs), each of the VQs is associated with an input port and an output port, and where M of the VQs are associated with each input port, wherein each traffic flow is associated with one of the VQs, and wherein each of said VQs is associated with a guaranteed data rate;
wherein each of the VQs is further partitioned into a class sub-queue and a plurality of flow sub-queues, wherein the class sub-queue buffers data associated with traffic flows which belong to said traffic class, wherein each of the flow sub-queues buffers data associated with one traffic flow, and wherein each of said sub-queues is associated with a guaranteed data rate;
memory for storing a first schedule, wherein said first schedule specifies for each input port which associated one of the VQs, if any, has a reservation to transmit data to its associated output port in each time-slot in said scheduling frame;
memory for storing a second schedule, wherein said second schedule specifies for each of the VQs which is enabled to transmit data in a time-slot in said scheduling frame, which of its associated sub-queues, if any, has a reservation to transmit data in said time-slot;
wherein the first schedule provides each of the VQs with a guaranteed rate of transmission through said switch in each scheduling frame, sufficient to satisfy its guaranteed data rate requirement;
wherein the second schedule provides the class sub-queue associated with each of the VQs with a guaranteed rate of transmission through said switch in each scheduling frame, sufficient to satisfy its guaranteed data rate requirement; and
wherein the second schedule provides each flow sub-queue associated with each of the VQs with a guaranteed rate of transmission through said switch in each scheduling frame, sufficient to satisfy its guaranteed data rate requirement.

25. The switch of claim 24, wherein the first schedule provides each of the VQs with a relatively constant guaranteed rate of transmission through said switch in each scheduling frame, wherein for each VQ the number of transmission reservations allocated to that VQ in each quarter of the scheduling frame differ by at most K, where K is a positive integer <=3.

26. The switch of claim 25, wherein the second schedule provides each sub-queue with a relatively constant guaranteed rate of transmission through said switch in each scheduling frame, wherein the number of transmission reservations allocated to each sub-queue in each quarter of the scheduling frame differ by at most K, where K is a positive integer <=3.

27. The switch of claim 26, further comprising a controller, wherein said controller comprises a processor to process incoming packets associated with a sub-queue, and memory to record the state of said sub-queue,
wherein said controller determines which of said packets is admissible and will be forwarded into said sub-queue, and
wherein an admissible packet will not cause the size of said sub-queue to exceed a predetermined upper limit.

28. The switch of claim 27, wherein said controller will forward at most R packets associated with one traffic flow into the sub-queue which stores packets for said traffic flow per scheduling frame when averaged over many scheduling frames, when said traffic flow has an associated guaranteed data rate equivalent to R time-slot reservations per scheduling frame, where R is a positive integer <=F.

29. The switch of claim 26, wherein the first traffic class is a new traffic class in a differentiated services model, wherein each traffic flow belonging to said new traffic class will receive a deterministic and guaranteed rate of transmission in each scheduling frame.

30. The switch of claim 26, further comprising a plurality of third queues, wherein each of the third queues is associated with an input port and an output port, and wherein data which is to be transmitted on a best-effort basis between an input port and an output port is buffered in the third queue associated with said input and output ports, and wherein a third queue is eligible to transmit data through the switch in the time-slots when the connection through the switch between said input and output ports is not used by one of the VQs.

31. The switch of claim 26, wherein the output ports contain buffers, and wherein the data transmitted from each of the VQs to an output port will be buffered at the output port.

32. The switch of claim 26, wherein buffers are interposed between the input ports and the output ports, and wherein the data transmitted from each of the VQs to an output port will be buffered at one of said interposed buffers.

33. The switch of claim 26, wherein each of the VQs stores data in all-optical format.

34. The switch of claim 24,
wherein for each of said VQs with a guaranteed rate of transmission equal to B transmission reservations per scheduling frame for positive integer B<=F, the number of transmission reservations for that VQ in time-slots 1 . . . E of said first schedule for positive integer E<=F deviates from the pro-rated number of transmission reservations equal to (E/F)*B, by no more than a positive integer K<=4.

35. The switch of claim 34,
wherein for each of said sub-queues with a guaranteed rate of transmission equal to C transmission reservations per scheduling frame for positive integer C<=F, the number of transmission opportunities provided to that sub-queue in time-slots 1 . . . E of a scheduling frame for positive integer E<=F deviates from the pro-rated number of transmission opportunities equal to (E/F)*C, by no more than a positive integer K<=4.

36. A switch for transmitting a plurality of guaranteed-rate traffic flows over a scheduling frame comprising F time-slots for integer F>0, wherein some of the traffic flows are associated with a traffic class, and wherein each of the traffic flows has an associated guaranteed rate of transmission, comprising:
N input ports, M output ports for integers N>0 and M>
N×M Virtual Queues (VQs), where each VQ is associated with an input port and an output port, and where M of the VQs are associated with each input port, wherein each traffic flow is associated with one VQ, and wherein each of said VQs is associated with a guaranteed data rate;
wherein each of the VQs is further partitioned into a class sub-queue and a plurality of flow sub-queues, wherein the class sub-queue buffers data associated with traffic flows which belong to said traffic class, wherein each flow sub-queue buffers data associated with one traffic flow, and wherein each of said sub-queues is associated with a guaranteed data rate;
memory for storing a first schedule, wherein said first schedule specifies for each input port which associated one of the VQs, if any, has a reservation to transmit data to its associated output port in each time-slot in said scheduling frame;
a scheduling-processor, wherein for each time-slot in which a particular VQ has a reservation to transmit data, said scheduling-processor processes its associated sub-queues and specifies which of its associated sub-queues, if any, is enabled to transmit data;
wherein the first schedule provides each of the VQs with a guaranteed rate of transmission through said switch in each scheduling frame, sufficient to satisfy its guaranteed data rate requirement;
wherein the scheduling-processor provides the class sub-queue associated with each of the VQs with a guaranteed rate of transmission through said switch in each scheduling frame, sufficient to satisfy its guaranteed data rate requirement; and
wherein the scheduling-processor provides each flow sub-queue associated with each of the VQs with a guaranteed rate of transmission through said switch in each scheduling frame, sufficient to satisfy its guaranteed data rate requirement.

37. The switch of claim 36, wherein the first schedule provides each of the VQs with a relatively constant guaranteed rate of transmission through said switch in each scheduling frame, wherein for each VQ the number of transmission reservations allocated to that VQ in each quarter of the scheduling frame differ by at most K, where K is a positive integer <=3.

38. The switch of claim 27, wherein the scheduling-processor provides each sub-queue with a relatively constant guaranteed rate of transmission through said switch in each scheduling frame, wherein the number of transmission reservations allocated to each sub-queue in each quarter of the scheduling frame differ by at most K, where K is a positive integer <=3.

39. The switch of claim 38, further comprising a controller, wherein said controller comprises a processor to process incoming packets associated with a sub-queue, and memory to record the state of said sub-queue,
wherein said controller determines which of said packets is admissible and will be forwarded into said sub-queue, and
wherein an admissible packet will not cause the size of said sub-queue to exceed a predetermined upper limit.

40. The switch of claim 39, wherein said controller will forward at most R packets associated with one traffic flow into the sub-queue which stores packets for said traffic flow per scheduling frame when averaged over many scheduling frames, when said traffic flow has an associated guaranteed data rate equivalent to R time-slot reservations per scheduling frame, where R is a positive integer <=F.

41. The switch of claim 38, wherein the first traffic class is a new traffic class in a differentiated services model, wherein each traffic flow belonging to said new traffic class will receive a deterministic and guaranteed rate of transmission in each scheduling frame.

42. The switch of claim 38, further comprising a plurality of third queues, wherein each of the third queues is associated with an input port and an output port, and wherein data which is to be transmitted on a best-effort basis between an input port and an output port is buffered in the third queue associated with said input and output ports, and wherein a third queue is eligible to transmit data through the switch in the time-slots when the connection through the switch between said input and output ports is not used by one of the VQs.

43. The switch of claim 38, wherein the output ports contain buffers, and wherein the data transmitted from each of the VQs to an output port will be buffered at the output port.

44. The switch of claim 38, wherein buffers are interposed between the input ports and the output ports, and wherein the data transmitted from each of the VQs to an output port will be buffered at one of said interposed buffers.

45. The switch of claim 36,
wherein for each of said VQs with a guaranteed rate of transmission equal to B transmission reservations per scheduling frame for positive integer B<=F, the number of transmission reservations for that VQ in time-slots 1 . . . E of said first schedule for positive integer E<=F deviates from the pro-rated number of transmission reservations equal to (E/F)*B, by no more than a positive integer K.

46. The switch of claim 45,
wherein for each of said sub-queues with a guaranteed rate of transmission equal to C transmission reservations per scheduling frame for positive integer C<=F, the number of transmission reservations for that sub-queue in time-slots 1 . . . E of said second schedule for positive integer E<=F deviates from the pro-rated number of transmission reservations equal to (E/F)*C, by no more than a positive integer K.

* * * * *

UNITED STATES PATENT AND TRADEMARK OFFICE
CERTIFICATE OF CORRECTION

PATENT NO.        : 9,584,431 B2
APPLICATION NO.   : 14/792226
DATED             : February 28, 2017
INVENTOR(S)       : Tadeusz H. Szymanski It is certified that error appears in the above-identified patent and that said Letters Patent is hereby corrected as shown below:

In the Claims

Claim 13, Column 43, Line 59 "F>0 wherein" should read -- F>0, wherein --
Claim 36, Column 47, Line 21 "and M>" should read -- and M>0 --

Signed and Sealed this
Eighth Day of August, 2017

Joseph Matal
*Performing the Functions and Duties of the*
*Under Secretary of Commerce for Intellectual Property and*
*Director of the United States Patent and Trademark Office*